United States Patent [19]

Tsuboi et al.

[11] Patent Number: 4,982,218
[45] Date of Patent: Jan. 1, 1991

[54] CAMERA

[75] Inventors: Takayuki Tsuboi; Isao Nakazawa, both of Kanagawa; Hiroshi Maeno; Yasuhiko Shiomi, both of Tokyo, all of Japan

[73] Assignee: Canon Kabushiki Kaisha, Tokyo, Japan

[21] Appl. No.: 284,815

[22] Filed: Dec. 14, 1988

Related U.S. Application Data

[63] Continuation of Ser. No. 196,751, May 18, 1988, abandoned, which is a continuation of Ser. No. 21,004, Mar. 2, 1987, abandoned.

[30] Foreign Application Priority Data

| Mar. 3, 1986 | [JP] | Japan | 61-045624 |
| Mar. 12, 1986 | [JP] | Japan | 61-054440 |
| Mar. 19, 1986 | [JP] | Japan | 61-061372 |
| Apr. 14, 1986 | [JP] | Japan | 61-085289 |
| Oct. 8, 1986 | [JP] | Japan | 61-238006 |
| Oct. 8, 1986 | [JP] | Japan | 61-238007 |
| Nov. 27, 1986 | [JP] | Japan | 61-282304 |

[51] Int. Cl.$^5$ ............... G03B 9/08; G03B 13/36; G02B 7/09; G02B 26/00
[52] U.S. Cl. ............... 354/400; 354/234.1; 350/255; 350/269
[58] Field of Search ............... 354/400, 435, 195.1, 354/195.11, 195.12, 187, 202, 230, 234.1, 235.1, 432; 350/266, 255, 269

[56] References Cited

U.S. PATENT DOCUMENTS

| 4,162,831 | 7/1979 | Gold | 354/432 |
| 4,278,340 | 7/1981 | Toyama et al. | 354/195.1 |
| 4,294,527 | 10/1981 | Hashimoto et al. | 354/405 |
| 4,360,258 | 11/1982 | Hashimoto | 354/234.1 X |
| 4,426,145 | 1/1984 | Hashimoto | 354/234.1 X |
| 4,634,254 | 1/1987 | Ogihara et al. | 354/439 X |
| 4,653,892 | 3/1987 | Namai et al. | 354/400 |
| 4,671,639 | 6/1987 | Kodaira et al. | 354/400 |

FOREIGN PATENT DOCUMENTS

| 3138953 | 5/1982 | Fed. Rep. of Germany . |
| 3229745 | 2/1983 | Fed. Rep. of Germany . |
| 3637269 | 5/1987 | Fed. Rep. of Germany . |
| 2009951 | 6/1979 | United Kingdom . |
| 2010511 | 6/1979 | United Kingdom . |
| 2016166 | 9/1979 | United Kingdom . |

Primary Examiner—W. H. Berkey
Attorney, Agent, or Firm—Fitzpatrick, Cella, Harper & Scinto

[57] ABSTRACT

A camera comprises a photo taking optical system; driving means for driving the photo taking optical system; a shutter; switching means for causing transmission of the driving force of the driving means to the photo taking optical system to be changed over to the shutter; and control means for controlling the shutter by converting the opening time of the shutter into the driving degree of the driving means.

69 Claims, 28 Drawing Sheets

F I G. 24
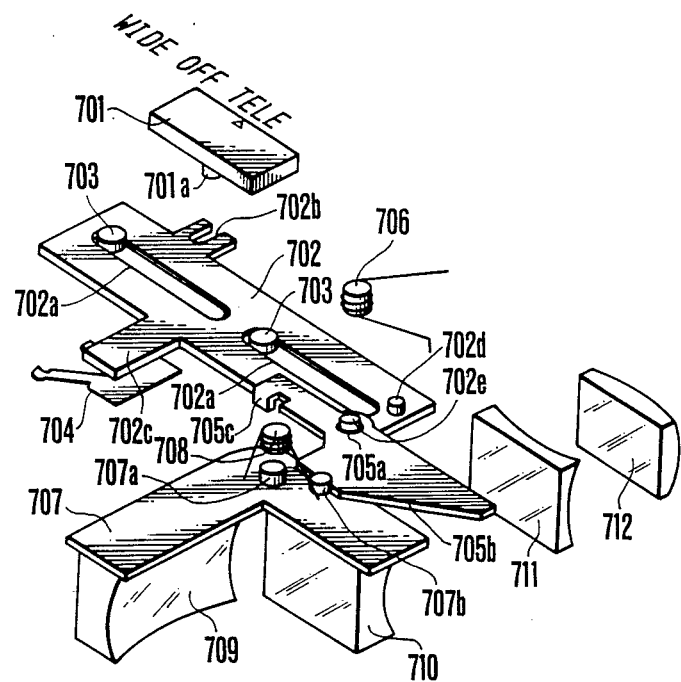

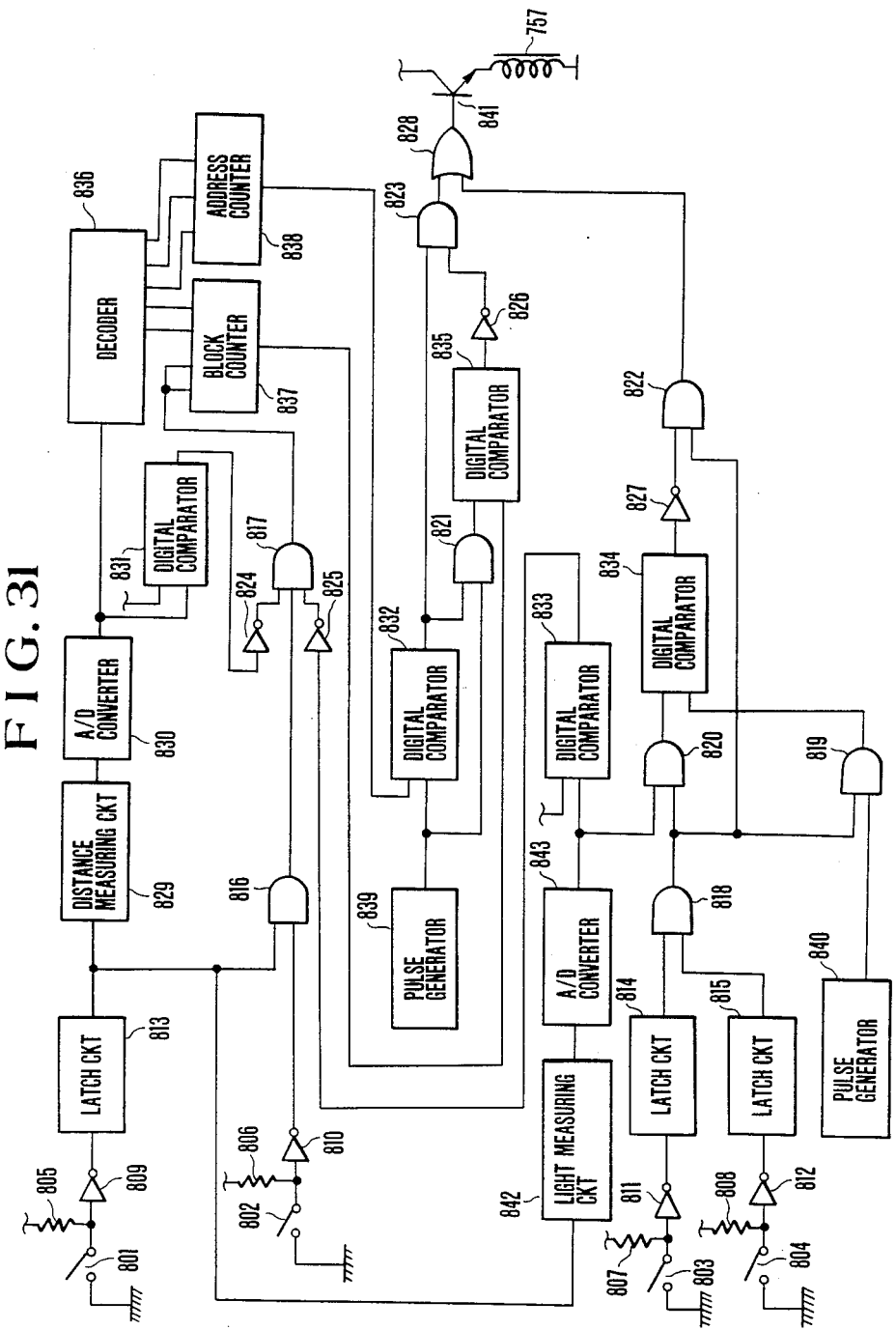
F I G. 31

CAMERA

This application is a continuation of application Ser. No. 196,751 filed May 18, 1988, now abandoned, which is a continuation of Ser. No. 021,004, filed Mar. 2, 1987 which is also abandoned.

BACKGROUND OF THE INVENTION:

1. Field of the Invention:

This invention relates to a camera and more particularly to an improvement on a photo taking lens and shutter driving device of a camera arranged to perform driving control over the photo taking lens and the shutter.

2. Description of the Related Art:

The conventional camera of the kind called a compact camera and designed for reduction in size and cost has a lens barrel part arranged to separately include therein a device for driving a photo taking lens and another device for operating a shutter. These separate driving devices are arranged to be controlled by discrete signals and different driving manners respectively. Hence, the driving mechanism and the circuit of the feedback signal system of the camera has been complex and thus resulted in an increased cost.

SUMMARY OF THE INVENTION

It is therefore an object of this invention to provide a camera which is capable of solving the above stated problem of the prior art by adequately performing necessary functions with inexpensive and simple arrangement.

To attain this object, a camera according to this invention comprises a photo taking optical system; a shutter; switching means for causing transmission of the driving force of the driving means to the photo taking optical system to be changed over to the shutter; and control means for controlling the shutter by converting the opening time of the shutter into the driving degree of the driving means, so that the photo taking optical system and the shutter can be time serially driven by one and the same driving means.

The above and further object and features of this invention will become apparent from the following detailed description of embodiments thereof taken in conjunction with the accompanying drawings.

BRIEF DESCRIPTION OF THE DRAWINGS

FIGS. 22 to 24 are oblique views showing an interlocked relation between the photographing mode change-over device and the view finder device of the camera arranged according to this invention as a third embodiment thereof.

FIG. 31 is a schematic diagram showing a control circuit arranged to control an electro-magnet shown in FIGS. 25 to 28.

DETAILED DESCRIPTION OF THE PREFERRED EMBODIMENTS

The following describes, with reference to the accompanying drawings, the details of preferred embodiments in which this invention is applied to the optical system driving devices of non-interchangeable lens type variable power cameras. In the case of the camera shown in FIG. 2 in particular, a lens driving action for changing the magnifying power of the lens, a lens shifting action for focusing, a film feeding action and a shutter driving action are arranged to be performed by a single unit of motor; and the timing of these actions is arranged to be controlled by a single electro-magnetic actuator (magnet). The camera is provided with a converter lens which is carried to be turnable on an axis perpendicular to the axis of a lens barrel and is stowed in parallel with the lens barrel. The lens barrel is arranged to be automatically retracted and locked by the converter lens in the furthest retracted position immediately after completion of photographing at a long focal length.

Figure 1:
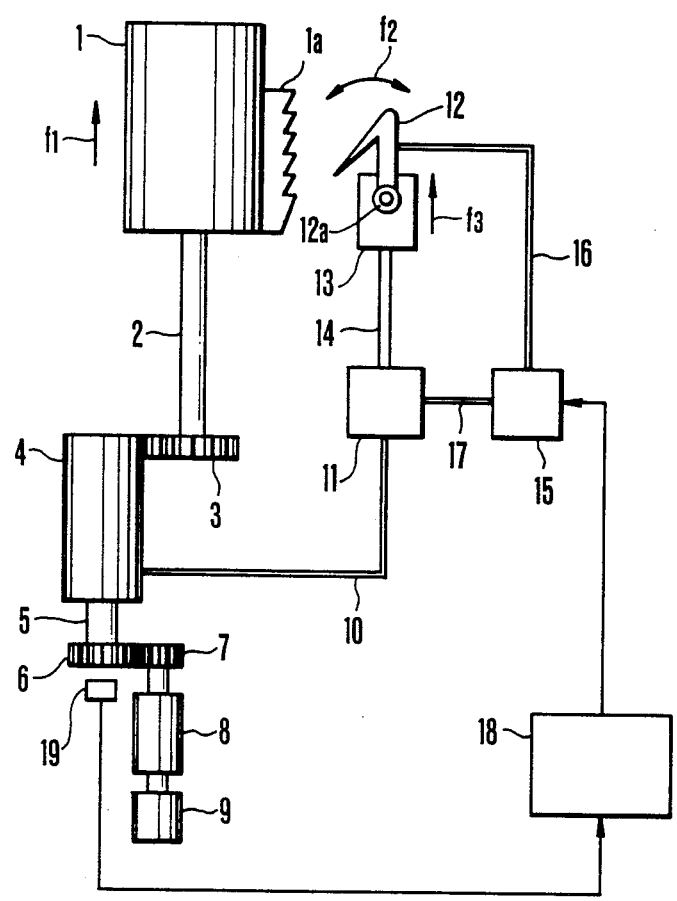
FIG. 1 conceptually shows the arrangement of an optical system driving device arranged according to this invention as a first embodiment thereof.

FIG. 1 schematically shows the arrangement of an optical system driving device as a first example of embodiment of this invention. Referring to FIG. 1, a lens barrel 1 is arranged to be shiftable into a desired position. A saw-tooth shaped locking toothed member 1a is formed in the rear of the lens barrel 1 in one body therewith and is arranged to engage a stopper member which will be described later herein. A screw shaft 2 is arranged to cause the lens barrel 1 to move forward in the direction of arrow f1 by engaging a female helicoidal part which is not shown but is provided inside of the lens barrel 1. A gear 3 is secured to the screw shaft 2. A differential gear 4 which serves as action start time control means as will be described later is arranged to transmit its rotation to the gear 3. The rotation of a motor 9 is transmitted to the differential gear 4 via a shaft 5, reduction gears 6 and 7 and a force transmission change-over device 8. The screw shaft 2, the gear 3 and the helicoidal part within the lens barrel 1 jointly form object shifting means for shifting the lens barrel 1 (i.e. an object).

Figure 2:
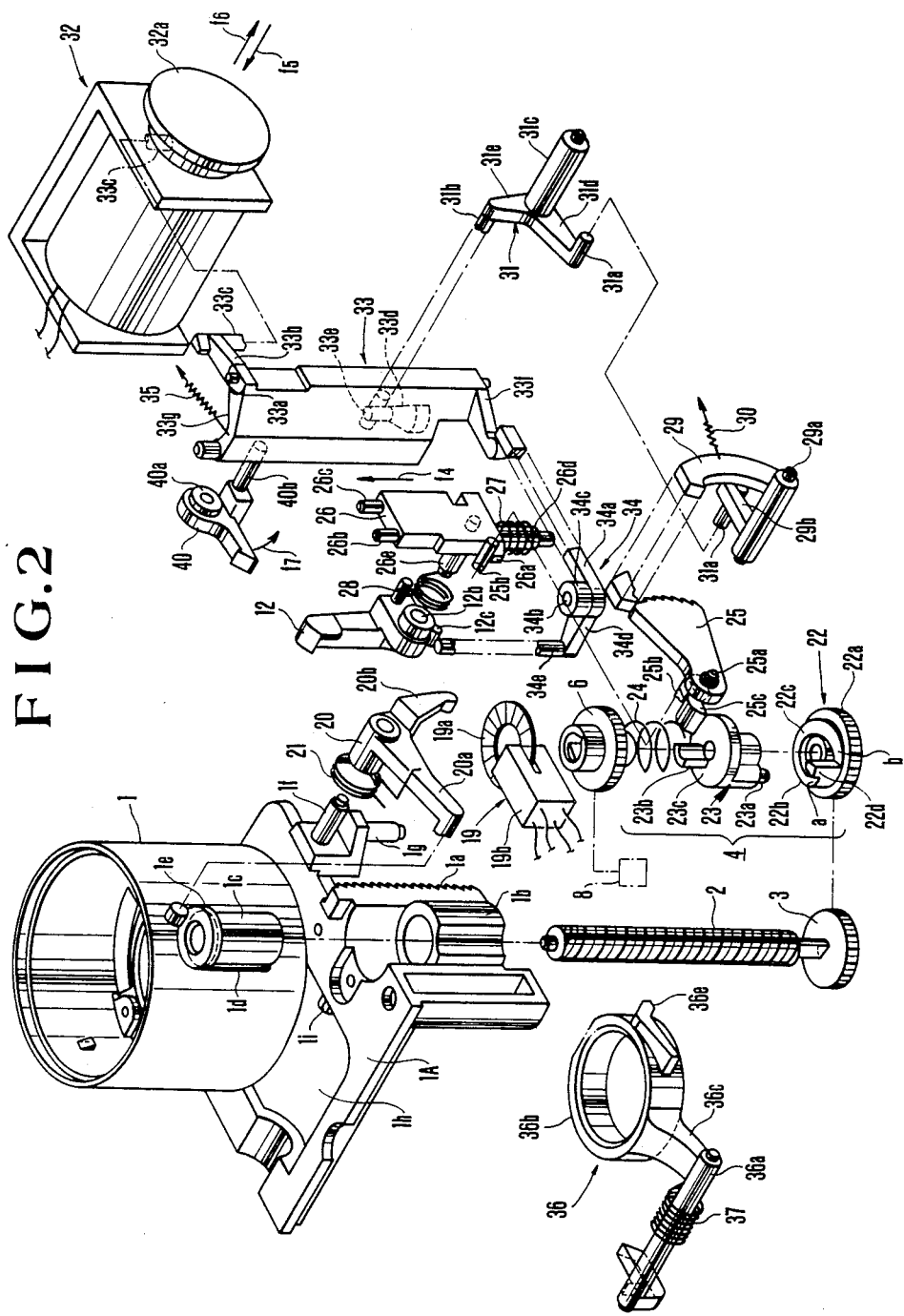
FIG. 2 is an exploded oblique view showing the essential parts of the camera including a device embodying the conceptual arrangement of FIG. 1.

Stopper member shifting and positioning means 11 is connected to the differential gear 4 via responding means 10. The means 11 is arranged to move a stopper member 12 in parallel with the object shifting direction to a predetermined extent and to set it in a predetermined position. The arrangement of the means 11 is, for example, as shown in FIG. 2 which shows the details of more specific arrangement of the first example of embodiment.

The stopper member 12 is arranged to bring the movement of the lens barrel 1 in the direction of arrow f1 by engaging the locking toothed part 1a of the lens barrel 1. A mount part 13 is arranged to carry the stopper member 12 to permit it to swing in the direction of arrow f2 on an axis imaginarily extending perpendicularly to the paper surface of the drawing. The mount part 13 is attached either via some mechanical coupling means or directly to the above stated stopper member shifting and positioning means 11. The means 11 is arranged to move the stopper member 12 only to a very short extent for positioning it in the direction of arrow f3. The means 11 is operated via the responding means 10 by the differential gear 4 which serve as freeing means and means for controlling an action start time. After that, the operation of the means 11 is brought to a stop through transmission means by action control means 15.

The action control means 15 is arranged to control the timing for allowing the stopper member 12 to engage the locking toothed part 1a and the timing for bringing to a stop the movement in the direction of arrow f3 of the stopper member shifting and positioning means 11. The control means 15 is connected to the stopper member 12 and the stopper member shifting and positioning means 11 via transmission means 16 and 17 respectively. In the more specific arrangement of the embodiment which will be described later on, the action control means 15 is composed of an electro-magnetic actuator, i.e. an electro-magnet.

A control circuit 18 is arranged to compute an extent to which the lens barrel 1 is to be shifted, to control the action control means 15 on the basis of the result of the computation and to control the start, stop and reverse rotation of the motor 9. Moving amount detecting means 19 is arranged to detect the moving amounts given from the motor 9 to the screw shaft 2 and the stopper member shifting and positioning means 11 and to produce a signal, which is supplied to the control circuit 18. In this specific embodiment, the shifting extent of the lens barrel 1 is arranged to be determined by the action start time of the differential gear 4 which serves as the action start time control means and that of the stopper member 12 and not by the time points at which the motor 9 starts and stops.

The control circuit 18 divides the lens barrel shifting extent or distance into a first and second shifting distances according to the basic concept of this invention. The control circuit 18 control the stopper member shifting and positioning means 11 and the stopper member 12 by applying to the action control means 15 a first signal which represents the first shifting distance and a second signal which represents the second shifting distance. The lens barrel 1 is thus allowed to move to a predetermined extent under this control.

The action start time of the stopper member shifting and positioning means 11 and that of the screw shaft 2 (object shifting means) are determined by the differential gear 4 which functions as the action start time control means. In other words, when the force of the motor 9 is transmitted to the shaft 5, the differential gear 4 first actuates via the responding means 10 the stopper member shifting and positioning means 11 and then causes, via the means 11, the stopper member 12 to move in the direction of arrow f3 (in parallel to the moving direction of the lens barrel 1) to a slight extent. Then, after the lapse of a predetermined period of time, the lens barrel 1 is caused to move in the direction of arrow f1 by causing the screw shaft 2 to rotate.

The minimum shifting unit of the lens barrel shifting means (the object shifting means) formed by the screw shaft 2 is determined by the pitch of the saw tooth shaped locking teeth. The minimum shifting unit is preset at a value 10 times as much as the minimum unit of movement of the stopper member shifting and positioning means 11. Therefore, the lens barrel is shifted by the screw shaft 2 to a much greater extent than the moving distance by the stopper member 12. The moving distance of the stopper member 12 is determined by the stopper member shifting and positioning means 11. The start of action of the means 11 is determined by the differential gear 4. The end of action of the means 11 is determined by the action control means 15. In short, the moving extent of the stopper member 12 and that of the lens barrel 1 are determined by the acting time of the control means 15.

FIG. 2 shows in an exploded oblique view and by way of example the details of the arrangement of the embodiment of this invention. In FIG. 2, all the parts that coincide with the conceptional arrangement shown in FIG. 1 are indicated by the same reference numerals.

Referring to FIG. 2, a lens barrel 1 is provided with the above stated locking toothed part 1a which is secured to a flange part 1A of the lens barrel 1. A ring part 1b is formed at the flange part 1A. A helicoid ring 1c which engages a screw shaft 2 is inserted into the ring part 1b. An axial groove which is not shown is formed in the inner circumferential face of the ring part 1b in parallel with the axial direction thereof. An axial ridge axially extends and protrudes from the outer circumferential surface of the helicoid ring 1c and is slidably inserted in the axial groove. The helicoid ring 1c is provided with a thread which is formed along the inner circumferential face of the ring 1c to have the screw shaft 2 in screwed engagement with the screw shaft 2. The helicoid ring 1c is further provided with a flange part 1e which has a larger diameter than the inside diameter of the ring part 1b and is formed at the fore end of the ring 1c. With this flange part 1e thus formed at the fore end of the helicoid ring 1c, the ring 1c is inserted into the ring part 1b from the front end of the latter. Therefore, in the process of drawing out the lens barrel 1 forward in a manner as will be described later, the helicoid ring 1c is allowed to pull out of the ring part 1b and to move forward on the screw shaft 2 alone after the lens barrel 1 is brought to a stop by the stopper member 12.

One arm 20a of a shutter blade driving lever 20 is pressed by the force of a spring 21 against the fore end face of the helicoid ring 1c. The helicoid ring 1c is thus pushed into the ring part 1b by the force of the spring 21. While the lens barrel 1 is moving forward, therefore, the helicoid ring 1c never comes to pull out of the ring part 1b. However, after the lens barrel 1 is brought to a stop by the stopper member 12, the helicoid ring 1c is allowed to move further forward coming out of the ring par 1b.

The blade driving lever 20 is rotatably carried by a support pin 1f which is provided on the lens barrel 1. The spring 21 is fitted on the support pin 1f and is arranged to urge the lever 20 to turn counterclockwise.

Figure 5:
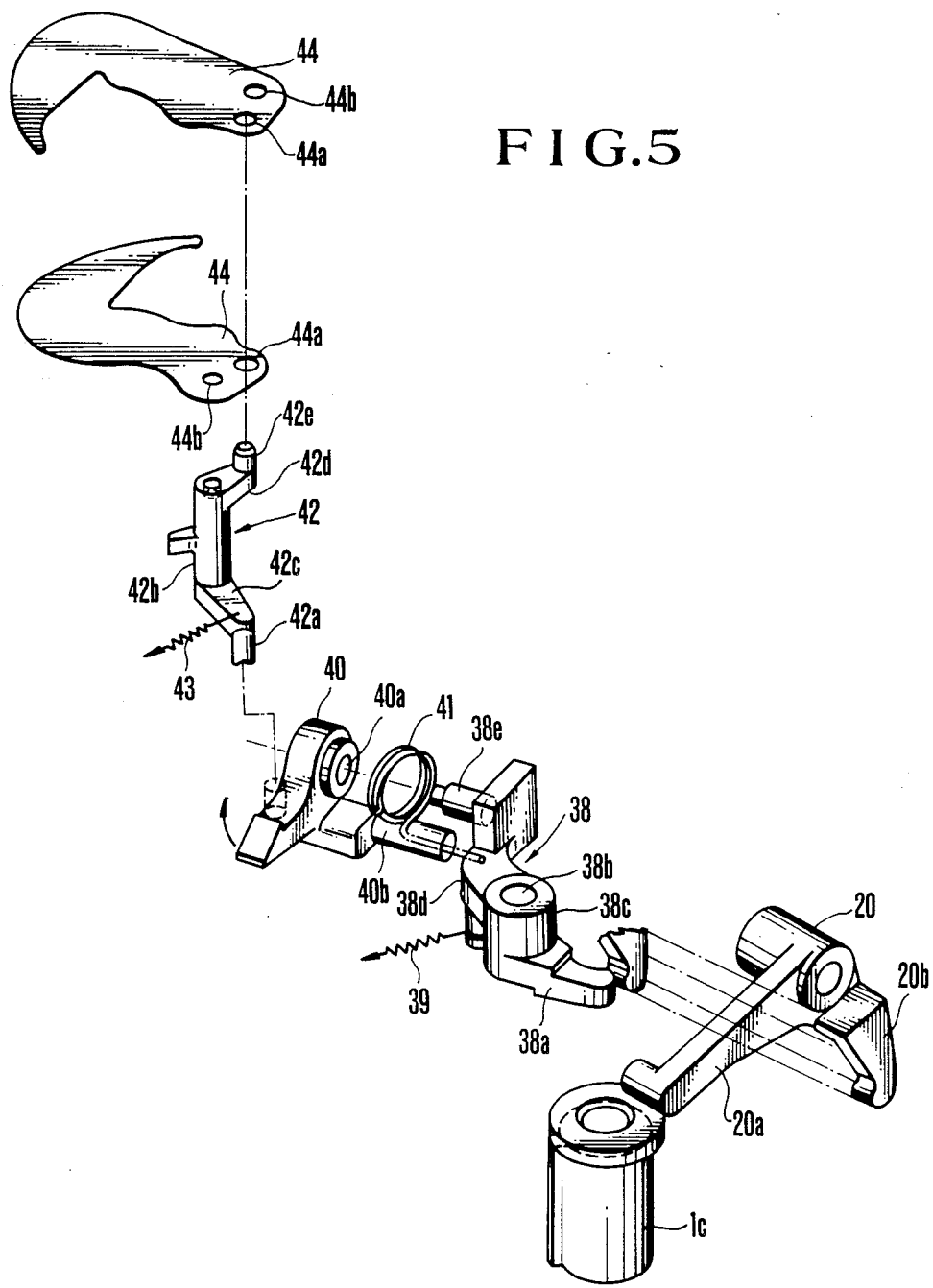
FIG. 5 is an exploded oblique view showing the essential parts of the shutter driving device of the camera of FIG. 2.

A pin 1g is disposed in parallel with the screw shaft 2 on the flange part 1A of the lens barrel 1 in the neighborhood of the support pin 1f. A blade opening lever 38 which is included in the shutter blade driving device 40 shown in FIG. 5 is rotatably carried by this pin 1g. The shutter blade driving device will be described later. A window 1A is provided in the flange part 1A of the lens barrel 1. A projection 1i is formed on the inner edge of the window 1h. The window 1h and the projection 1i are related to a converter lens carrying frame which will be described later. A gear 3 is secured to the screw shaft 2 and is arranged to receive the rotation of the differential gear 4 which functions as action start time control means.

As shown in FIG. 2, the differential gear 4 includes: A driven member which is 22 to be moved and is provided with an external toothed part for engaging the gear 3; a driving member 23 arranged to transmit the rotation thereof with a given time delay to the driven member 22 and to actuate the above stated stopper member shifting and positioning means 11 before transmitting the rotation to the driven member 22; and a spring 24 which is arranged to urge the driving member 23 toward the member 22. The driven member 22 consists of a gear part 22a which constantly engages the gear 3 and an end face cam part 22b which is in a helical shape. A helical cam face 22c and a stopper part 22d are formed at the end face cam part 22b. The driving member 23 includes a projection 23a which abuts on the cam face, an engaging part 23b which engages a gear 6 and a flat face 23c which is perpendicular to the axial direction and is arranged to engage a follower 25c which corresponds to the responding means 10 mentioned in the foregoing. The driving member 23 is thus arranged to rotate together with the gear 6 and to be movable away from the gear 6 in the axial direction, because: The gear 6 is provided with an axial groove which is formed in the circumferential wall of an axial hole formed in the gear 6 and is arranged to have the above stated engaging part 23b fitted therein in such a way as to permit the axial movement of the part 23b. The gear 6 and the driving member 23 is coupled with each other by inserting the engaging part 23b into the axial groove. The axial length of the engaging part 23b is arranged to be longer than the axial movable distance of the driving member 23. Therefore, the engaging part 23b never pulls out of the axial hole of the gear 6. The gear 6 is arranged to be driven by a motor 9 (see FIG. 1) via a force transmission change-over device 8 and a gear 7. Further, although it is not shown in FIG. 2, the driven member 22 to be moved and the driving member 23 are separately carried by different shafts. The member 22 is secured to its shaft while the driving member 23 is loosely fitted on its shaft.

The means 19 for detecting the degree of motion which is shown also in FIG. 1 is in this case composed of an encoding plate 19a which rotates together with the gear 6 and a photo interrupter 19b which produces pulses in accordance with a black-and-white pattern provided on the encoding plate 19a.

Next, the parts corresponding to the stopper member shifting and positioning means 11 which is in association with the driving member 23 of the differential gear 4 and the parts corresponding to the responding means 10 shown in FIG. 1 are arranged as described in the following with reference to FIG. 2:

Referring to FIG. 2, a toothed sector arm 25 is arranged in the vicinity of the driving member 23 to be turnable on a shaft 25a which extends in a direction perpendicular to the screw shaft 2. A pin 25b which is in parallel with the shaft 25a is provided on the toothed sector arm 25 away from the shaft 25a. The pin 25b abuts on a sidewise protrudent part 26a of a stopper member carrying and shifting member 26. A follower 25c is also provided on the toothed sector arm 25 and extends in parallel with the pin 25b. As mentioned in the foregoing. the follower 25c abuts on the flat surface 23c of the driving member 23. The stopper member carrying and shifting member 26 is carried by a structural member of a camera body or the like through three carrying and sliding guide pins 26b, 26c and 26d. A spring 27 which is fitted on one of the pins 26b to 26d is compressed in between the external face of the member 26 and the surface of the structural member such as the camera body or the like. The member 26 is thus constantly urged by the spring 27 to move in the direction of arrow f4 in parallel to the screw shaft 2 toward the front of the camera. Accordingly; the pin 25b of the toothed sector arm 25 is also urged upward as viewed on FIG. 2. The follower 25c is pressed by the flat face 23c of the driving member 23 under the force of the spring 27. The toothed sector arm 25 is also urged via the pin 25b by the force of the spring 27 to turn round counterclockwise on the shaft 25a. However, since the flat face 23c of the driving member 23 which engages the follower 25c prevents the arm 25 from moving, the arm 25 does not move unless the driving member 23 comes to axially move.

The stopper member carrying and moving member 26 is provided with a stopper member carrying pin 26e for pivotally carrying the stopper member 12. The pin 26e is rotatably inserted in a hole 12b provided in the base end part of the stopper member 12. A spring 28 is fitted on the pin 26e and is arranged to urge the stopper member 12 to turn round clockwise as viewed on FIG. 2.

A pawl member 29 which is arranged to define the rotating angle position of the toothed sector arm 25 as desired is disposed close to the outer circumference of the sector arm 25. The pawl member 29 has a shaft 29a in parallel with the shaft 25a of the sector arm 25 and is carried by a stationary structural member in such a way as to be turnable on the shaft 29a. A spring 30 urges the pawl member 29 to move in the direction of arrow. The pawl member 29 is provided with a locking claw formed at the fore end thereof for engagement with the toothed part of the sector arm 25. When the locking claw enters in between the teeth of the sector arm 25, the pawl member 29 prevents the arm 25 from turning round counterclockwise on the shaft 25a even when the arm is in a turnable state.

The shaft 29a has an arm 29b protruding therefrom. A spring 30 is arranged to press the arm 29b against a pin 31a provided on a second lever 31. The second lever 31 is arranged to enable the pawl member 29 to engage the teeth of the sector arm 25 by turning counterclockwise against the force of the spring 30.

As mentioned above, the stopper member shifting and positioning means 11 which is arranged to move the stopper member 12 in parallel with the screw shaft 2 and to set the member 12 in a desired position comprises the toothed sector arm 25; the pin 25b and the follower 25c which are in one body with the arm 25; the stopper member carrying and moving member 26; the spring 27; and the pawl member 29 arranged t define the turning angle position of the toothed sector arm 25. The mount part 13 and the mechanical coupling means 14 are not essential. However, in the event of electrical arrangement of the stopper member shifting and positioning means 11, they become indispensable. Further, the responding means 10 interlocking the stopper member shifting and positioning means 11 and the differential gear 4 is represented, in the case of FIG. 2, by the follower 25c which is arranged in one unified body with the toothed sector arm 25.

The parts of FIG. 1 including the action control means 15 which is a magnet (or electro-magnetic actuator) and the transmission means 16 and 17 for connecting the action control means 15 to the stopper member 12 and to the stopper member shifting and positioning means 11 are arranged as described below:

In the case of FIG. 2, a magnet 32 is arranged to function as the action control means 15. The magnet 32 is provided with a plunger 32a which moves in the direction of arrow f5 when the magnet is excited (turned on) and is moved in the direction of arrow f6 by the spring of a first lever when the magnet 32 is not excited (off).

The above stated transmission means 16 and 17 are represented by the first lever 33 and by second and third levers 31 and 34 which are arranged to be moved by the first lever 33. The first lever 33 is carried by a structural member of the camera in such a way as to be turnable round a shaft 33a and has four arm parts including first to fourth arm parts. A pin 33c which is arranged to engage the plunger 32a is secured to the fore end of the first arm part 33b. A pin 33e which is arranged to engage a first pin 31b secured to the second lever 31 is secured to the fore end of the second arm part 33d. The third arm part 33f is arranged to engage one arm part 34a of the third lever 34. The fourth arm part 33g engages a pin 40b which is secured to a shutter blade releasing pawl 40. The pawl 40 is a part of a shutter driving device. A spring 35 which is attached to the fourth arm part 33g constantly urges the fourth arm part 33g to turn clockwise round the shaft 33a. Therefore, when the magnet 32 is not excited, since the plunge 32a is then not moved in the direction of arrow f5, the first lever 33 is turned round clockwise on the shaft 33a by the force of the spring 35.

The second lever 31 which forms the above stated transmission means 16 in conjunction with the first lever 33 has a shaft 31c which extend perpendicularly to the screw shaft 2. The lever 33 is carried by a structural member in such a way as to be turnable on the shaft 31c. The second lever 31 is provided with two arm parts 31d and 31e extending outward from the shaft 31c with pins 31a and 31b secured to the fore ends of the arm parts 31d and 31e. The pin 31a engages the arm part 29b of the pawl member 29. The other pin 31b engages the pin 33e of the second arm part 33d of the first lever 33.

The third lever 34 which forms the transmission means 15 in conjunction with the first lever 33 has a boss part 34c which is provided with an axial hole 35b formed in parallel with the screw shaft 2. The third lever 33 is turnably carried by a structural member with a pin (not shown) of the structural member inserted into the axial hole 34b of the boss part 34c. The third lever 34 has two arms 34a and 34d. The arm 34a engages the third arm part 33f of the first lever 33. The other arm 34d has a pin 34e secured to the fore end thereof. The pin 34e is arranged to engage the arm part 12c of the stopper member 12.

The mechanical arrangement of the optical system driving device of the camera embodying this invention as the first example of embodiment is as described in outline in the foregoing. The camera includes a lock means which is arranged in association with the differential gear 4 and the lens barrel 1 which are included in the optical system driving device. The details of the lock means are as described below with reference to FIGS. 2, 3 and 4:

As mentioned in the foregoing, the camera of this embodiment includes a converter lens which is carried to be turnable round an axis extending perpendicular to the axis of the lens barrel and is disposed in parallel with the lens barrel. The lens barrel is arranged to be automatically retracted back to the furthest retracted position to be locked there after completion of photographing at a long focal length.

Figure 3:
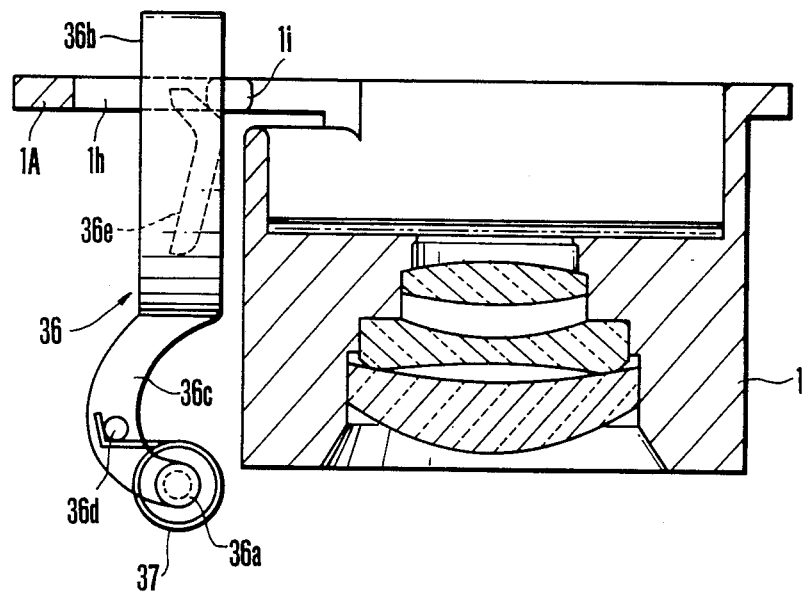
FIG. 3 is a horizontal sectional view showing the lens barrel of the camera of FIG. 2 as in its furthest retracted position.
Figure 4:
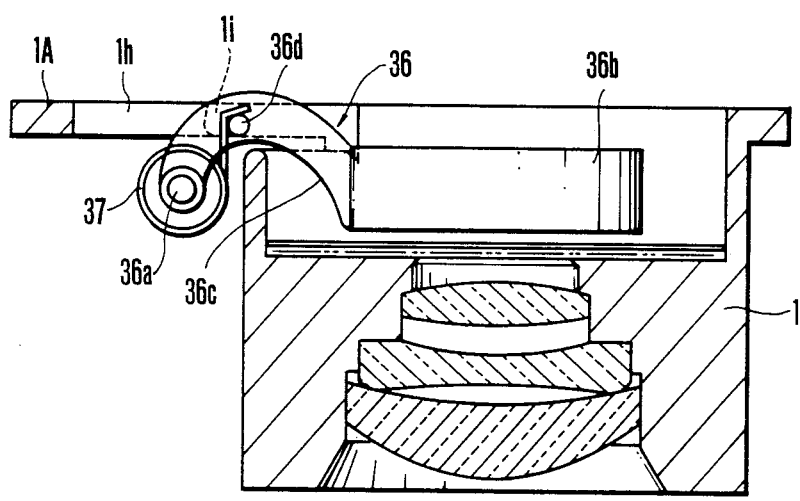
FIG. 4 is a horizontal sectional view showing the lens barrel of the camera of FIG. 2 as in a forward shifted state.

Referring to FIGS. 2, 3 and 4, a converter lens carrying frame 36 includes a carrying shaft 36a extending perpendicularly to the axis of the lens barrel 1; a ring shaped carrying frame body 36b which carries the converter lens and an arm part 36c interconnecting the the carrying shaft 36a and the carrying frame body 36b. As shown in FIG. 3, the converter lens carrying frame 36 is disposed within the camera body in such a manner that, when the lens barrel 1 is in its furthest retracted position, the surface of the frame body 36b is correctly opposed to the outer circumferential surface of the lens barrel 1 or, in other words, the converter lens carrying frame 36 is in parallel with the lens barrel 1. A torsion spring 37 which is fitted on the carrying shaft 36a is arranged to urge the frame 36 to turn round clockwise on the carrying shaft 36a by exerting its force on a spring peg 36d protruding from the arm part 36c of the frame. The converter lens carrying frame 36 is further arranged to pass through the window 1h provided in the flange part 1A of the lens barrel 1. An angular engaging part 36e is arranged on the outer circumferential surface of the frame body 36b to engage a projection 1i provided on the inner circumferential edge of the window 1h. The engaging part 36e has two side parts which are gradually slanting relative to the end face of the frame body 36b. With the converter lens carrying frame 36 in a state of moved away from the shifting path of the lens barrel 1 (i.e. when the lens barrel 1 is in the furthest retracted position), an intersecting point between the two side parts which is the maximum protruding part of the engaging part 36e is located further forward than the projection 1i of the lens barrel and, at the same time, is located a little inside of the frame body close to the outer circumferential surface of the lens barrel 1, so that the part 36e can be engaged with the projection 1i.

Under the condition as shown in FIG. 3, the lens barrel 1 is thus either restrained or locked by the converter lens carrying frame 36. Therefore, the lens barrel 1 can be prevented from being pushed forward by any impact thereon. Further, under the condition of FIG. 3, since the converter lens carrying frame 36 is pushed against the lens barrel 1 by means of the spring 37, the load on the screw shaft 2 is increased thereby, so that the differential gear 4 can be prevented from performing a faulty action. In other words, the driving member 23 which is included in the differential gear 4 is pushed by the spring 24 against the cam face 22c of the member 22 to be moved or driven. Therefore, if the driven member 22 is under a light load at the start of the driving action of the driving member 23, the driven member 22 might be prematurely turned round before arrival of the protruding part 23a of the driving member 23 at the lowest part of the cam face 22c of the driven member 22. With the converter lens carrying frame 36 arranged to restrain the lens barrel 1 as shown in FIG. 3, the load on the driven member 22 is sufficiently heavy to prevent the member 22 from being driven to turn round by the driving member 23 during the axial motion of the driving member 23. This enables the differential gear 4 to adequately perform its action to transmit a rotating force to the screw shaft 2 which is lens shifting means after completion of the action of the stopper member shifting and positioning means 11.

FIG. 4 shows a state in which the lens barrel 1 has been drawn out greatly forward for photographing at a long focal length and, as a result, the converter lens carrying frame 36 is inserted immediately after the lens barrel 1. In this instance, since the converter lens carrying frame 36 is under the clockwise urging force of the spring 37, the frame 36 is automatically inserted immediately behind the the lens barrel according as the lens barrel 1 is moved forward. (For inserting the frame 36 immediately after the lens barrel 1, the force of a motor may be utilized.)

In the case of the camera of this embodiment, the lens barrel 1 is arranged to be locked in the furthest retracted position as shown in FIG. 3 after completion of long focal point photographing, at the time of short focal point photographing and under a non-photographing condition. In addition, the converter lens carrying frame 36 is stowed in parallel with the side face of the lens barrel 1. This arrangement eliminates the shortcomings of the conventional variable-power camera (such as a two focal point change-over type compact camera) including that the lens barrel tends to come into collision against other things and that the thickness of the camera body inevitably increases.

Another advantage of the camera of this embodiment resides in that: The arrangement to have the lens barrel automatically come back to the furthest retracted position decreases the possibility of leak of light into the inside of the lens barrel. Besides, the possibility of any damage of the lens barrel also decreases. Therefore, the lens barrel does not require any complex light shielding structural arrangement nor any increased rigidity. Therefore, the camera according to this invention causes no increase in weight and in the cost of manufacture.

Referring to FIG. 5, the shutter driving device which is included in the camera in association with the invented optical system driving device is arranged as follows: The illustration includes a helicoid ring 1c which is also shown in FIG. 2; and a blade driving lever 20. The lever 20 includes two arms 20a and 20b. The arm 20b engages the fore end face of the helicoid ring 1c. The other arm 20b engages one arm 38a of a blade opening lever 38. The blade opening lever 38 has a boss part 38c which is provided with an axial hole 38b. The pin 1g of the lens barrel 1 is arranged to be fitted into the axial hole 38b. The lever 38 is urged by a spring 39 to turn counterclockwise round the axial hole 38b. Another ar 38d of the blade opening lever 38 has a pin 38e secured to its fore end and arranged to be inserted in the boss hole 40a of the blade release pawl 40 (see FIG. 2). A spring 41 which is fitted on the pin 38e is arranged to exert a counterclockwise force urging the blade releasing pawl 40 to turn round the pin 38e. As shown in FIG. 2, the pawl 40 has a pin 40b which engages the fourth arm 33g of the first lever 33. When the first lever 33 is operated by the force of the spring 35, the pawl 40 is caused to turn counterclockwise on the pin 40b in the direction of arrow f7 as shown in FIG. 2.

A blade driving shaft 42 which has an arm 42a arranged to engage the blade releasing pawl 40 is disposed close to the pawl 40. The blade driving shaft 42 also has a shaft part 42b extending in parallel with the screw shaft 2. The shaft 42 is rotatably carried by the lens barrel 1 at this shaft part 42b. A spring 43 which is attached to the arm 42c urges the driving shaft 42 to turn round clockwise on the shaft part 42b. The shaft part 42b has another arm 42d which is formed at the other end of the shaft part 42b. The arm 42d has a pin 42e which is arranged at the fore end of the arm 42d to be inserted into slots 44a formed in shutter blades 44. The shutter blades 44 have turning center holes 44b which are arranged to have a pivot pin (not shown) inserted therein. These shutter blades 44 are thus arranged to turn round the turning center holes 44b.

Figure 6:
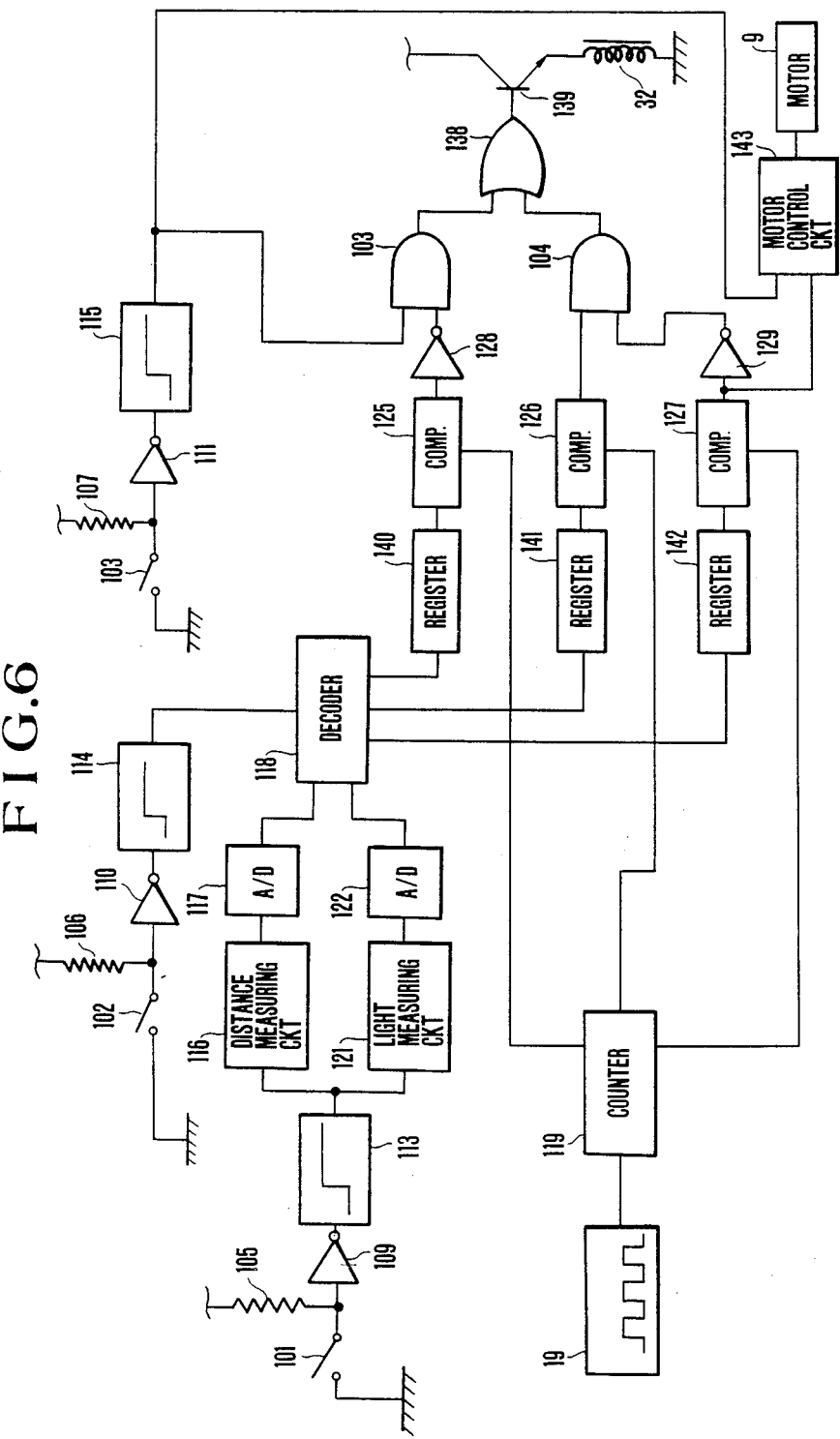
FIG. 6 shows a portion of the control circuit of the camera of FIG. 2.

Referring to FIG. 6, the camera of this embodiment includes a control circuit, detectors, etc. which are arranged as follows: The circuit arrangement of FIG. 6 includes all the circuits and detectors related to a control operation on the magnet 32 shown in FIG. 2. In FIG. 6, a switch 101 is arranged to close when a shutter release button which is not shown is pushed down to a first stroke position thereof. A switch 102 is arranged to be closed only in performing long focal length photographing. A switch 103 is arranged to be closed when the release button is pushed down to a second stroke thereof. The illustration includes pull-up resistors 105 to 107; inverters 109 to 111, 128 and 129; latch circuits 113 to 115 including RS flip-flops or the like; a known distance measuring circuit 116; AD (analog-to-digital) conversion circuits 117 and 122 digital comparators 125 to 127; AND gates 103 and 104; a known light measuring circuit 121; an OR gate 138; a motion amount detector 19 which is also shown in FIGS. 1 and 2; and a transistor 139 which is arranged to turn on and off an exciting current to be applied to the above stated magnet 32. The AD conversion circuit 117 is arranged to produce a measured binary distance value. The other AD conversion circuit 122 is arranged to produce a measured binary light value signal. A decoder 118 is arranged to compute a extent to which the shutter blades must be opened for an apposite exposure from the measured binary light value signal and two output signals produced from the decoder 118 by dividing a computed necessary lens shifting extent value into two shifting extent values consisting of upper two bits and lower two bits of the necessary lens shifting extent value respectively. The decoder 118 thus generates a signal for obtaining an apposite exposure. A counter 119 is arranged to count the pulses generated by the above stated motion amount detector 19. An address register 140 is arranged to store, on the basis of the first output signal of the decoder 118, a reference value to be used at a digital comparator 125. A block register 141 is arranged to store, on the basis of the second output signal of the decoder 118, a reference value to be used at a digital comparator 126. An exposure register 142 is arranged to store, on the basis of the third output signal of the decoder 118, a reference value to be used at a digital comparator 127. The address register 140 stores the upper two bits of the necessary lens shifting extent value (representing a greater shifting extent). The block register 141 stores the lower two bits of the necessary lens shifting extent value (a smaller shifting extent). A motor control circuit 143 controls the driving of the motor 9 in response to outputs of the latch circuit 115 and the digital comparator 127.

The operation of each part of the camera of this embodiment is as described below with reference to FIGS. 2 to 6. Before the start of photographing (or when the camera is not in use), the lens barrel 1 is in the furthest retracted position as shown in FIG. 3 and is locked by the converter lens carrying frame 36. Under this condition, the helicoid ring 1c is in a state of being inserted into the inside of the ring shaped part 1b of the lens barrel 1 with its flange part 1e alone protruding from the ring shaped part 1b.

The protruding part 23a of the driving member 23 of the differential gear 4 is abutting on the highest point a of the cam face 22c of the driven member 22 and thus the driving member remains in repose. The follower 25c of the toothed sector arm 25 is pressed against the flat face 23c of the driving member 23 by the force of the spring 27. The sector arm 25 is kept in its original position by the upward reaction of the driving member 23. Since the plunger 32a is in an OFF state, the pawl member 29 and the second lever 31 are kept in their states of having been turned round to the left and to the right by the force of the spring 35 respectively. In this instance, the driving member 23 stays in the highest position as viewed on FIG. 2. Therefore, the follower part of the toothed sector arm 25 also stays in its highest position. Accordingly, the pin 25b is in a state of having been pushed down to its lowest position by the driving member 23. The stopper member carrying and moving member 26, therefore, remains in a state of having been pushed by the pin 25b down to its lowest position (its original position) as viewed on FIG. 2. The spring 27 is in a most tightly compressed state. Therefore, the stopper member 12 stays in its original position. Then, the pin 34e of the third lever 34 which engages the arm part 12c of the stopper member 12 is not receiving from the first lever 33 any rightward urging force to be exerted on the arm part 12c as viewed on FIG. 2. Therefore, the stopper member 12 is kept in a position away from the locking teeth 1a by the force of the spring 28.

Meanwhile, the magnet 32 which serves as action control means is in a non-excited state. Therefore, the plunger 32a is not receiving the force in the direction of arrow f5 as shown in FIG. 2. The first lever 33 is in a state of being urged by the force of the spring 35 exerted in the direction of arrow.

In the shutter driving device, the blade driving lever 20 has its arm 20a kept in the lowest position as viewed on FIG. 2 by the force of the spring 21 as the helicoid ring 1c is not much protruding forward from the inside of the ring part 1b of the lens barrel 1. Another arm 20b of the lever 20 is, therefore, kept in the highest position thereof as viewed on FIG. 2. The arm 38d of the blade opening lever 38 and the blade releasing pawl 40 which is arranged in one unified body with the former are caused to stay in their full swung positions by the force of the spring 39 exerted in the direction of arrow. The blade driving shaft 42 which engages the blade releasing pawl 40 is kept in a state of having been swung by the force of the spring 43 exerted in the direction of arrow. The shutter is thus kept closed by the shutter blades 44. Meanwhile, the motor 9 (see FIG. 1) of course remains stationary. When the camera is shifted from this state to a state of performing a long focal length photographing, the various parts of the embodiment operate as follows:

When a long focal length photographing mode is selected by operating a photographing mode selection knob before the photographing operation, the switch 102 shown in FIG. 6 is closed. Following this, when the shutter release button which is not shown is pushed down to the first stroke position thereof with the visual field adjusted to an object to be photographed, another switch 101 of FIG. 6 is closed. An output is obtained from the inverter 109. In response to this, the latch circuit 113 produces an output.

With the output produced from the latch circuit 113, the distance measuring circuit 116 and the light measuring circuit 121 come to perform distance and light measuring operations in a known manner. The results of these operations are converted into binary values by the AD conversion circuits 117 and 122 respectively. The binary measured distance value is applied to the decoder 118. The decoder 118 obtains a necessary lens shifting extent corresponding to the result of the distance measurement and a shutter blade driving degree corresponding to the result of the light measurement. At the same time, the necessary lens shifting extent is divided into a large shifting extent and a small shifting extent by a predetermined method. Then, the decoder 118 produces a first output signal representing the small shifting extent value obtained. The first output signal is supplied to the address register 140. The decoder 118 also produces a second output signal representing the large shifting extent. The second output signal is supplied to the block register 141.

At this time, the switch 102 is closed as mentioned in the foregoing. Therefore, the inverter 110 has an output thereof. The latch circuit 114 also has the output thereof to give an input signal to the decoder 118. The input enables the decoder 118 to perform a computing operation for the long focal length photographing. As a result, the decoder 118 produces and supplies a signal representative of a long shifting extent required for the long focal length photographing to the block register 141. Meanwhile, a signal which represents a very short shifting extent required for shifting the lens to a very short extent within the total extent to which the lens must be shifted is supplied to the address register 140 irrespective as to whether photographing is to be performed at a long focal length or at a short focal length. This signal is stored at the register 140 as a reference value for a very short shifting distance.

When the release button is pushed down to its second stroke position, the latch circuit 115 produces an output to render the AND gate 103 conductive. (At that time, there is no output from the digital comparator 125. Therefore, the inverter 128 has an output therefrom). Accordingly, the OR gate 138 comes to produce an output. As a result, the transistor 139 becomes conductive to have the magnet 32 excited. With the magnet 32 thus excited, the plunger 32a is pulled in the direction of arrow f5 as shown in FIG. 2. Therefore, the first lever 33 is turned round counterclockwise on the shaft 33a against the force of the spring 35. As a result, the pin 31a of the second lever 31 descends. The pawl member 29 is turned round by the force of the spring 30 in the direction of moving away from the teeth of the sector arm 25 to bring the sector arm into a turnable state. Meanwhile, the arm part 33f of the first lever 33 pushes the arm 34a of the third lever 34 toward the front side of FIG. 2. This causes the third lever 34 to turn clockwise round the shaft hole 34b. The pin 34e pushes the arm 12c of the stopper member 12 to cause the member 12 to turn counterclockwise as viewed on FIG. 2 round the shaft hole 12b. Therefore, the fore end hooked claw of the stopper member 12 comes to engage the locking toothed part 1a of the lens barrel 1. The lens barrel 1 is thus temporarily restrained.

After that, in response to the output of the latch circuit 115, the motor control circuit 143 causes the motor 9 to make forward rotation, so that the gear 6 turns round clockwise as shown in FIG. 2 via the force transmission change-over device 8. With the gear 6 turning clockwise, the driving member 23 turns clockwise to have its protrudent part 23a slide down from a point a to a point b on the cam face 22c of the driven member 22. Therefore, the driving member 23 axially moves toward the driven member 22. Then, as mentioned in the foregoing, the restraining force of the converter lens carrying frame 36 is acting on the lens barrel 1 to serve as a load on the driven member 22. Therefore, the member 22 is never driven to turn round during the axial motion of the driving member 23.

When the driving member 23 begins to axially move toward the driven member 22, the force which have been pushing the follower 25c upward as viewed on FIG. 2 (i.e. the force pressing the spring 27 downward) gradually decreases. The spring 27 then begins to elongate to move upward (toward the front of the camera) the stopper member carrying and moving member 26 as viewed on FIG. 2. The member 26 begins to move in the direction of arrow f4. Then, the pin 25b which is pressed against the upper part of the projection 26a of the member 26 is also lifted up. As a result the toothed sector arm 25 begins to turn counterclockwise on this shaft 25a as viewed on FIG. 2.

In this instance, the rotation angle of the stopper member carrying and moving member 26 during its movement in the direction of arrow f4 and that of the toothed sector arm 25 are detected by the motion amount detecting means 19 in the form of an electrical pulse signal. Therefore, the motion amount detecting means 19 of FIG. 6 produces the pulse signal which corresponds to the moving extent of the member 26 and applies it to the input signal terminal of the digital comparator 125. The digital comparator 125 produces an output when the value of this pulse signal becomes equal to a reference value. The output of the comparator 125 is applied to the inverter 128. As a result the output of the inverter 128 disappears. The AND gate 136 then becomes nonconductive. Accordingly the output of the OR gate 138 also disappears. The transistor 139 turns off to demagnetize the magnet 32. Therefore, the plunger 32a is pulled out in the direction of arrow f6 by the force of the spring 35. The first lever 33 then turns round clockwise on the shaft 33a. The second lever 31 turns round clockwise on the shaft 31c. The arm 29b of the pawl member 29 is pushed u by the pin 31a of the second lever 31. The pawl member 29 turns round counterclockwise on the shaft 29a to cause its fore end to engage the teeth of the sector arm 25. This brings the turning movement of the sector arm 25 to a stop. Accordingly the pin 25b of the sector ar 25 also ceases to ascend (movement in the direction of arrow f4). The movement of the stopper member carrying and moving member 26 therefore also comes to a stop. As a result, the stopper member 12 is set in a position away from its original position as much as a distance corresponding to an angle by which the toothed sector arm 25 has turned round.

The arm 33f of the first lever 33 turns clockwise according to the clockwise movement of the first lever 33 with the magnet 32 demagnetized. Therefore, the third lever 34 is caused by the force of the spring 28 to turn counterclockwise round the shaft hole 34b. The force of the spring 28 then causes the stopper member 12 to turn clockwise round the shaft hole 12b. Therefore, the hooked claw of the fore end of the stopper member 12 comes to disengage from the locking toothed part 1a to make the lens barrel ready for forward movement thereof.

After these actions, when the projection 33a of the driving member 23 reaches the point b of the cam face 22c of the driven member 22, the axial movement of the driving member 23 is no longer allowed. Then, the driven member 22 and the driving member 23 together begin to turn round clockwise. As a result, the screw shaft 2 is caused to rotate via the gear 3. The lens barrel 1 then receives a forward moving force from the screw shaft 2. Then, the projection 1i (see FIG. 3) moves forward overriding the maximum protruding part of the engaging part 36e of the converter lens carrying frame 36. This frees the lens barrel from its restrained state.

In the process of shifting the lens barrel 1 to a position required for long focal length photographing as shown in FIG. 4, the force of the spring 37 causes the converter carrying frame 36 to turn round on the carrying shaft 36a until the frame is eventually positioned immediately behind a main lens within the lens barrel.

During the process of the forward movement of the lens barrel 1 on the screw shaft 2, the degree of rotation applied to the screw shaft 2 is detected in the form of pulses produced from the motion amount detecting means 19. This pulse output is applied to the input terminal of the digital comparator 126. When the number of pulses thus applied to the comparator 126 reaches a reference number of pulses stored at the block register 141, the digital comparator 126 produces an output. This makes the AND gate 104 conductive. The transistor 139 turns on to have the magnet 32 excited. With the magnet 32 thus excited, the plunger 32a is sucked and pulled in the direction of arrow f5. Therefore, the first lever 33 is turned round counterclockwise against the force of the spring 35. This turn of the first lever 33 causes the third lever 34 to turn clockwise round the shaft hole 34b. Therefore, the pin 34e pushes the arm 12c of the stopper member 12 to cause the member 12 to turn counterclockwise round the shaft hole 12b. The hooked claw formed at the fore end of the stopper member 12 then plunges in between the locking teeth 1a to bring the forward movement of the lens barrel 1 to a stop. At this time the pawl member 29 is released from the pressure of the first lever 33. However, since the member 29 is engaging the teeth of the sector arm 25, the member 29 is never turned round clockwise by the force of the spring 30.

The stop of forward movement of the lens barrel 1 means the end of a photographing magnification enlarging action and a focusing action.

The motor 9 continues to rotate after the stop of the forward move of the lens barrel. The screw shaft 2 also continues to rotate. Therefore, a forward thrust is applied from the screw shaft 2 to the helicoid ring 1c. As a result of this, the helicoid ring 1c overcomes the force of the spring 21 and moves forward on the screw shaft 2 by coming out of the ring part 1b.

Meanwhile, with the helicoid ring 1c coming forward out of the ring part 1b, the blade driving lever 20 is turned clockwise round the pin 1f by the helicoid ring 1c as viewed on FIGS. 2 and 5. Therefore, the blade driving and opening lever 38 which is pivotally fitted on the pin 1g is turned clockwise on the pin 1g (or the shaft hole 38b). The turn of the lever 38 causes, via the blade releasing pawl 40, the blade driving shaft 42 to turn counterclockwise on the shaft 42b. This causes the shutter blades 44 to turn on the rotation center 44b. The degree of the turn of the shutter blades 44 are detected in the form of the pulses produced from the motion amount detecting means 19. The pulse output of the detecting means 19 is applied to the input terminal of the digital comparator 127. When the number of pulses thus applied to the comparator 127 becomes equal to the reference number of pulses stored at the exposure resistor 142, the digital comparator 127 comes to produce an output. The transistor 139 then turns off to demagnetize the magnet 32. With the magnet 32 demagnetized, the urging force of the spring 35 causes the first lever 33 to turn round clockwise. The pin 40b of the blade releasing pawl 40 is pushed by the fore end of the arm 33g to the right as viewed on the drawing. This causes the pawl 40 to turn round counterclockwise to disengage the shaft part 42b of the blade driving shaft 42 (see FIG. 5). The urging force of the spring 43 is then allowed to turn the blade driving shaft 42 clockwise. The clockwise turn of the shaft 42 closes the shutter blades through the pin 42e.

After that, in response to the output of the comparator 127, the motor control circuit 143 causes the motor 9 to reversely rotate. Then, the helicoid ring 1c first comes to retreat back into the ring part 1b of the lens barrel 1. Following this, the lens barrel 1 is brought back to the furthest retracted position as shown in FIG. 3. In this instance, the projection 23a of the driving member 23 of the differential gear 4 is at first located at the point b on the cam face 22c of the member 22 to be driven. When the driving member 23 is caused to turn round counterclockwise, therefore, the member 22 to be driven does not move until nearly the end of the first turn of the driving member 23 while the driving member 23 makes its axial motion according as it turns round. During this period, the driving member 23 pushes the follower 25c of the toothed sector arm 25 up to its original position. The arm 25 is, therefore, turned clockwise round the shaft 25a back into its initial position. The various members that form the stopper member shifting and positioning means 11 are thus brought back to their initial state before the driving member 23 and the driven member 22 come to join with each other. With the members 22 and 23 thus having joined with each other, they are reversely turned round to retract the lens barrel 1 to its initial position. After a film has been wound by one frame by the prior-known method, the motor 9 stops.

In the embodiment described, all the stopper member shifting and positioning means 11, the responding means 10 and the transmission means 16 and 17 are mechanically arranged. However, these means do not have to be arranged solely in a mechanical manner. The mechanical arrangement of them of course may be replaced with some suitable non-mechanical arrangement.

Figure 7:
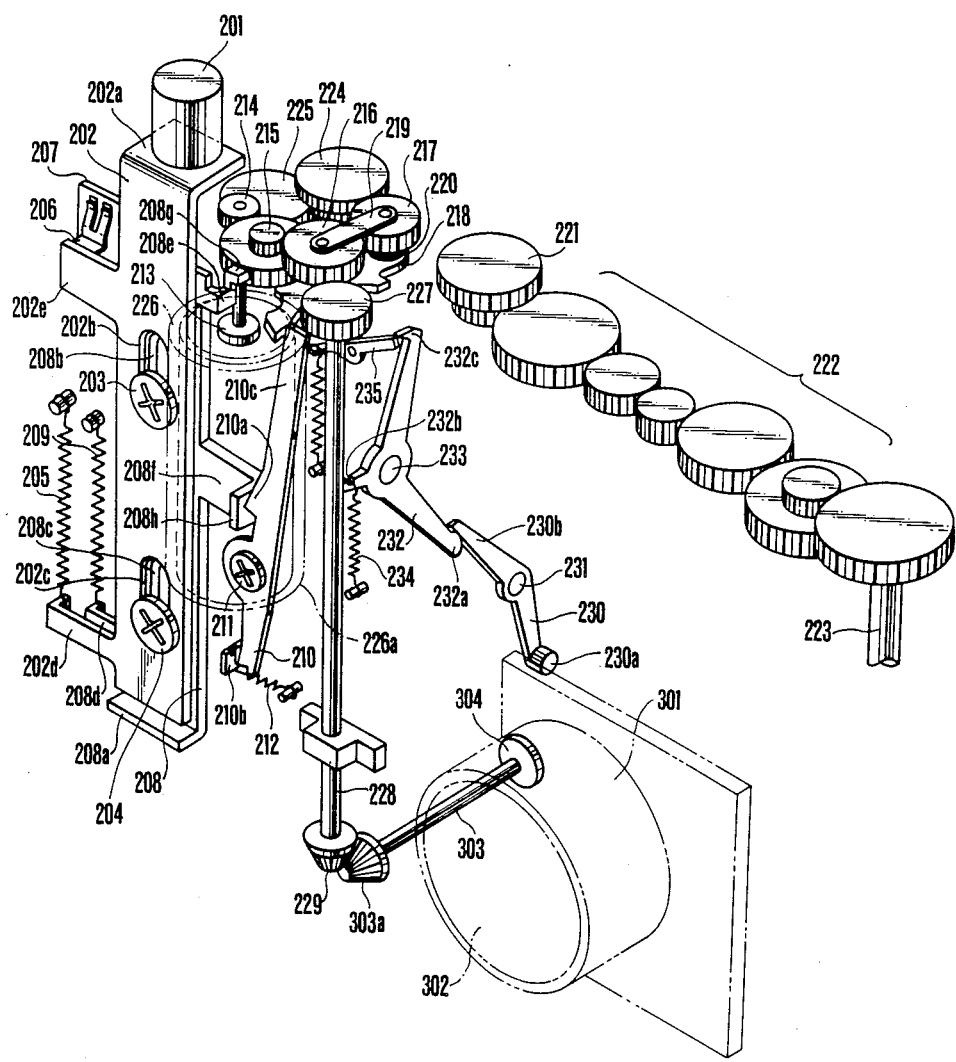
FIG. 7 is an oblique view showing a release operation part and a force transmitting device included in a second embodiment of this invention as in their state obtained before the start of a release action and at the time of resetting.
Figure 8:
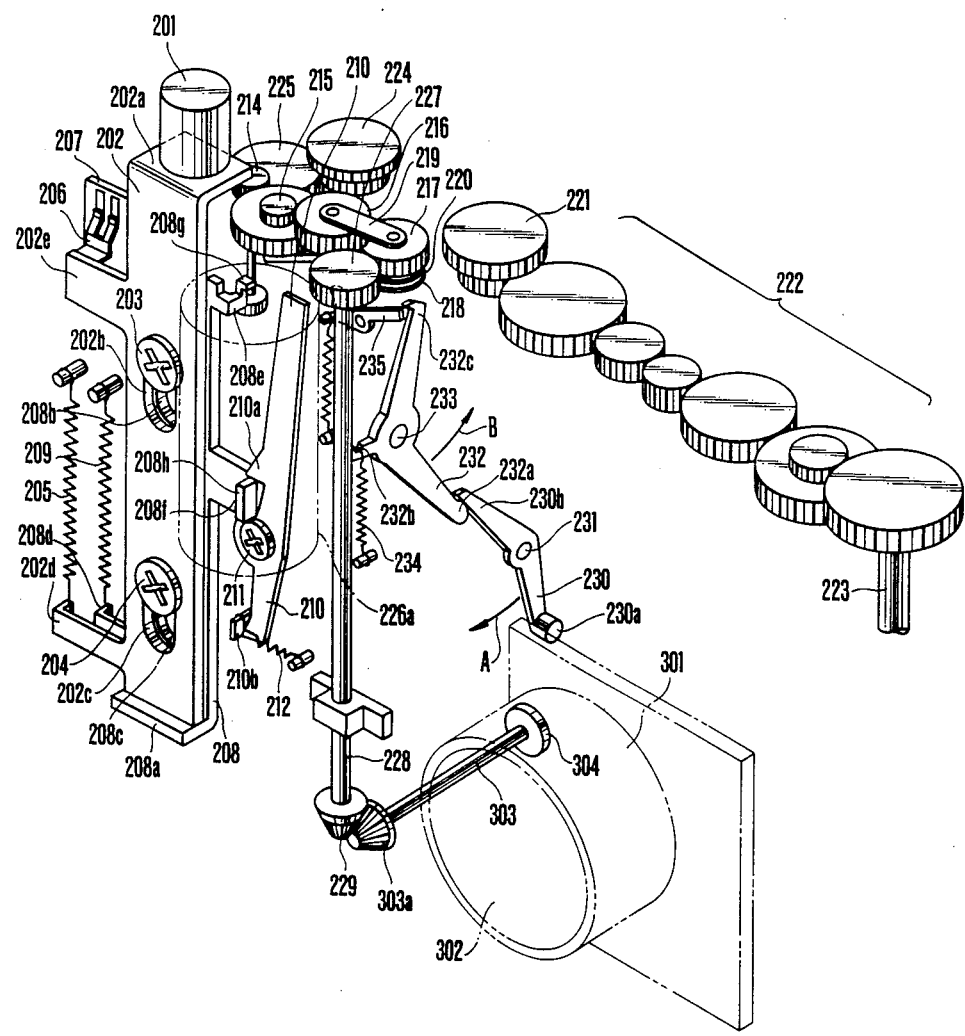
FIG. 8 is an oblique view showing them as in their states obtained at the start of the release action.
Figure 9:
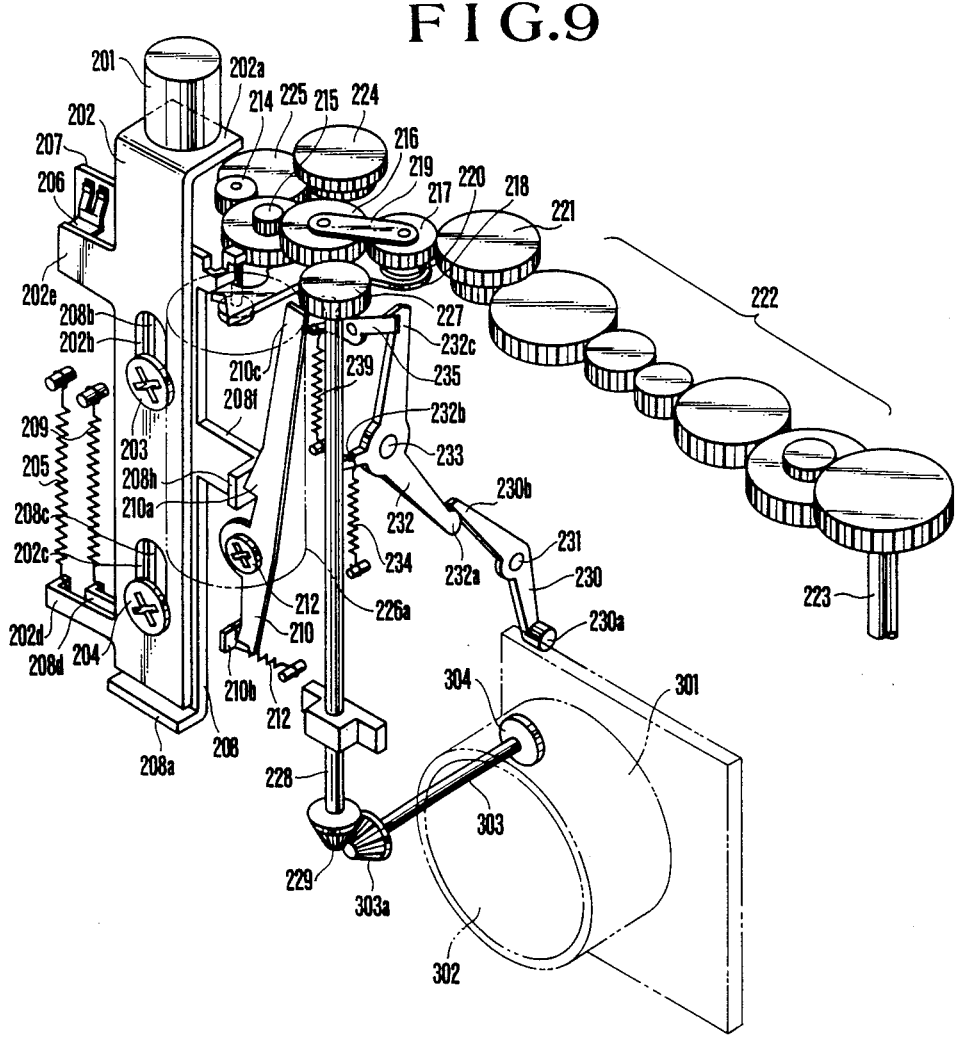
FIG. 9 is an oblique view showing them as in their states obtained during the film rewinding process.

A second embodiment of this invention is arranged as follows: FIGS. 7, 8 and 9 are oblique views showing the mechanical arrangement of the essential parts of the force transmission device and the parts around a release lever of a camera arranged as the second embodiment of this invention. Of these drawings, FIG. 7 shows the embodiment as in a non-photographing state, FIG. 8 a state obtained at the beginning of photographing with a shutter release button operated and FIG. 9 a state obtained during the process of film rewinding respectively.

Referring to FIGS. 7 to 9, a shutter release button 20 which is to be operated by pushing it for starting a photographing operation is secured to an upper bent part 202a of a release lever 202 which is arranged to be slidable up and down (as viewed on FIG. 7) relative to the camera body. The release lever 202 has slots 202b and 202c formed in the longitudinal direction of the lever 202. Screws 203 and 204 are inserted in these slots and are arranged to enable the lever to be slidable up and down being guided by these screws along these slots. The lever 202 further has a spring attaching parts 202d arranged to have a spring 205 which is arranged to urge the lever upward attached thereto and a switch piece carrying part 202e arranged to permit mounting thereon a switch piece 206 which is arranged to slide over a conductive pattern secured to a fixed substrate 207. The conductive pattern formed and secured to the fixed substrate 207 and the switch piece 206 are arranged to jointly serve as a known first stroke switch sw1 and a known second stroke switch sw2 according to the sliding position of the switch piece 206. They are connected to a switch interface which will be described later.

An auxiliary release plate 208 is disposed in parallel with and on the rear side of the release lever 202. A spring 209 which is attached to a spring attaching part 208d provided on the lower side of the plate 208 constantly urges the plate 208 upward. The auxiliary release plate 208 has slots 208b and 208c formed therein to coincide with the slots 202b and 202c of the release lever 202. The plate 208 is arranged also to be slidable up and down in the same manner as the release lever 202 by the aid of the screws 203 and 204 which are inserted also in the slots 208b and 208c. The auxiliary release place 208 is provided with a lower bent part 208a which is arranged to engage the lower end face of the release lever 202 when the release button 201 is pushed down to its first stroke position. Arm parts 208e and 208f are formed on one side of the plate 208 opposite to the side on which the spring attaching part 208d is disposed. At the fore end of the arm part 208e is formed an engaging part 208g which is arranged to engage a part of a planetary lever 218 for the purpose of positioning. Meanwhile the other arm part 208f has a bent part 208h arranged at its fore end to be locked by a claw part 210a of a lock lever 210 which is arranged as follows:

The lock lever 210 is arranged to be turnable on a screw 211 attached to a structural member of the camera which is not shown. The claw part 210a is formed in the intermediate part of the lever 210. The lever 210 is constantly urged to turn counterclockwise by the force of a spring 212 which is attached to a spring attaching part 210b provided at the lower end of the lever. The top part 210c of the lock lever 210 is located within the revolving locus of the planetary lever 218 as will be further described later.

A motor 213 is a drive source for film winding and rewinding to be performed by the camera. In addition, the motor 213 is arranged to drive a lens barrel shifting device for automatic focusing and for change-over between two different focal lengths and also to drive a shutter control device for control over the shutter operation. The motor 213 is disposed within a film winding spool 226 as shown in FIG. 7. The motor rotates in the direction instructed by a CPU and a motor driving circuit which will be described later. A pinion 214 is mounted on the output side of the motor 213. The pinion 214 constantly engages the larger wheel part of a reduction gear 215 which is in the form of a stepped gear. A sun gear 216 which is one of gears forming a planetary gear device engages the smaller wheel part of the reduction gear 215. The above stated planetary gear device consists of the sun gear 216, planetary gear 217, a planetary lever 218 and a planet gear retainer 219. The sun gear 216 and the planetary gear 217 are arranged to rotate relative to the planetary lever 218 and the planetary gear retainer 219. However, since a spring 220 is disposed in a compressed state in between the planetary gear 217 and the planetary lever 218, the gear 217 is unable to rotate until a torque applied thereto becomes greater than a friction torque applied to the spring 220. Hence, the planetary gear 217 does not rotate but revolves together with the planetary lever 218 round the sun gear 216 when the torque applied thereto is less than the friction torque. The shape of the planetary lever 218 and the function of the planetary gear device will be described in detail later on.

A rewinding gear 221 is arranged to transmit a driving force received from the planetary gear 217 to a fork 223 through a rewinding gear train 222 at the time of film rewinding. A winding gear 224 is arranged to transmit at the time of film winding a driving force received from the planetary gear 217 via a reduction gear 225 to a toothed part 226a which is formed in one unified body with a spool 226 as shown in FIGS. 7, 10, 11 and 12.

Figure 10:
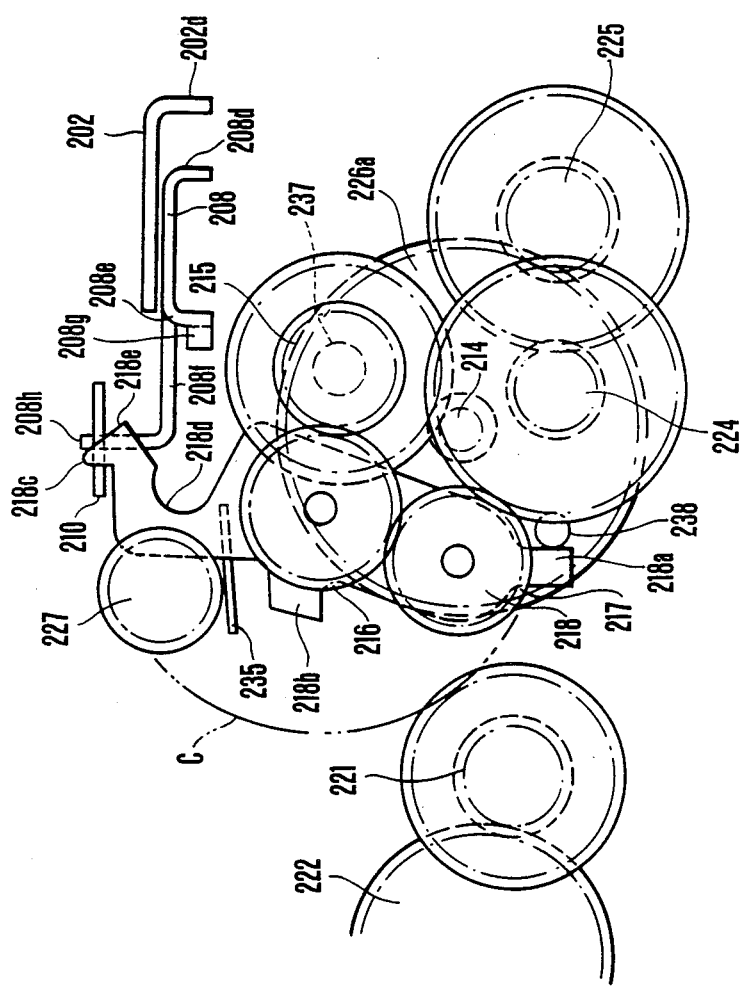
FIG. 10 is a plan view showing the essential parts of the driving force transmitting device of the second embodiment as in their states obtained before the start of the release action and at the time of resetting.
Figure 11:
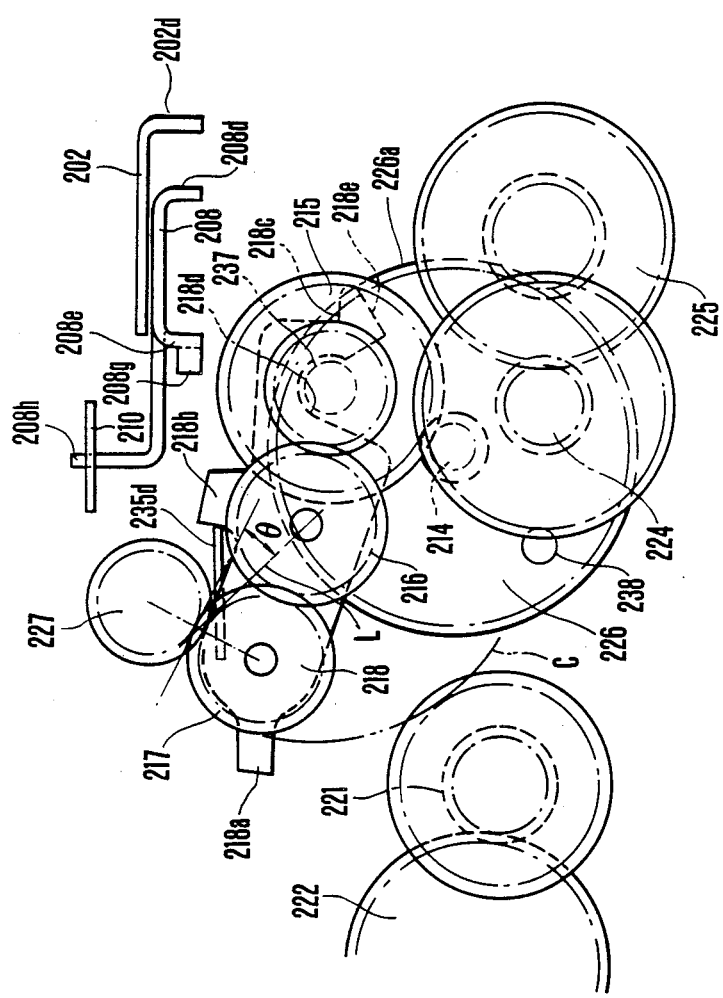
FIG. 11 is a plan view showing them as in their states obtained at the start of the release action.
Figure 12:
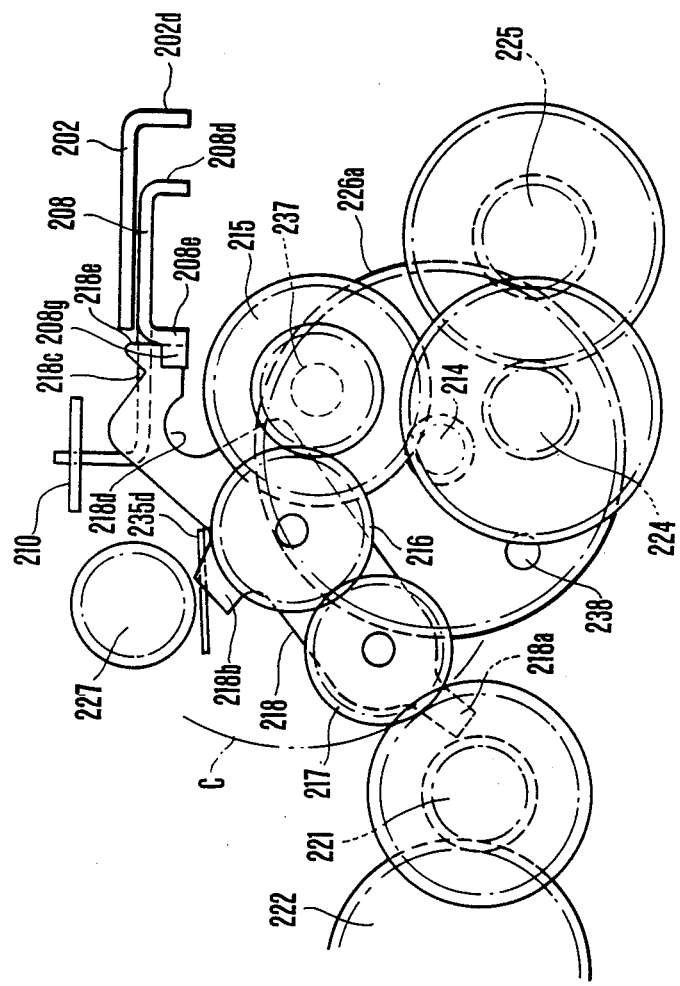
FIG. 12 is a plan view showing them as in their states obtained during film rewinding.

As shown in FIGS. 10 to 12, most of the gears from the rewinding gear 221 to the reduction gear 225 are arranged in the form of stepped gears, each consisting of a small and large gears. They are thus performing a speed reducing function. The actual positional relation among the above stated members is as shown in FIGS. 10 to 12 while, in FIGS. 7 to 10, their positions are partly adjusted for easy understanding of relations among them.

Figure 16:
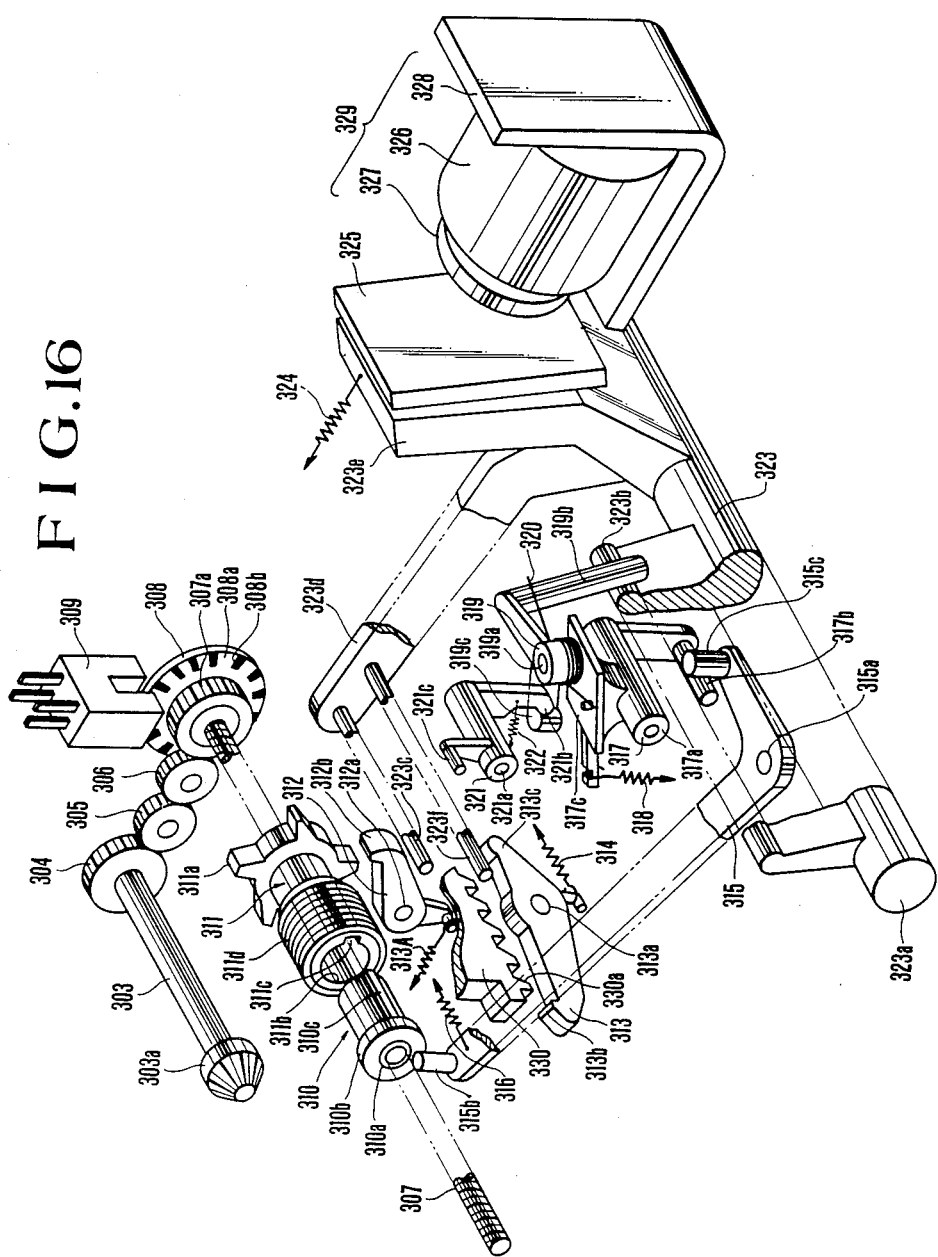
FIG. 16 is an oblique view showing the lens barrel shifting device and the shutter control device of the second embodiment.

A transmission shaft 228 which is arranged to shift the lens barrel 301 in the direction of its optical axis is disposed perpendicularly to the optical axis. A gear 227 which is secured to the upper end of the shaft 228 is arranged within the revolving locus of the planetary gear 217 to engage the gear 217 when the gear 217 revolves clockwise together with the planetary lever 218 and comes from the position of FIG. 7 to an end position as shown in FIG. 8. The rotating force of the transmission shaft 228 is transmitted via bevel gears 229 and 303a to a horizontal shaft 303 and is further transmitted via a gear 304 secured to the shaft 303 to a lens barrel shifting device which is as shown in FIG. 16.

FIGS. 10, 11 and 12 show essential parts including the parts of the planetary gear device, parts and members arranged in sequence from the rewinding gear 221 up to the spool 226, the release lever 202 and the auxiliary release lever 208. FIG. 10 shows the illustration of FIG. 7 in a plan view, FIG. 11 that of FIG. 8 in a plan view and FIG. 12 that of FIG. 9 in a plan view respectively. Some of the gears (gears 215, etc.) are illustrated on the same plane.

As shown in FIGS. 10 to 12, the planetary lever 218 is rotatably fitted on the shaft of the sun gear 216 at a point close to the middle point of the total length thereof. The lever 218 has various engaging parts for engagement with other members, including: A first engaging part 218a which is formed at one end of the lever 218 on the side of the planetary gear 217; a second engaging part 218b which protrudes from a peripheral part located close to the center of revolution; a first engaging face 218c formed in a bent shape at an end part opposite to the above stated first engaging part 218a; a recess 218d formed in a peripheral part opposite to the first engaging face 218c; and a second engaging face 218e formed on the same side as the recess 218d and located opposite to the first engaging face 218c. Further details of them:

The first engaging part 218a is arranged to bring the planetary lever 218 to a stop in the end position of its counterclockwise revolution by engaging a first stopper 238 located close to the winding gear 224. The first engaging part 218a engages the first stopper 238 when the planetary gear 217 is engaging the winding gear 224. The second engaging part 218b is arranged to bring the planetary lever 218 to a stop at a given point when the part comes to engage a lock part 235d provided at one end of a zero setting lever 235 which will be described later. FIG. 11 shows it as in a state of engaging the lock part 235d of the zero setting lever 235.

The first engaging face 218c is arranged to cause the above stated locking lever 210 to turn round by abutting on the top part 210c of the lever 210 when the planetary lever 218 is in the position as shown in FIG. 10. The second engaging face 218e is arranged to serve as a stopper for keeping the planetary gear 217 and the rewinding gear 221 in a mutually engaged state as shown in FIG. 12. Further, under the condition as shown in FIG. 12, the planetary lever 218 is prevented from revolving as the second engaging face 218e is engaging the fore end face of the arm 208e of the auxiliary release plate 208. Under this condition, the shutter release button 201 cannot be operated as the engaging part 208g of the auxiliary release plate 208 abuts on the second engaging face 218e. The recess 218d is arranged to engage a second stopper 237 which is disposed in about the same position as the center of the stepped gear 215. The planetary gear 217 engages a gear 227 when the recess 218d of the planetary lever 218 engages the second stopper 237, so that the lever 218 can be kept in its state as shown in FIG. 11. As obvious from the foregoing, positioning within the revolving locus of the planetary lever 218 (indicated by arrows C in FIGS. 10, 11 and 12) is accomplished by the various members including the stoppers 237 and 238, the various parts of the auxiliary release plate 208 and the lock part 235d of the zero setting lever 235.

In the force transmitting device of this embodiment shown in FIGS. 7 to 12, the planar positional relation between the gears (the rewinding gear 221 and the gear 227) to be driven through engagement with the planetary gear 217 and the planetary gear device is designed on the basis of the following concept of this invention: In the force transmitting device of this embodiment, the planar positional relation and the sizes of the sun gear 216, the planetary gear 217 and the gear 227 are determined to ensure that: When the gear 227 is engaging the planetary gear 217 as shown in FIG. 11, the center of the sun gear 216 is located on a line L which passes through an engaging point between the gear 227 and the planetary gear 217 at an inclination as much as the pressure angle Θ of the gears 227 and 217 relative to a tangent line drawn at the same engaging point. With the gears arranged in this manner, when the planetary gear 217 is driven to turn round clockwise in its state of engaging the gear 227 as shown in FIG. 11, a counterclockwise torque (i.e. a force exerted to separate the planetary gear 217 from the gear 227) which is developed by the engagement of the two gears and acts on the planetary lever 218 becomes almost zero. Therefore, even if the planetary gear 217 turns round both in the forward and reverse directions under the condition of FIG. 11, the planetary gear 217 never comes to disengage from the gear 227 to ensure adequate transmission of a rotating force between the two gears.

Heretofore, it has been impossible to transmit both the forward rotation and the reverse rotation of a planetary gear to one and the same driven gear in a planetary lever type force transmission device of the above stated kind arranged to change the gear engaging the planetary gear from one gear over to another according to the turning direction of the planetary lever. The reason for this impossibility is as described below:

In the case of a planetary gear device of the above stated kind having no ring gear engaging the planetary gear, the planetary lever is greatly affected by a reaction force acting on the planetary gear. Therefore, it has been difficult to keep the planetary gear engaged with a specific driven gear irrespectively of the turning direction of the planetary gear in the planetary gear device of the above stated kind.

Figure 17:
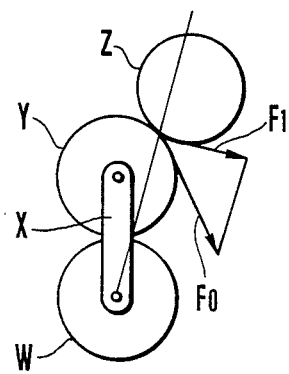
FIGS. 17(A) and 17(B) show relation of driving forces and a method for use of a known driving force transmitting device of the planetary lever type.
Figure 17:
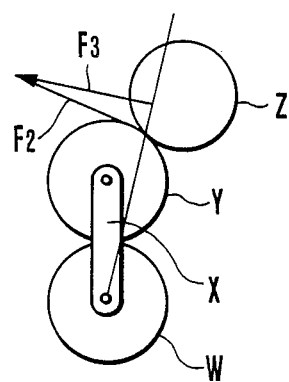

FIGS. 17(A) and 17(B) give a dynamic explanation of the above stated reason. The illustrations includes a sun gear W of the planetary gear device; a planetary lever X; a planetary gear Y and a driven gear Z. When the planetary lever X is revolved clockwise round the sun gear W to cause the planetary gear to engage the driven gear Z as shown in FIG. 17(A) (the sun gear W rotates clockwise and the planetary gear Y counterclockwise), a reaction F0 of the driven gear Z to the planetary gear Y is in the direction of arrow. A component force F1 of the reaction F0 then acts to engage the gear Y with the gear Z. Therefore, the planetary gear Y and the driven gear Z can be naturally kept in a engaged state without applying any external force to them. Further, there develops no force to turn the planetary lever X counterclockwise. However, if the planetary gear Y is caused to rotate clockwise under the condition of FIG. 17(A), a reaction F2 of the driven gear Z is exerted on the planetary gear Y in the direction of arrow as shown in FIG. 17(B). Besides, the component force F3 of this reaction becomes considerably great. Therefore, if this component force F3 comes to act on the planetary lever X to urge the latter to turn counterclockwise, it becomes difficult to retain the planetary lever X in the position illustrated.

Therefore, in using the device of the above stated kind, it has been practiced to transmit a rotating force to the driven gear Z by allowing the planetary gear Y to turn round counterclockwise when the gear Y engages the gear Z; and to cut off the force transmission to the driven gear by separating the gear Y from the gear Z when the planetary gear Y is allowed to turn round clockwise. In short the conventional device has been arranged to serve as one-way force transmission device.

Whereas, in the case of this embodiment, the engagement between the planetary gear and the driven gear is kept stable irrespectively of the turning direction of the planetary gear by appositely setting the relative positions and the relative sizes of the sun gear, the planetary gear and the driven gear. Both the forward and reverse rotations of the planetary gear can be transmitted to one and the same driven gear. Besides, in disengaging the planetary gear from the driven gear, there arises not much reaction on the planetary gear.

Next, referring to FIGS. 13 to 15 along with FIGS. 7 to 9, a zero setting lever 235 which serves as another engaging member or stopper for controlling the revolution of the planetary lever 218 is arranged as follows: As shown in FIGS. 7 to 9, a lens barrel responding lever 230 has a pin-like engaging part 230a arranged at one end thereof to engage the lens barrel 301 and an end part 230b arranged at the other end to abut on one end part 232a of a hook lever 232. The lever 230 turns round on a shaft 231 inserted in its middle hole according as the lens barrel 301 is shifted. The hook lever 232 has, besides the above stated end part 232a which engages the end part 230b of the lever 230, a spring attaching part 232b for a spring 234 which constantly urges the hook lever 232 to turn round counterclockwise on a shaft 233 arranged in parallel with the above stated shaft 231 and a hook part 232c which is arranged to lock one end part 235a of the zero setting lever 235 as shown in FIG. 15.

Figure 13:
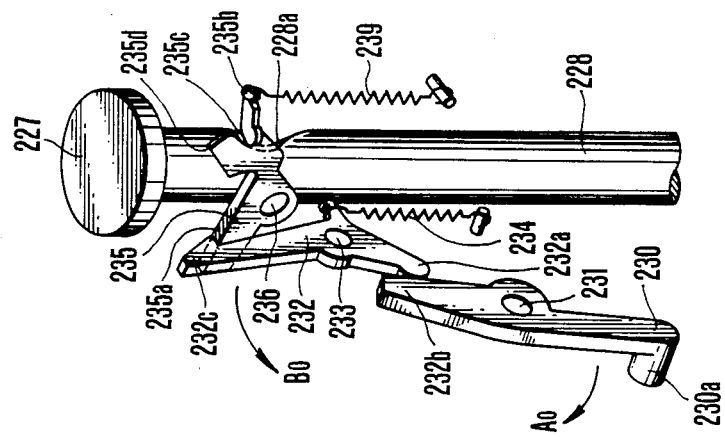
FIG. 13 is an oblique view showing some of members forming the force transmitting device of the second embodiment as in their states obtained before the start of the release action and at the time of resetting.
Figure 14:
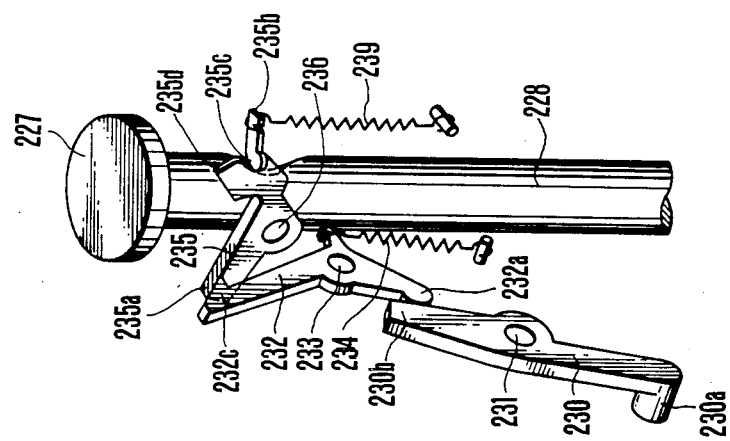
FIG. 14 is an oblique view showing the same members as in their states obtained at the start of the release action.
Figure 15:
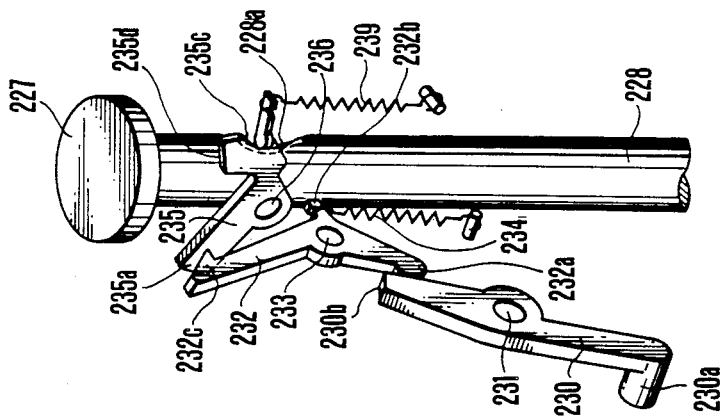
FIG. 15 is an oblique view showing the same members as in their states obtained during film rewinding.

As shown in FIGS. 13, 14 and 15, the zero setting lever 235 is arranged to be turnable on a shaft 236 which extends almost perpendicularly to the shaft 233 of the hook lever 232. The lever 235 includes a lock part 235d which is arranged at the other end of the lever 235 to bring the planetary lever 218 to a stop in a given position by engaging the second engaging part 218b of the lever 218, i.e. to prevent the counterclockwise revolution of the lever 218 (see FIG. 11); a follower part 235c which is arranged to abut a recess 228a formed in the outer circumferential face of a transmission shaft 228 (see FIGS. 13 to 15) and to cause the lever 235 to turn round a shaft 236 following the rotation of the transmission shaft 228; and a spring attaching part 235b which is formed in one body with the follower part 235c. A spring 239 which is attached to the part 235b is arranged to urge the lever 235 to turn round clockwise as viewed on FIGS. 13 to 15. The follower part 235c is thus pressed against the recess 228 a of the shaft 228 by this urging force.

Next, referring now to FIG. 16, the lens barrel shifting device and the shutter control device which is interlocked with the former in the camera of this embodiment are arranged as described below:

In FIG. 16, the bevel gear 303a, the shaft 303 and the gear 304 are already shown in FIGS. 7 to 9. A gear 304 is arranged to receive the driving force of a motor 213 via the gear 227, the planetary gear 217, etc. The rotation of the gear 304 is transmitted to a gear 307a via gears 305 and 306 and is then transmitted to a helicoid shaft 307 to which the gear 307 is secured. A screw is formed on the outer circumferential surface of the helicoid shaft 307 at a predetermined pitch. The shaft 307 forms the lens barrel shifting device in conjunction with moving members described in the following: On the helicoid shaft 307 is mounted a pulse sheet 308 which is provided with a pattern formed thereon by a transparent part 308a and an opaque part 308b for detecting the shifted extent of the lens barrel 301. A photo coupler 309 is arranged on both sides of the pulse sheet 308 to optically detect the rotation of the pulse sheet 308 and to convert it into an electrical pulse signal. A first moving member 310 which is in a tubular shape is fitted on the helicoid shaft 307 with a screw hole 310a arranged to engage the screw of the shaft 307. The moving member 310 is arranged to axially move on the shaft 307 according as the shaft 307 rotates. The moving member 310 has a flange part 310b formed at its fore end; and one column of key 310c axially formed on the outer circumferential surface of the member 310. With the exception of this key 310c, the whole circumferential surface is finished in a smooth tubular surface.

A second moving member 311 is fitted on the outer circumferential surface of the first moving member 310 with a ratchet 311a formed at the rear end of the second moving member. A hole 311b axially piercing the center of the moving member 311 is provided with a key way 311c which is arranged to have the key 310 of the first moving member 310 fitted therein in such a way as to be slidable relative to each other. In other words, the second moving member 311 is capable of axially moving on the first moving member 310 relative to the latter but is incapable of rotating relative to the latter. Further, the diameter of the axial hole 311b of the second moving member 311 is smaller than the outside diameter of the flange part 310b of the first moving member 310 The flange part 310b thus prevents the second moving member 311 from moving forward further than it and thus serves as a stopper.

A screw part 311d is formed in the fore end outer circumferential part of the second moving member 311 at a pitch which is, say, ¼ of the pitch of the screw formed on the helicoid shaft 307. The screw part 311d is arranged to be screwed into a screw hole of the lens barrel 301 as will be described later. The lens barrel 301 is thus carried by the second moving member 311 and also by the helicoid shaft 307 via the first and second moving members 310 and 311. The lens barrel is thus axially shiftable on the helicoid shaft 307. Further, the lens barrel 301 is axially movable relative to the second moving member 311 In other words, the helicoid shaft 307 and the first and second moving members 310 and 311 jointly form a lens barrel shifting device. The screw on the helicoid shaft 307 serves as a coarse feeding part and the screw part 311d on the second moving member 311 a fine feeding part in the lens barrel shifting device.

The ratchet wheel 311a which is formed in one body with the second moving member 311 forms in conjunction with a lock pawl 312 which will be described later a feeding change-over device for change over between feeding actions by the above stated two feeding parts. Meanwhile, the above stated lock pawl 312 is arranged to prevent the second moving member 311 from rotating.

The lock pawl 312 is carried by the lens barrel 301 in such a way as to be turnable on a shaft 312a which is arranged in parallel with the helicoid shaft 307. The pawl 312 is disposed close to the peripheral part of the ratchet wheel 311a and is constantly urged by a spring 313A to turn clockwise round the above stated shaft 312a. The engaging claw 312b of the pawl 312 is thus normally kept in a state of being retracted from each tooth of the ratchet wheel 311a. A force for turning the lock pawl 312 counterclockwise on the shaft 312a is obtained by an armature lever 323 (described in detail later) which is provided with a pin 323c for pushing the pawl 312 upward.

A locking toothed member 330 having its saw like teeth aligned in parallel with the helicoid shaft 307 is carried by a constructive member (not shown) to be slidable in parallel with the helicoid shaft 307 and is arranged to follow the second moving member 311. A stop pawl 313 which is arranged to stop the forward movement (toward the front of the lens barrel 301) of the locking toothed member 330 at a given point is carried by a structural member (not shown) in such a way as to be turnable on a shaft 313a. The stop pawl 313 has a claw part 313b at one end and is urged by a spring 314 to turn counterclockwise on the shaft 313a as shown in FIG. 16. The rear end part 313c of the stop pawl 313 is arranged to be pushed down by a pin 323f which is secured to the arm 323d of the armature lever 323.

As obvious from the above description, the stop pawl 313 and the locking toothed member 330 jointly form a lens barrel stopping device for bringing the movement of the lens barrel to a stop at a desired point.

While the parts related to the lens barrel shifting device and the lens barrel stopping device are arranged as described in the foregoing, parts related to the shutter control device and a control arrangement for controlling the above stated various devices are arranged as described below:

A forked lever 315 which is turnable on a shaft 315a is carried by the lens barrel 301. A pin 315b which is provided at the fore end of one arm of the lever 315 is abutting on the fore end face of the first moving member 310. Another pin 315c which is provided at the fore end of the other arm of the lever 315 is abutting on one arm 317b cf a shutter blade opening lever 317. The lever 315 is constantly urged by a spring 316 to turn clockwise on the shaft 315a as shown in FIG. 16.

The blade opening lever 317 is an essential part of the shutter control device and is carried by the lens barrel 301 to be turnable on a shaft 317a which extends in parallel with the helicoid shaft 307. The lever 317 has a flat arm 317c and a pin-like arm 317b and is urged by a spring 318 to turn counterclockwise as shown in FIG. 16. The arm 317c of the lever 317 carries a blade release lever 319 which is turnable on a shaft 319a. The lever 319 has two arms 319b and 319c and is urged by a spring 320 to turn counterclockwise on the shaft 319a as viewed on FIG. 16. A blade driving lever 321 which is turnable on a shaft 321a extending in parallel with the helicoid shaft 307 is also carried by the lens barrel 301. One arm 321b of the lever 321 engages one arm 319c of the blade release lever 319. A pin 321c disposed on the other arm of the lever 321 is inserted in a piercing hole provided in a shutter blade which is not shown and is thus arranged to drive the shutter blade. The driving lever 321 is normally urged to turn clockwise on the shaft 321a by a spring 322 which is attached to the arm 321b. The positions of the lock pawl 312, the stopping pawl 313 and the blade release lever 319 are under the control of the armature lever 323. The posture of the armature lever 323 of the lever 323 is controlled by an electro-magnet 329 which is arranged to be excited and demagnetized in accordance with instructions issued from a CPU which will be described later.

The armature lever 323 is carried by a structural member of the camera body or the like in such a way as to be turnable on a shaft 323a which is in parallel with the helicoid shaft 307. The lever 323 has an arm 323b which engages the arm 319b of the blade release lever 319; an arm 323d which carries pins 323c and 323f; and another arm 323e which carries a flat-shaped armature 325. A spring 324 is arranged to urge the lever 323 to turn counterclockwise on the shaft 323a. The electromagnet 329 which is opposed to the lever 323 is an electromagnetic driving member arranged to control the lens barrel shifting device and also to drive the shutter control device. The magnet 329 is secured to a stationary part of the camera body through a yoke 328. A shaft yoke 327 which protrudes from a coil 326 disposed on the yoke 328 is arranged to suck and pull the armature 323.

The operation of the mechanical parts of the camera of this embodiment is as described below with reference to FIGS. 7 to 16 while the arrangement and the opeartion of electrical parts will be described later:

First, when the camera is not operated for photographing, i.e. when the release button 1 is not operated, the camera is in the following condition. The positional relation among various parts in this instance is as shown in FIGS. 7, 10 and 13. The lens barrel 301 stays in a position closest to the pulse sheet 308 as shown in FIG. 16. The lock pawl 312 is not engaging the ratchet wheel 311a. The claw part 313b of the stop claw 313 is located in between the teeth 330a of the locking toothed member 330. However, there is provided some clearance between the claw part 313b and the teeth 330a. Further, since the electro-magnet 329 is not excited, the armature 325 is not sucked and pulled by the magnet 329. Therefore, the armature lever 323 is in a state of being urged counterclockwise by the spring 324.

The planetary gear 217 is engaging the winding gear 224 as shown in FIGS. 7 and 10. Therefore, the planetary gear device is in a state of transmitting the driving force only to the film winding device. Further, the arm 208e and the engaging part 208g of the auxiliary release plate 208 are located on the revolving locus of the planetary lever 218. Further, the end part 235a of the zero setting lever 235 is away from the hook part 232c of the hook lever 232. The follower part 235c of the lever 235 is located in the recess 228a of the transmission shaft 228. The lock part 235d of the lever 235 is located lower than the revolving locus of the planetary lever 218.

When the release lever 202 is pushed down to its first stroke position with the shutter release button 201 operated by the photographer, the lower end of the lever 202 hits the bent part 208a of the auxiliary release plate 208. Then, the downward sliding move of the lever 202 temporarily comes to a stop. At that time, the sliding switch piece 206 which is secured to the arm 202e of the release lever 202 also slides down over the conductive pattern of the substrate 207 and comes to a stop in a first predetermined position. This state indicates that a first stroke switch sw1 which will be described later has turned on. A signal representing the ON state of the switch sw1 is supplied to the CPU via a switch interface which will be described later. Then, battery check, light measuring and distance measuring actions begin to be performed in known manners respectively. These actions will be described in details in the description of the electrical operation given later.

When the release button 201 is further operated or pushed down further, the release lever 202 and the auxiliary release plate 208 slide downward together. The arm 208e and the engaging part 208g for positioning the auxiliary release plate 208 come down below the revolution plane of the planetary lever 218. Meanwhile, the fore end bent part 208h of the lower arm 208f of the auxiliary release plate 208 comes below the claw part 210a of the lock lever 210. The bent part 208h is then locked by the claw part 210a as shown in FIG. 8. The auxiliary release plate 208 is kept in the position of FIG. 8. In this instance, the sliding switch piece 206 which is in one unified body with the release lever 202 also slide down along the conductive pattern of the substrate 207 and comes to a stop in a second predetermined position as shown in FIG. 8. That indicates turning on of a second stroke switch sw2 which will be described later. A signal representing the ON state of the switch sw2 is supplied to the CPU via the switch interface. In FIG. 8, the planetary gear 217 and the gear 227 are shown in a state of having already come to engage each other. However, this state does not obtained before commencement of power supply to the motor 213. The planetary gear 217 still remains in a position as shown in FIGS. 7 and 10 before the power supply to the motor.

With the ON signal of the second stroke switch sw2 generated as mentioned above, the CPU produces a rewind signal REWIND for causing the reverse rotation (clockwise rotation as viewed on FIG. 10) of the motor 213. In response to this signal, the motor is started by a motor driving circuit and begins to reversely rotate. Then, referring to FIGS. 7 and 10, the reduction gear 215 rotates counterclockwise. The sun gear 216 which engages the gear 215 rotate clockwise. With the sun gear 216 beginning to rotate clockwise, the planetary gear 217 which is receiving the rotation of the sun gear 216 does not at first rotate because of a friction torque. The torque applied to the planetary gear 217 becomes a force causing the planetary lever 218 to turn clockwise on the shaft of the sun gear 216 as shown in FIG. 10. As a result, the planetary lever 218 begins to revolve clockwise from the position of FIG. 10. Then, the planetary gear 217 first comes to engage the rewinding gear 221. However, the rewinding gear 221 has its outer circumference disposed on the revolving locus C of the outer circumferential face of the planetary gear 217. Besides, in this instance, there is no stopper for stopping the revolution of the planetary lever 218. Furthermore, the planetary gear 217 is under a torque urging it to turn counterclockwise. Therefore, when it engages the rewinding gear 221 for once, the planetary gear 217 momentarily turns counterclockwise. However, since the resistance torque of the rewinding gear 221 is greater than the rotation torque of the gear 217, the planetary gear 217 revolves along the outer circumference of the rewinding gear 221 while rotating itself. As a result, the planetary gear 217 and the planetary lever 218 pass the rewinding gear 221. Immediately after this, the planetary gear 217 resumes its non-rotating state and continues to revolve toward the gear 227 together with the planetary lever 218. Then, when the planetary gear 217 comes to engage the gear 227 (see FIG. 11), the clockwise revolution of the planetary lever 218 comes to a stop. AT this time, the recess 218d of the planetary lever 218 comes into contact with the stopper 237, so that the clockwise revolution of the lever 218 can be stopped without fail.

When the planetary gear 217 thus comes to engage the gear 227 as shown in FIGS. 8 and 11, the planetary gear 217 comes to have a greater torque than the friction torque due to the spring 220. moreover, the clockwise revolution of the planetary lever 218 is stopped. The torque given from the sun gear 216 to the planetary gear 217 becomes a torqe for turning the planetary gear 217. Therefore, planetary gear 217 comes to rotate counterclockwise to cause the gear 227 to rotate clockwise.

After the planetary gear 217 comes to engage the gear 227 as shown in FIGS. 8 and 11, the follower part 235c of the zero setting lever 235 remains in the recess 228a of the transmission shaft 228 for a while. Accordingly, the zero setting lever 235 and the hook lever 232 are in their states as shown in FIG. 13. However, when the transmission shaft 228 is rotated clockwise via the gear 227, the follower part 235c of the zero setting lever 235 pulls out of the recess 228a of the shaft 228 and comes up on the outer circumferential face of the shaft 228. Therefore, the end part 235a of the zero setting lever 235 is pushed down to a position lower than its position of FIG. 13 as shown in FIG. 14. Following this, the lock part 235d of the zero setting lever 235 moves up to come above the revolution plane of the planetary lever 218. Then, the lock part 235d comes to protrude to a position close to the second engaging part 218b of the planetary lever 218 as shown in FIG. 11. Therefore, the lock part 235d thus becomes a stopper for preventing the counterclockwise revolution of the planetary lever 218. With the transmission shaft 228 rotated in the above stated manner, the rotation of it is transmitted to the bevel gears 229 and 303a, the shaft 303 and the gears 304, 305, 306 and 307 one after another. This causes the helicoid shaft 307 to rotate.

As mentioned in the foregoing, the lens barrel shifting device includes engaging parts, or feeding parts, of different pitches which are arranged to bring about relative axial movement between the helicoid shaft 307 and the first moving member 310 and between the screw part 311d of the second moving member 311 and the screw hole of the lens barrel 301. Therefore, when the helicoid shaft 307 rotates, there might arise some relative rotation and relative axial movement at these two engaging parts. In this case, however, the pitch of the screw part 311d of the second moving member 311 is smaller than that of the screw of the helicoid shaft 307 (¼, for example). Besides, there is not much resistance. Therefore, when the helicoid shaft 307 rotates, the relative axial movement first takes place between the second moving member 311 and the lens barrel 301 at the screw part 311d of the moving member 311. Accordingly, in this case, the first and second moving members 310 and 311 rotate together with the helicoid shaft 307. As a result, the lens barrel 301 begins to be shifted with a very fine pitch of movement in the direction of the optical axis of a photo taking lens which is not shown but is carried by the lens barrel. Then, the lock pawl 330 is kept stopping since the second moving member 311 does not move in the direction of the optical axis.

With the lens barrel 301 thus beginning to be shifted forward, the lens barrel responding lever 230 which has its engaging part 230a engaging the lens barrel 301 at one end comes to turn round on the shaft 231 in the direction of arrow A as shown in FIG. 8. Therefore, the other end 230b of the lever 230 moves clockwise while pushing the end part 232a of the hook lever 232. This causes the hook lever 232 to be turned round by the force of the spring 234 on the shaft 233 in the direction of arrow B. Accordingly, the hook part 232c of the upper end of the hook lever 232 turns counterclockwise on the shaft 233 as shown in FIG. 8 (i.e. in the direction of approaching the end part 235a of the zero setting lever 235). As a result, the hook part 232c comes to engage the end part 235a of the zero setting lever 235 and prevents the end part 235a from moving upward as shown in FIG. 15. After this, therefore, the zero setting lever 235 is prevented by the hook lever 232 from turning round even when its follower part 235c comes to be ready for falling into the recess 228a of the transmission shaft 228. Therefore, the follower part 235c does not fall into the recess 228a and stays in the state of FIG. 15 as long as the lens barrel 301 is on the forward move from its initial position. Assuming that the lens barrel 301 moves 2 mm per turn of the transmission shaft 228, for example, the hook lever 232 comes to lock the zero setting lever 235 when the lens barrel 301 moves 1 mm. Under the condition as shown in FIGS. 14 and 15, the lock part 235d of the zero setting lever 235 forward onto the revolution plane of the planetary lever 218 to engage the engaging part 218b of the lever 218. In other words, the lock part 235d comes to serve as a stopper restricting the counterclockwise revolution of the planetary lever 218.

The distance to which the screw part 311d of the second moving member 311 is axially shifted by the lens barrel 301 is detected by a photo coupler 309 in terms of the number of turns made by the helicoid shaft 307. Position information obtained every moment is sent to the CPU. Upon receipt of the information, the CPU makes a check to see if the extent of the forward movement of the lens barrel 301 has reached a given value in a manner as will be described in detail later on. Upon detection of attainment of the value, CPU causes the electro-magnet driving circuit to excite the electromagnet 329. With the electro-magnet 329 excited, the armature 325 is sucked and pulled by the magnet. The armature lever 323 which carried the armature comes to turn round the shaft 323a clockwise as viewed on FIG. 16. The pin 323c which is secured to the arm 323d of the lever 323 moves upward to cause the lock pawl 312 to turn round its shaft 312a counterclockwise as viewed on FIG. 16. The claw part 312b plunges in between the claws of the ratchet wheel 311a. This brings the rotation of the ratchet wheel 311a (counterclockwise as viewed on FIG. 16 in this instance) to a stop.

As a result, the rotation of the second moving member 311 which is in one unified body with the ratchet 311a also comes to a stop. The first moving member 310 which engages the second moving member 311 via the key 310c ceases to rotate. After that, therefore, relative rotation and relative axial move take place solely between the helicoid shaft 307 and the first moving member 310. The lens barrel 301 then begins to move further forward on the helicoid shaft 307 together with the first and second moving members 310 and 311 at a coarse feeding pitch. Hereinafter, the fine feeding pitch control over the lens barrel 301 will be called a first control.

The extent of the forward movement of the lens barrel 301 after the stop of rotation of the ratchet wheel 311a is also detected in terms of the number of turns of the helicoid shaft 307 by the photo coupler 309 and the photo coupler detecting circuit. Then, position information obtained at every moment is supplied to the CPU. Then, in the same manner as mentioned in the foregoing, the CPU checks the extent of the forward movement of the lens barrel to see if it has moved a given value of distance from the above stated position. Upon detection of attainment of this value, the electro-magnet driving circuit is caused to cut off power supply to the electro-magnet 329 to demagnetise the magnet.

Upon demagnetisation of the magnet 329, the aramture 325 comes away from the magnet. The force of the spring 324 causes the armature lever 323 to turn round counterclockwise as viewed on FIG. 16. The pin 323f which is secured to the arm 323d of the armature lever 323 moves down to push down the end part 313c of the stopping pawl 313. As a result, the claw part 313b disposed at the other end of the pawl 313 plunges in between the teeth of the locking toothed member 330 to stop the forward move of the member 330. This in turn brings the forward move of the second moving member 311 and the lens barrel 301 to a stop. The lens barrel 301 then stops at a given position (determined on the basis of a measured distance value obtained by an AF processing circuit which will be described later). In this instance, the lock pawl 312 is kept in a state of engaging the ratchet wheel 311a by the bite of the lock pawl 312 with the ratchet wheel 311a. This keeps the second moving member 311 in a state of being prevented from rotating. This coarse feeding pitch control over the lens barrel 301 hereinafter will be called a second control.

Both the first control and the second control are for controlling the extent to which the lens barrel 301 is to be drawn out. The control operation must be accurately and quickly accomplished on many feeding teeth. The details of arrangement for this are as described by way of example below:

Assuming that the lens barrel delivery or feeding pitch is 0.25 mm and a total stroke 18 mm, the total number of feeding teeth becomes 72 (18/0.25). With some delay time after exciting the electro-magnet 329 and before plunging of the claw part 312b of the lock pawl 312 into the teeth of the ratchet 311a and fluctuations due to noises taken into consideration, arrangement to give a length of time of 10 ms per tooth generally permits adequate control with a sufficient margin. In that instance, the length of time required for drawing out the lens barrel to the maximum delivery extent of 18 mm becomes 720 ms (72×10), which is extremely long.

In the case of this embodiment, the screw part of the helicoid shaft 307 is provided with a helicoidal male thread having a degree of lead 5 while, in the screw part 311d of the second moving member 311, a male thread of lead 1 is formed. The helicoid shaft shaft 307 is arranged to make one turn in 40 ms by the gear ratio and a circuit arrangement which will be described later. The ratchet wheel 311a has five claws or teeth evenly spaced. The lock or stopping member 330 is provided with 17 teeth which are formed at intervals of 1 mm. Since the ratchet wheel 311a has five claws for one turn of the screw of lead 1, the lens barrel feeding extent per claw is 0.25 mm and the length of time required for this is 10 ms. Meanwhile, the lens barrel feeding extent of the locking toothed member 330 is five teeth per turn of the helicoid shaft 307 as the lens barrel 301 is drawn out 4 mm by one turn of the helicoid shaft the screw of which has a degree of lead 5 and the time required for each tooth is 10 ms.

In drawing out the lens barrel 301 7.75 mm, for example, the lens barrel 301 is shifted to an extent of 0.75 mm by the screw part 311d of the second moving member 311. In other word, the second moving member comes to a stop by allowing the lock pawl 312 to plunge at the third claw of the ratchet wheel 311a. After that, the toothed member 330 is allowed to shift 7 mm. It is brought to a stop by allowing the claw part 313b of the stopping pawl 313 to plunge at the seventh tooth of the member 330. By this, the lens barrel 301 is drawn out 7.75 mm in all. According to the conventional arrangement, this feeding extent of 7.75 mm corresponds to 31 teeth (=7.75/0.25) requiring 310 ms (=31×10) for control. Whereas, in the case of this embodiment, the first control requires 3 claws and 30 ms and the second control requires 7 teeth and 70 ms, so that control can be accomplished with a total period of only 100 ms.

In drawing out the lens barrel to a maximum extent of 18 mm, 40 ms is necessary with four claws (for feeding 1 mm) for the first control and 170 ms with 17 teeth (for feeding 17 mm) for the second control, so that control can be accomplished in a total of 210 ms, while the conventional arrangement requires 720 ms for the same control. Therefore, a larger delivery stroke can be controlled in a shorter period of time. While a relatively large delivery extent of the lens barrel 301 has been taken up by way of example in the foregoing description, it goes without saying that, in accordance with this invention, delivery control can be accomplished with a higher degree of resolution by finely dividing the conventional stroke within a shorter period of time. Further, although it is not mentioned in detail in the foregoing description of embodiment, change-over from one focal length to another is also effected concurrently with the focusing operation on the photo taking lens (not shown) as will be further described later.

The helicoid shaft continues to rotate after completion of the position control (the first and second control actions) on the lens barrel 301. However, since both the lens barrel 301 and the second moving member 311 are prevented from moving any further, the first moving member 310 alone moves forward on the helicoid shaft 307. As a result, the member 310 comes further forward than the second member 311. Then, the pin 315b mounted on one arm of the lever 315 which is carried by the lens barrel 301 is pushed by the fore end face of the first moving member 310. It causes the lever 315 to turn round counterclockwise on the shaft 315a. Therefore, the pin 315c mounted on the other arm comes to push the arm 317b of the blade opening lever 317. The blade opening lever 317 is thus caused to turn clockwise on its shaft 317a as shown in FIG. 16. Then, arm 321b of the blade driving lever 321 is caused, via the arm 319c of the blade release lever 319 secured to the lever 317, to be turned round counterclockwise on the shaft 321a. This causes the other arm also to turn round counterclockwise on the shaft 321a. As a result the shutter blades which are not shown but are fitted on the pin 321c on the other arm come to open to effect an exposure.

The shutter opening degree from the start of exposure and the end thereof is also detected by the photo coupler 309 in terms of the number of turns of the helicoid shaft 307 in the same manner as in the case of the first and second control actions. When a value corresponding to the number of turns of the helicoid shaft 307 is found by the CPU to have come to coincide with a measured light value obtained from an AE processing circuit, thus indicating attainment of an apposite shutter opening degree, the CPU again produces a signal for starting power supply to the electro-magnet 329. Meanwhile, power supply for the reverse rotation of the motor 213 is cut off. With the power supply start signal produced for the electro-magnet 329, the magnet is excited to suck and pull the armature 325. The armature lever 323 again comes to turn round clockwise on its shaft 323a. The arm 323d and the pin 323f move upward to release the end part 313c of the stopping pawl 313 from a pressing force. However, the claw part 313b of the stopping pawl 313 does not come off the the locking toothed member 330 because of its engagement with the teeth 330a of the latter.

Meanwhile, clockwise turn of the arm 323b of the armature lever 323 causes the arm 319b of the blade release lever 319 to turn clockwise on its shaft 319a. Therefore, the other arm 319c also turns in the same direction to move away from the arm 321b of the blade driving lever 321. As a result, the force of the spring 322 causes the blade driving lever 321 to turn clockwise on its shaft 321a. The shutter blades which are fitted on the pin 321c of the lever close to end the exposure. Hereinafter, the above stated control over the shutter control device will be called a third control.

When a signal indicative of the OFF state of the second stroke switch sw2 is generated with the release button 1 released from the pushing operation performed thereon by the photographer, the CPU produces a winding signal WIND for causing the motor 213 to make forward rotation. With the motor 213 thus beginning to make forward rotation, the sun gear 216 of FIG. 11 rotates counterclockwise. The planetary gear 217 begins to rotate clockwise. The counterclockwise rotation of the sun gear 216 applies a counterclockwise revolving force to the planetary lever 218. However, since the lock part 235d of the zero setting lever 235 is engaging the engaging part 218 of the planetary lever 218 as mentioned in the foregoing, the lever is unable to revolve counterclockwise. Therefore, the planetary gear 217 remains in a state of engaging the gear 227. As a result, a load torque greater than the friction torque given by the spring 220 is applied to the planetary gear 217. This causes the planetary gear 217 to be rotated clockwise by the sun gear 216 in its position as shown in FIG. 11. Accordingly, the gear 227 comes to rotate counterclockwise.

The force of the counterclockwise rotation of the gear 227 is transmitted to the helicoid shaft 307 via the transmission shaft 228, the bevel gears 229 and 303a and the gears 304 to 307a. The helicoid shaft 307 then comes to rotate in the direction reverse to the previous rotating direction. By then, the lens barrel 301, the first moving member 310 and the second moving member 311 move in the direction reverse to the previous one and return to the respective initial positions.

During the process of return of the lens barrel 301 to its initial position, the end part 230a of the lens barrel responding lever 230 is moved in the direction of arrow Ao as shown in FIG. 15. Therefore, as shown in FIG. 15, the hook lever 232 turns round in the direction of arrow Bo. Then, as shown in FIGS. 8 and 15, the hook 232c of the hook lever 232 comes away from the end part 235a of the zero setting lever 235. The lever 235 is then caused by the force of the spring 239 to turn round on the shaft 236 clockwise as viewed on FIG. 14. The follower part 235c which has been away from the outer circumferential face of the shaft 228, therefore, comes into contact with the shaft 228. At the same time, the engaging part 235d of the lever 235 comes down below the revolution plane of the planetary lever 218. This action takes place when the lens barrel 301 comes close to its initial position. When the shaft 228 further rotates, the follower part 235c of the zero setting lever 235 falls into the recess 228a of the shaft 228. Then, there obtains the condition of FIG. 13 and the lens barrel reaches its initial position.

Upon arrival of the lens barrel 301 at the initial position, various forces on the planetary lever 218 causes the lever 218 to make counterclockwise revolution to move away from the gear 227 and toward the rewinding gear 221 as shown in FIG. 11. The planetary gear 217 then comes to engage the rewind gear 221 for once. However, since no stopper is provided for retaining the planetary lever 218 there, the planetary gear 217 passes the rewind gear 221 in the same manner as in the case of the clockwise revolution mentioned in the foregoing. After that, the gear 217 stops when it comes to engage the winding gear 224 as shown in FIG. 10. In that instance, before the planetary lever 218 comes to a stop with its engaging part 218a coming to abut on the stopper 238, the engaging face 218c of the lever 218 engages the top end part 210c of the lock lever 210 to push it from left to right as viewed on FIG. 8. Therefore, the lock part 210a of the lock lever 210 frees the bent part 208h of the auxiliary release plate 208. This allows the auxiliary release plate 208 and the release lever 202 to be pulled up into their initial positions by the forces of the springs 205 and 209 respectively.

The motor 213 continues to rotate even during the process mentioned above. Therefore, when the planetary lever 218 comes back to its state as shown in FIG. 10, the clockwise rotation of the planetary gear 217 causes the winding gear 224 to rotate counterclockwise to have the film taken up on the spool 226 rotating via the gear 225. During the film winding process, a film feeding amount is detected by a detector which is not shown. When a given amount of film has been taken up, the CPU causes the power supply for the forward rotation of the motor 213 to be cut off. In other words, the winding signal WIND is stopped from being produced. As a result of this, various members mentioned in the foregoing come back to their initial states as shown in FIGS. 7, 10 and 13 to bring the camera into the so-called reset state. Therefore, the camera becomes ready for next photographing.

For rewinding the film back into a film cartridge, either the end of the film is detected by a film feeding amount detector or a rewinding button which is not shown is pushed. Then, referring to FIG. 10, the CPU causes the motor 213 to be reversely rotated. The pinion 214 then rotate clockwise. This causes the sun gear 216 to rotate clockwise. The planetary lever 218 begins to revolve clockwise from its position of FIG. 10. Since the release lever 202 and the auxiliary release plate 208 are not pushed in this instance, the upper arm 208e and the engaging part 208g of the auxiliary release plate 208 stay on the revolving locus of the planetary leer 218. Therefore, the clockwise revolution of the planetary lever 218 from its position of FIG. 10 causes the second engaging face 218e and the first engaging face 218c of its fore end part to hit the arm 208e and the engaging part 208g of the auxiliary release plate 208. This prevents further clockwise revolution of the lever 218. The planetary gear 217 remains in a state of engaging the rewinding gear 221. Then, the planetary gear comes to have a load greater than the friction torque. The heavy load causes the planetary gear to begin to rotate counterclockwise. This in turn causes the rewinding gear 221 to rotate clockwise. Following this, the fork 223 is caused to rotate via the gear train 222. The film is thus rewound into the film cartridge.

When the end of the film rewinding process is detected by a detector which is not shown, the CPU causes the motor 213 to make forward rotation. As a result, the planetary lever 218 revolves counterclockwise from its position of FIG. 13 back to its state as shown in FIG. 10. Again each part is reset.

Figure 18:
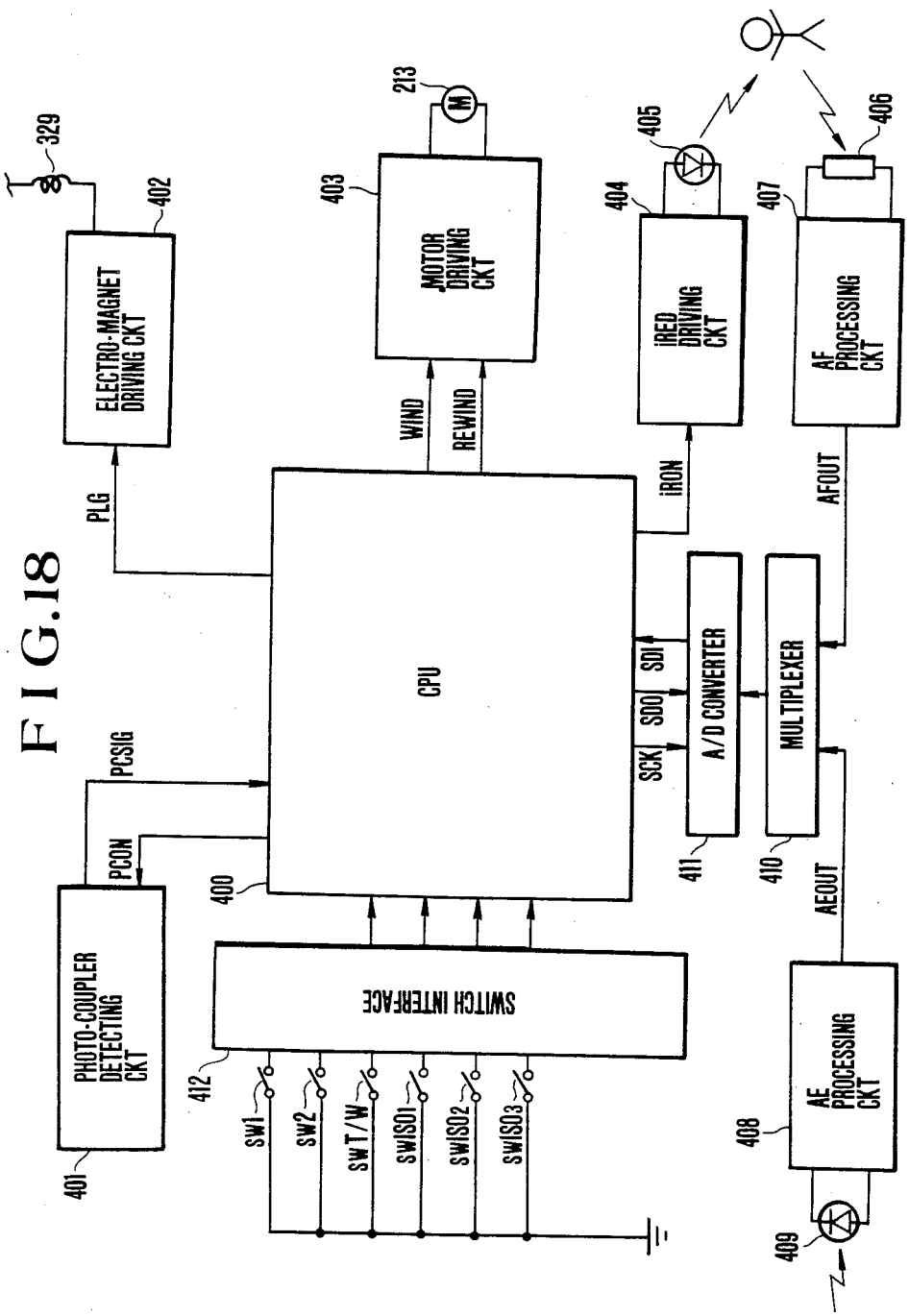
FIG. 18 is a block diagram showing the second embodiment.

An electrical circuit which controls the motor 213, the electro-magnet 329, etc. in carrying out the above stated first, second and third control actions is arranged as described below:

FIG. 18 shows in a block diagram a circuit arrangement to be employed according to this invention. Referring to FIG. 18, a CPU 400 is composed of a microcomputer or a hardware logic arrangement and is arranged to perform various control actions on circuits including, among others, to produce a signal PCON for enabling a photo coupler detecting circuit 401 which includes the above stated photo coupler 309 to generate a signal PCSIG representing the shifted extent of the lens barrel 301. An electro-magnet driving circuit 402 is arranged to drive the electro-magnet 329 according to an output PLG of the CPU 400. A motor driving circuit 403 is arranged to cause the motor 213 to make forward or reverse rotation according to a wind signal WIND or a rewind signal REWIND produced from the CPU 400. An iRED driving circuit 404 is arranged to cause an iRED 405 to flicker according to an output iRON of the CPU 400 and to form a known automatic focusing (AF) circuit in conjunction with a light receiving sensor 406 and an AF processing circuit 407. An automatic exposure (AE) processing circuit 408 is arranged to function as a known AE circuit in conjunction with a light receiving sensor 409 for detecting the luminance of an object to be photographed. A multiplexer 410 is arranged to receive from the above stated circuits an analog value output AFOUT or AEOUT. An analog-to-digital (A/D) converter 411 is arranged to convert an analog value signal received from the multiplexer 410 into a digital value signal. A switch interface 412 is arranged to transmit information on the states of the first stroke switch sw1 for shutter release, the second stroke switch sw2 for shutter release, a tele-wide switch swT/W for changing between a long focal length and a short focal length and film sensitivity information reading contact switches swIS01 to swIS03.

Figure 19:
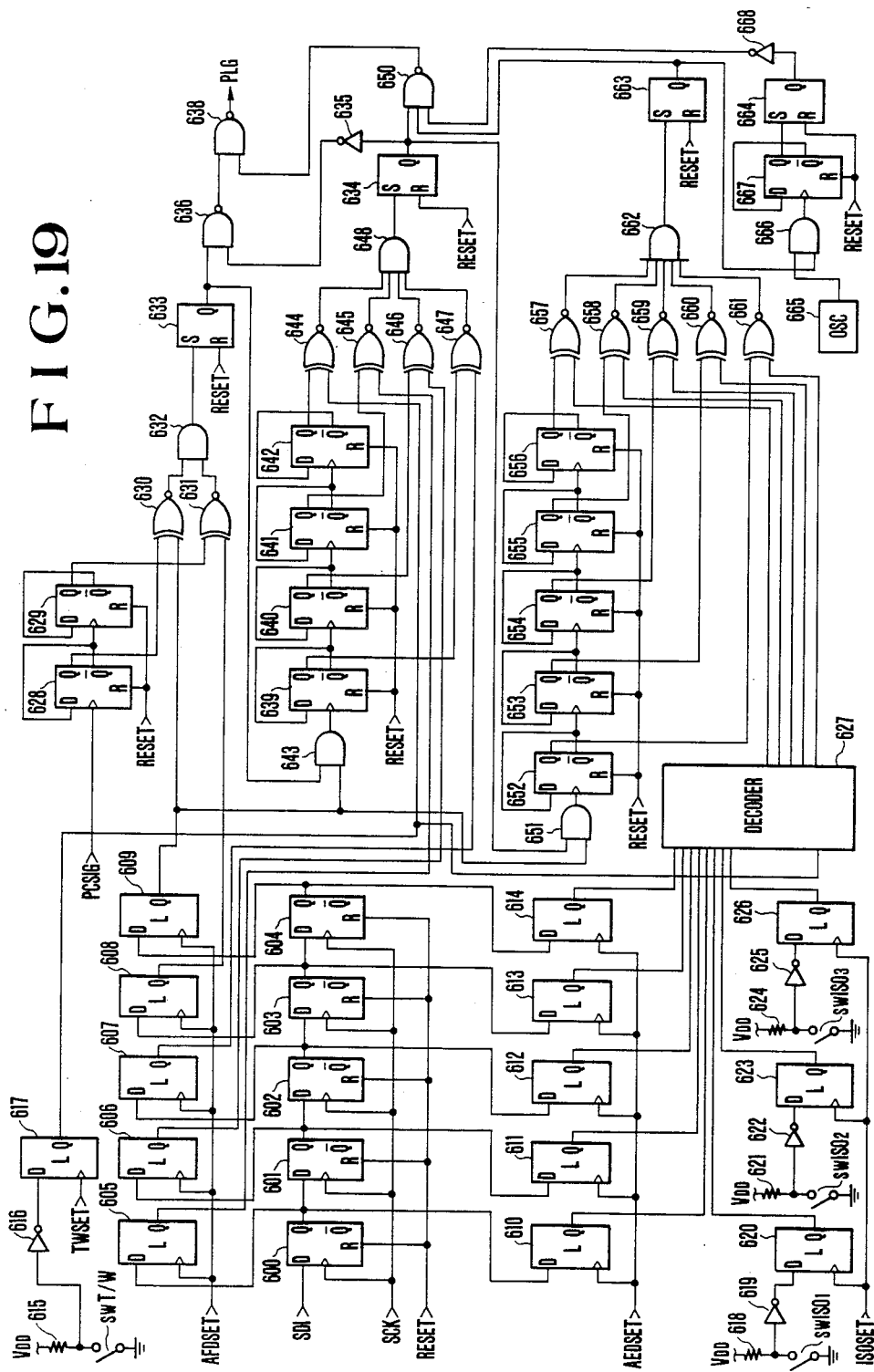
FIG. 19 is a circuit diagram showing the essential parts of a CUP of FIG. 18 in terms of hardware.
Figure 20A:
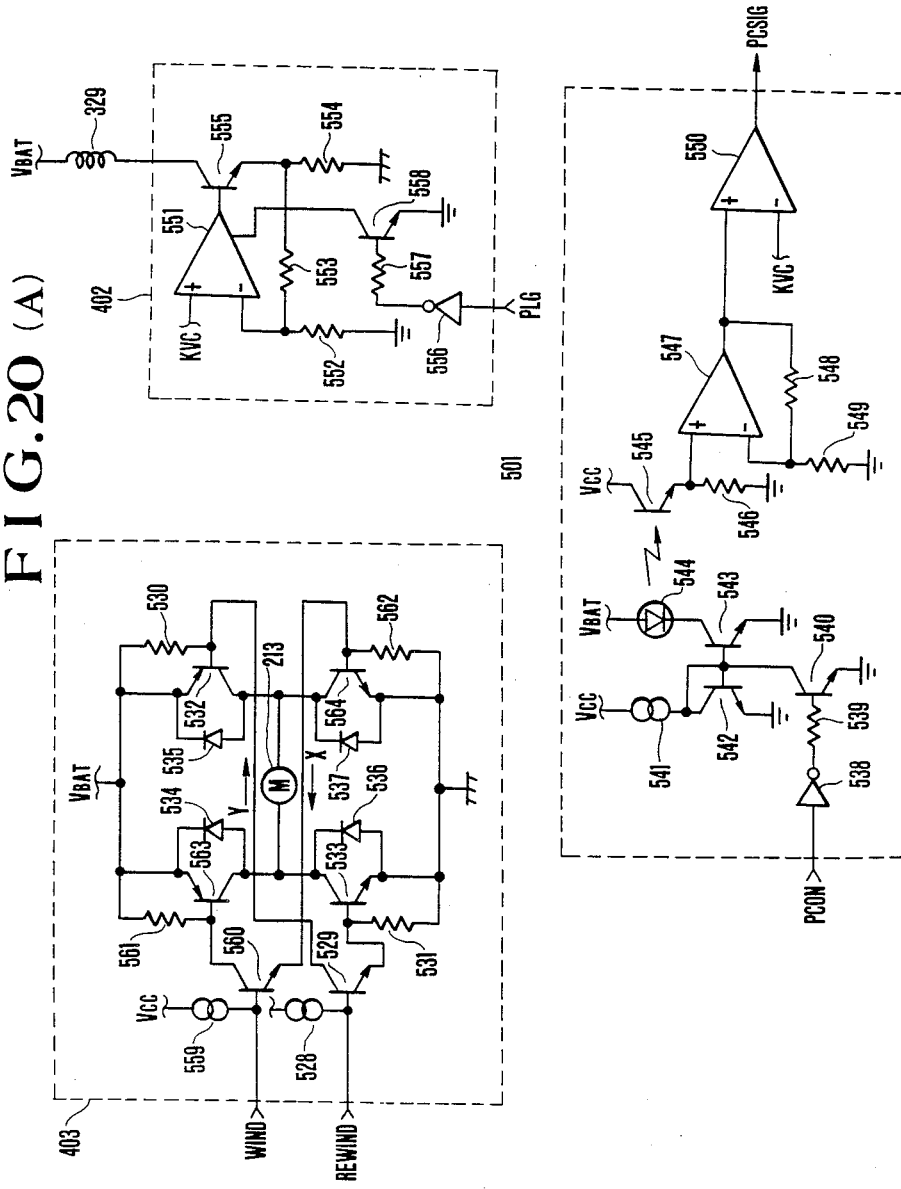
FIGS. 20(A) and 20(B) are circuits diagrams showing internal arrangement of circuits included in FIG. 18.
Figure 20:
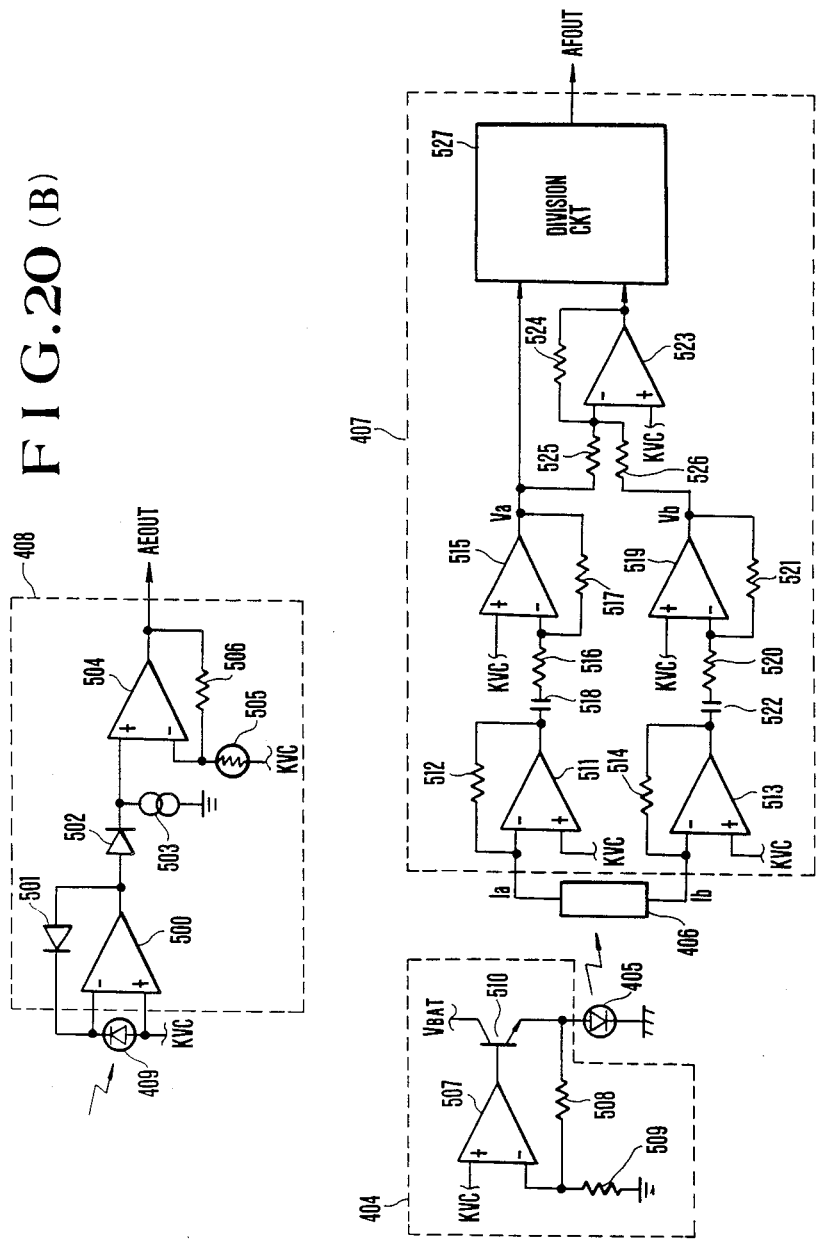
Figure 21:
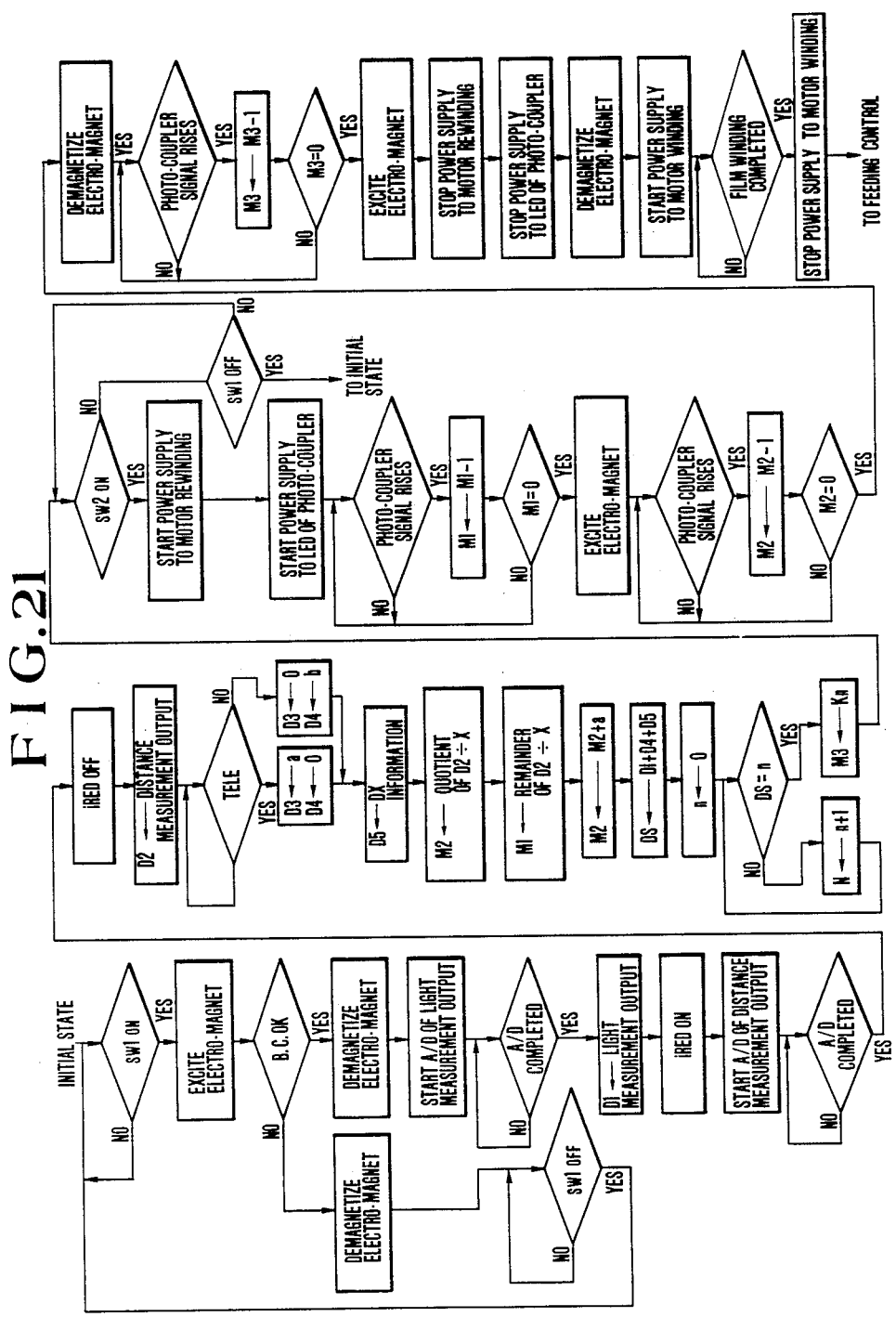
FIG. 21 is a flow chart showing the operation of these circuits.

FIG. 19 is a circuit diagram showing in terms of hardware a control system arranged relative to this invention within the CPU 400. FIGS. 20(A) and 20(B) show the details of the above stated driving and processing circuits. FIG. 21 is a flow chart showing the operation of these circuits. The operation of the electrical circuit arrangement of this embodiment is as described below according to this flow chart with reference to the above stated other drawings FIGS. 18 to 20(B):

In the initial state (or the non-photographing state shown in FIGS. 7, 10 and 13), the camera is waiting for turning on of the first stroke switch sw1. When the first stroke switch sw1 turns on with the shutter release button 1 operated by pushing it, an ON signal indicative of this is supplied to the CPU 400 through the switch interface 412. The CPU 400 produces an output PLG at a high level (hereinafter referred to as "H") for a battery check to ensure the operation of each circuit to be adequately performed thereafter. The H level signal PLG is supplied to the electro-magnet driving circuit 402 to cause power supply to the electro-magnet 329 to begin. In the event that a battery check detection circuit which is not shown detects that the result of the battery check is "NG" indicating a battery capacity lower than a voltage sufficient for the operation of each circuit, the power supply to the electro-magnet is immediately cut off. The camera then comes back to its initial state with the first stroke switch sw1 turned off. In case that no state of "NG" is detected during the battery check, the operation of the camera shifts to a next sequence of steps after the power supply to the electro-magnet 329 is stopped.

At the next step, a light measurement output required for determining a shutter opening time is obtained jointly by the light measuring sensor 409 and the AE processing circuit 408. More specifically, referring to FIG. 20(B), a photo current corresponding to the luminance of the photographing object is produced at the light measuring sensor 409. The photo current is compressed by an operational amplifier 500 and a diode 501. Then, the compressed photo current is made into a value having a reverse saturation current cancelled by a diode 502 and a constant current source 503. A signal of this value is then supplied to a non-inverting amplifier consisting of an operational amplifier 504, a temperature sensitive resistor 505 and a resistor 506 to obtain a light measurement output AEOUT having no temperature coefficient. The output AEOUT is supplied to the multiplexer 410. The multiplexer is provided for the purpose of changing one analog input to the A/D converter 411 over to another. In this instance, therefore, the light measurement output AEOUT becomes the input for the A/D converter 412. The input is A/D converted. The output data of the A/D converter 412 is then supplied to the CPU 400 via a terminal SD1. As shown in FIG. 19, the CPU 400 receives this data by a shift register (of five bits in this case) which consists of D flip-flops 600 to 604. Upon completion of the transfer of the data, a signal AEDSET is formed (at a circuit which is not shown but is included in the CPU 400). Then, in synchronism with the rise of this signal AEDSET, the above stated data is stored as data D1 at D latches 610 to 614.

After completion of the storing action on the data D1, the CPU 400 produces an output iRED at an H level for obtaining a distance measurement output AFOUT which is necessary in drawing out the lens barrel 301. By this H level signal iRED, the iRED driving circuit 404 which consists of an operational amplifier 507, resistors 508 and 509 and a transistor 510 as shown in FIG. 20(B) is enabled to cause the iRED 405 to flicker. Meanwhile, infrared rays (or a signal light) projected from the iRED 405 are reflected by the object. The reflected infrared rays coming from the object are received by the light receiving sensor 406. Signal currents Ia and Ib corresponding to the object distance are obtained from the incident rays according to the principle of trigonometrical survey. These signal currents are converted into voltage values by current-to-voltage converters, one consisting of an operational amplifier 511 and a resistor 512 and the other an operational amplifier 513 and a resistor 514 respectively. After that, the signal rays of the iRED 405 are alone amplified into signal voltages Va and Vb by a differential amplifier consisting of an operational amplifier 515, resistors 516 and 517 and a capacitor 518 and another differential amplifier consisting of an operational amplifier 519, resistors 520 and 521 and a capacitor 522. These signal voltages Va and Vb are added up (va+Vb) by a summing amplifier consisting of an operational amplifier 523 and resistors 524 to 526. The output of the summing amplifier is supplied to a division circuit 527, which performs a dividing operation Va / (Va+Vb). As a result of the dividing operation, a distance measurement output AFOUT is obtained and is supplied to the multiplexer 410 and is then converted into a digital signal by an A/D converter 411. The digital signal thus obtained is supplied to the CPU 400. The distance measurement output AFOUT correlates with the object distance in the ratio of 1 to 1 and is proportional to the drawn-out (delivery) degree of the lens barrel 301. Further, at this point of time, the level of the output from the iRED becomes L (low level). In the same manner as in the case of the above stated light measurement output AEOUT, the CPU 400 receives the data by means of a shift register which is composed of D flip-flops 600 to 604 as shown in FIG. 19. Upon completion of the transfer of the data, a signal AFDSET is obtained. Then, in synchronism with the rise of the signal AFSET, the data is stored as data D2 at D latches 605 to 609.

Next, the CPU checks whether the tele-wide switch swT/W is on the side of a longer focal length or on the side of a shorter focal length. The switch swT/W is in its ON state in the case of the long focal length. In that case, data "H" is stored at the D latch 617 in synchronism with the rise of a signal TWSET (produced within the CPU 400 by a circuit which is not shown) through a pull-down resistor 615 and an inverter 616 as shown in FIG. 19. With the lens on the long focal length side, data a is supplied as lens barrel delivery degree correction data D3 and data 0 (zero) as AE (aperture F number) correction data D4. If the lens is on the short focal length side, data 0 is supplied as the lens barrel delivery degree correction data D3 and data b as the AE correction data D4. In this specific embodiment, the data a is 8 in the case of the long focal length because of the hardware arrangement. Next, film sensitivity information obtained from a DX code is stored as data D5 at D latch 620 via a contact switch swIS01, a resistor 618 and an inverter 619, at the D latch 623 via a contact switch swIS02, a resistor 621 and an inverter 622 and at the D latch 626 via a contact switch swIS03, a resistor 624 and an inverter 625.

Following this, within the CPU 400, the measured distance data D2 stored at the D latches 605 to 609 is converted into control data M1 for the first control and control data M2 for the second control. This converting operation can be accomplished in a software manner by dividing the measured distance data D2 by some variable x, by storing a quotient thus obtained as the control data M2 and a remainder as the control data M1. In case that this converting operation is to be performed in a hardware manner, a circuit arrangement is made as shown in FIG. 19. In this case, the lower two bits of the measured distance data D2 are used as the control data M1 and the higher three bits as the control data M2. According to this arrangement, the variable x is equivalently set, for example, at 4. Further, within the CPU, the measured light data D1, the AE correction data D4 and the film sensitivity information are all added up to obtain data DS. Then, with a value n corresponding to the data DS selected from a table, pulse count data Kn is obtained according to this data DS and is stored as data M3 for the purpose of ensuring an apposite length of shutter opening time. In the case of FIG. 21, the measured light data D1, the AE correction data D4 and the film sensitivity information are all supplied to a decoder 627. The pulse count data which consists of five bits is obtained from the decoder 627 as data to be used for ensuring the apposite shutter opening time. The operation to be performed when the first stroke switch sw1 turns on is as described above.

When the release button is further pushed under this condition, the second stroke switch sw2 turns on. An ON signal indicating it is supplied to the CPU 400 via the switch interface 412. Upon receipt of the ON signal, the CPU 400 produces a rewind signal REWIND and supplies it to the motor driving circuit 403 (that is, the signal line is made to have a high impedance). Upon receipt of the signal, a constant current from a constant current source 528, as shown in FIG. 20(A), flows to the base of a transistor 529 to turn it on. The current further flows via resistors 530 and 531 to transistors 532 and 533 to turn them on. Therefore, a current in the direction of arrow X flows to the motor 213. The motor 213 begins to rotate in the same direction as the direction in which the film is rewound. Diodes 534 to 537 are additionally provided for the purpose of preventing the motor driving transistors from being broken by a back electromotive force or the like. With the power supply thus effected to the motor 213, the helicoid shaft 307 is rotated via the various gears, etc. mentioned in the foregoing. The lens barrel 301 is payed out or drawn out accordingly. This movement is picked up by the photo coupler. Then, a photo coupler signal is detected via a photo-sensitive (light receiving) element 545 and a resistor 546 disposed within the photo coupler 309. This signal is amplified by a non-inverting amplifier formed by an operational amplifier 547 and resistors 548 and 549. The amplified signal is compared at a comparator 550 with a reference voltage KVC. A logic signal PCSIG is thus obtained from the comparator 550 and is supplied to the CPU 400. According to the arrangement of the flow chart of FIG. 21, 1 (one) is subtracted from the first control data M1 every time a rise of the photo coupler signal is detected. This counting action continues until the value of the data M1 becomes zero. The details of this operation in terms of hardware are as described below with reference to FIG. 19:

The first control data M1 is stored at the D latches 608 and 609 as data of two bits. In the first place, in response to the rise of the signal PCSIG up to an H level, a binary counter formed by the D flip-flops 628 and 629 begins to up count the rise one by one. Then, when the outputs of the D flip flop 628 and the D latch 609 and those of the D flip-flop 629 and the D latch 608 become equal to each other, the output levels of exclusive NOR gates 630 and 631 both becomes H levels. An RS flip-flop 633 is set. At this stage, another RS flip-flop 650 is still in a reset state. Therefore, the outputs of an inverter 635 and a NAND gate 650 are at H levels. Therefore, the output of a NAND gate 650 is at an L level. Then, an H level output PLG is supplied from a NAND 638 to the electro-magnet driving circuit 402. The CPU 400 thus comes to produce the output PLG at an H level. Then, referring to FIG. 20(A), the electro-magnet driving circuit 402 which consists of an operational amplifier 551, resistors 552, 553 and 554, a transistor 555, etc. begins to effect power supply to the electro-magnet 329 with a transistor 558 turned off via an inverter 556 and a resistor 557. As a result, the fine pitch delivery or feeding control, i.e. the first control, is performed on the lens barrel 301 (carrying the photo taking lens which is not shown) as mentioned in the foregoing.

Following this, the data M2 for the second control is likewise subjected to a subtracting operation. However, since the second lens control data M2 includes information on the focal length of the photo taking lens in addition to the information on the object distance, the number of pulses to be counted increases to a predetermined degree in the case of the long focal length. In the embodiment as shown in FIG. 19, data indicative of whether the lens is on the side of the long focal length or not is stored at the D latch 617. This data and the outputs of the D latches 607, 606 and 605 are together compared with the output of a binary counter of four steps consisting of D flip-flops 639 to 642. After the RS flip-flop 633 is set, the output PCSIG of the photo coupler detecting circuit 401 is applied via an AND gate 643 to the clock input terminal of the D flip-flop 639. Then, in synchronism with the above stated output PCSIG, the binary counter begins to up count. When the outputs of the D flip-flop 639 and the D latch 607, those of the D flip-flop 640 and the D latch 606, those of the D flip-flop 641 and the D latch 605 and those of the D flip-flop 642 and the D latch 617 all come to coincide with each corresponding one, the output levels of exclusive NOR gates 644 to 647 all becomes H levels. The output level of an AND gate 648 becomes H to set the RS flip-flop 634. Under this condition, an RS flip-flop 663 is still in a reset state. Therefore, the output of a NOR gate 650 is at an H level. That of a NAND gate 636 is also at an H level. Therefore, the level of the output PLG of a NAND gate 638 is inverted. As a result, the power supply to the electro-magnet 329 comes to a stop. Then, the coarse pitch delivery control, i.e. the second control, over the lens barrel 301 mentioned in the foregoing comes to an end. Further, in this specific embodiment, the lens barrel 301 is arranged to be drawn out furrther for the long focal length than for the short focal length by a distance corresponding to eight pulses.

A shutter control operation begins at this point of time. The data M3 for the third control to be performed in determining the shutter opening time is selected according to the AE output AEOUT produced from the AE processing circuit, the AE correction data and the film sensitivity information value. In the case of the embodiment shown in FIG. 19, the data D1 stored at the D latch 610 to 614, the AE correction data D4 stored at the D latch 617 and the film sensitivity data D5 stored at the D latches 620, 623 and 626 are supplied to the decoder 627. The output of the decoder is used as the data M3 for the third control. After the above stated RS flip-flop 634 is set, the output PCSIG is applied to the clock input terminal of a D flip-flop 652 through an AND gate 651. Then, a binary counter of five bits consisting of D flip-flops 652 to 656 begins to up count according to the rises of the output PCSIG. When the outputs of all the flip-flops of the binary counter come to coincide with the output of the decoder, the outputs of all exclusive NOR gates 657 to 661 become H levels. The output lever of an AND gate 662 also become H to set an RS flip-flop 663. At that time, an RS flip-flop 664 remains in a reset state. Therefore, the output level of the NOR gate 650 is L. This causes the output PLG of the NAND gate 638 to be again inverted. As a result, power supply to the electro-magnet 329 is resumed. Then, as mentioned in the foregoing, the shutter is closed and an exposing action on the film, i.e. the third control, comes to an end.

The instant the power supply is resumed to the electro-magnet 329, the CPU 400 lowers the level of the rewind signal RIWIND to an L level. As a result, the current of the constant current source 528 within the motor driving circuit 403 is sunk to turn off transistors 532, 533 and 529. Therefore, the supply of a current to the motor 213 in the same direction as the film rewinding direction (the power supply in the direction of arrow X as shown in FIG. 20(A)) is brought to a stop. The CPU 400 then lowers the level of its output PCON to the photo coupler 401. Therefore, a transistor 540 is turned on through an inverter 538 and a resistor 539. A transistor 543, therefore, turns off to cut off power supply to an LED 545. Further, when the RS flip-flop 663 is set, the output of an OSC 665 is applied to the clock input terminal of a D flip-flop 667 via an AND gate 666. Therefore, the RS flip-flop 664 is set by the rise of a clock pulse from the OSC 665. This causes the output level of the AND gate 650 to become H via an inverter 668 and the level of the output PLG of the NAND gate 638 to become L. Then, the power supply to the electromagnet 329 comes to a stop.

After that, the CPU 400 produces the wind signal WIND. In response to this, the current of the constant current source 559 within the motor driving circuit 403 flows to the base of a transistor 560 to turn it on and further turns on transistors 563 and 564 via resistors 561 and 562. Therefore, a current in the film winding direction, i.e. in the direction of arrow Y of FIG. 20(A) flows to the motor 213. As a result, the lens barrel 301 is brought back to its initial position in the manner as described in the foregoing. After that, a film winding operation is performed. When it has been completed, the CPU 400 makes the level of the wind signal WIND low (L). The current of the above stated constant current source 559 is sunk by this to turn off the transistors 563, 564 and 560. Therefore, the power supply to the motor 213 in the film winding direction comes to a stop.

It goes without saying that the above operation may be performed by replacing the CPU 400 with a general-purpose microcomputer to make a control acording to the flow chart of FIG. 21.

In the second embodiment, the drawing-out or delivery extent of the lens barrel 301 is arranged to be computed by means of the distance measuring circuit. However, this invention is applicable also to a different type of arrangement in which the degree of image deviation is detected and the lens barrel is driven to an in-focus position of an imaging optical system. Further, the first control and the second control may be conversely arranged.

A third embodiment of this invention is described as follows: In the case of this embodiment, the invention is applied to a compact camera of the kind having a variable magnification, wherein the magnification of a view finder is alone shiftable by a TELE/WIDE change-over operation (hereinafter, a long focal length photography and a short focal length photography are abbreviated as TELE and WIDE, respectively) while that of the photo taking lens is shiftable only in response to a pushing operation on a shutter release button.

Figure 22:
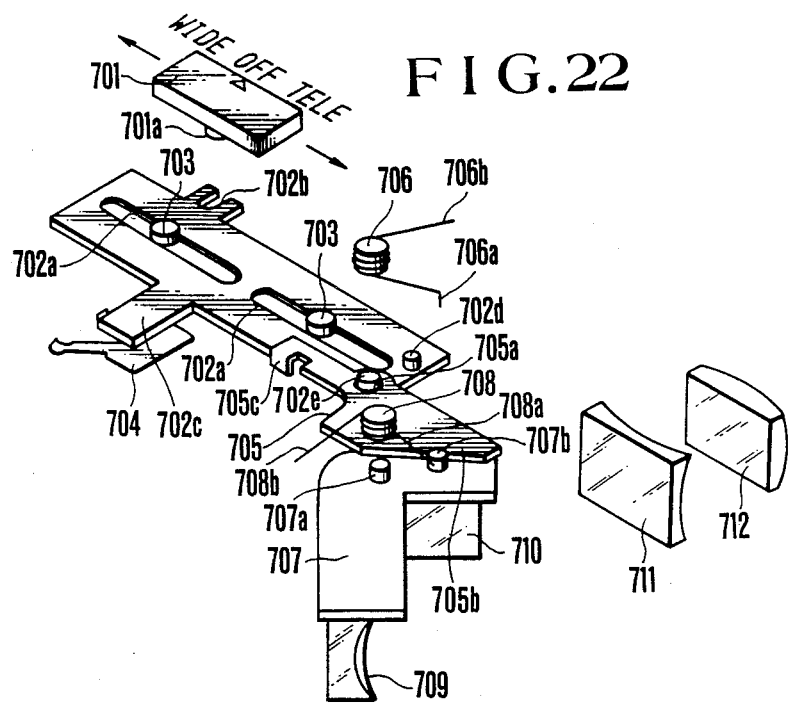
Figure 23:
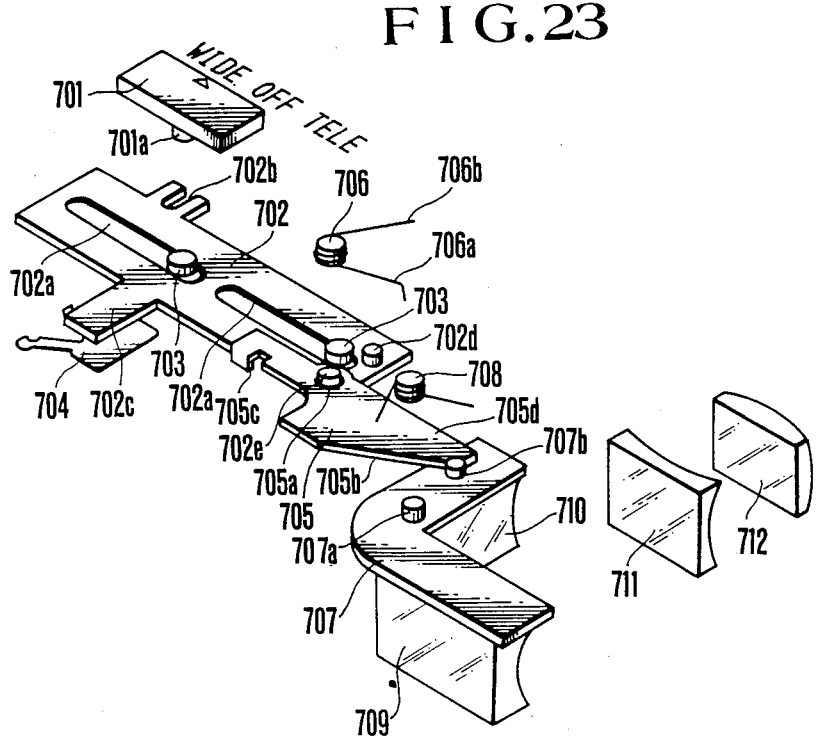

FIGS. 22 to 24 are oblique views showing a TELE/WIDE change-over operation part and a portion of a view finder interlocked with the operation part. The change-over operation part is provided for a change-over operation from one magnification over to another. When the camera is in a stowed condition, these parts are in the states as shown in FIG. 22. When a wide angle photographing mode is selected, these parts are in the states as shown in FIG. 23. When a telephoto mode is selected, they are in the states as shown in FIG. 24.

A mode change-over or selection knob 701 is arranged to be slidable over the camera body in the direction of arrow. An arrow is marked on the knob 701 as shown in FIGS. 23 and 24 while signs "WIDE" and "TELE" are marked on the camera body. The knob 701 is clicked by a click device which is not shown when the knob is slid to the sign WIDE or TELE. A lever 702 is arranged below the mode changeover knob 701 to be slidable along with the latter. The lever 702 is provided with an engaging groove 702b, which is arranged to engage a pin 701a protruding downward from the lower side of the knob 701 to enable the lever to move together with the knob.

The lever 702 is provided further with slots 702a extending in parallel with the moving direction of the knob 701. Pins 703 erected on the camera body are inserted into the slots to guide the lever 702 in the longitudinal direction of these slots 702a. An arm 702c protrudes from one side of the lever 702 and is arranged to carry a sliding contact piece 704 in one unified body. The sliding contact piece 704 is arranged to slide over a stationary conductive pattern (or fixed contacts) which is not shown. This provides an electronic circuit connected to the pattern with an electrical signal indicative of the position of the lever 702 and the mode change-over or selection knob 701. A pin 702e is erected on the right end surface of the lever 702. A cam lever 705 is pivotally fitted on the pin 702e to be horizontally swingable on the pin. In the middle part of the cam lever 705 is provided a hole 705a in which the pin 702e is inserted. A stopper piece 705c is arranged at the left end edge to engage one side edge of the lever 702. The lever 705 further has a slanting face 705b arranged on the right hand side of the hole 705a to engage a pin 707b erected on a view finder frame 707. A torsion spring 706 is fitted on the pin 702e which is inserted in the hole 705a. One leg 706a of the spring 706 engages a side edge 705d of the cam lever 705. The other leg of the spring 706 engages the peripheral face of a spring attaching pin 702d which is erected on the lever 702. Therefore, the torsion spring 706 produces a torque urging the cam lever 705 to turn on the pin 702e clockwise as viewed on FIGS. 22 to 24. The stopper pice 705e is thus pressed against one side edge of the lever 702 to keep the lever 705 in an unvarying posture relative to the lever 702.

The view finder frame 707 has two sides which jointly form a rectangular shape on a horizontal plane. An objective lens 709 for wide angle photographing (WIDE) mode is attached to the lower surface of one of the two sides. Meanwhile, an objective lens 710 for telephoto (TELE) mode is attached to the lower surface of the other side. At the intersection of the two sides, there is arranged a shaft 707a to have the view finder frame 707 rotatably carried by the camera body or the like. The shaft 707a is rotatably inserted in a shaft hole provided in the camera body or the like. A torsion spring 708 is fitted on the shaft 707a. One leg 708a of the spring 708 engages the peripheral face of a pin 707b provided on the view finder frame 707. The other leg 708b engages a structural member which is not shown. The view finder frame 707 is thus urged by the torsion spring 708 to turn counterclockwise round the shaft 707a as viewed on FIG. 22.

A frame reflection lens 711 and an eyepiece 712 are both secured to the camera body.

Figure 25:
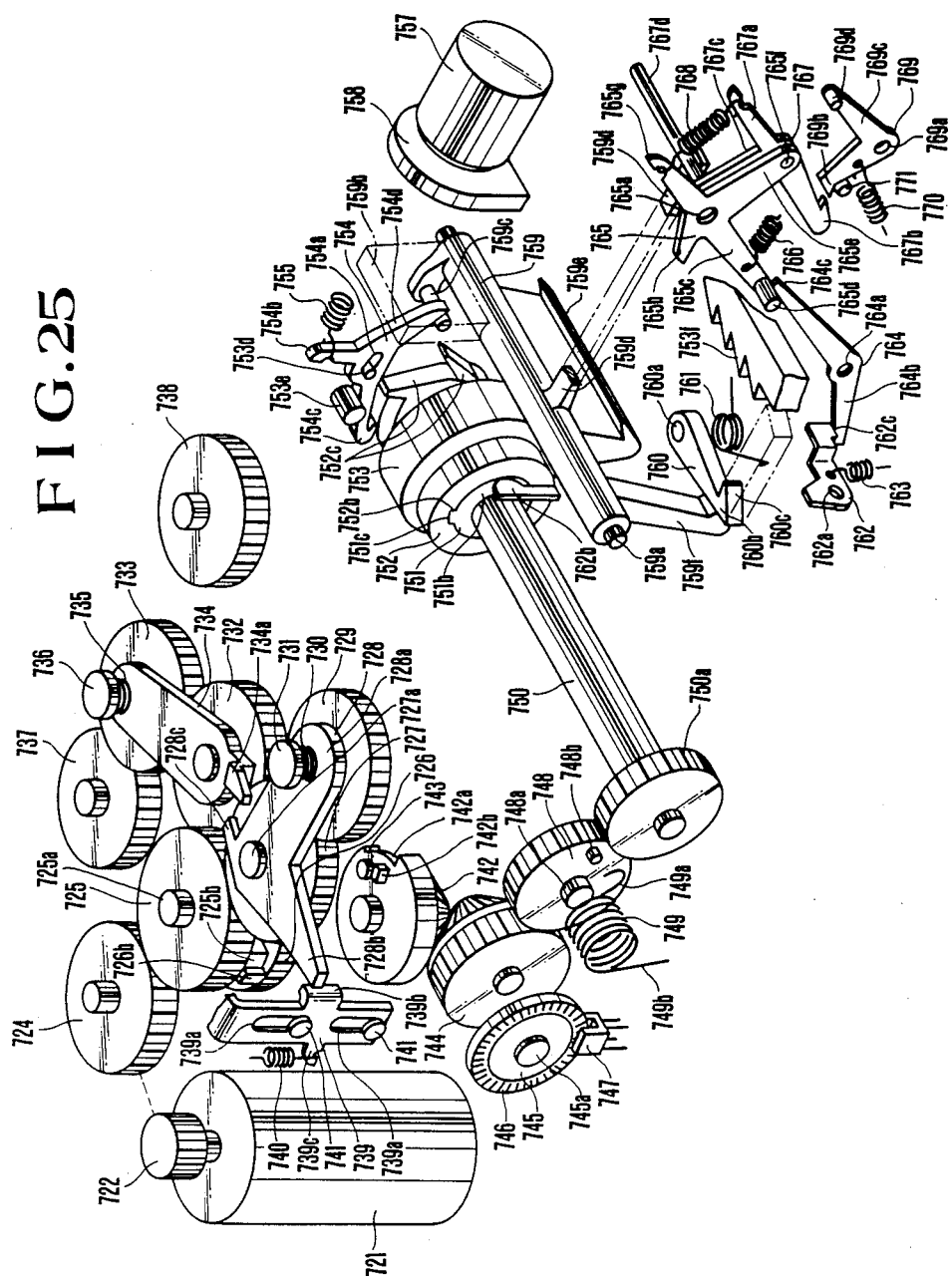
FIGS. 25 to 28 are oblique views showing the essential parts of photo taking lens drawing-out or delivery device, the shutter operating device and the force transmitting device of the camera of the third embodiment.
Figure 26:
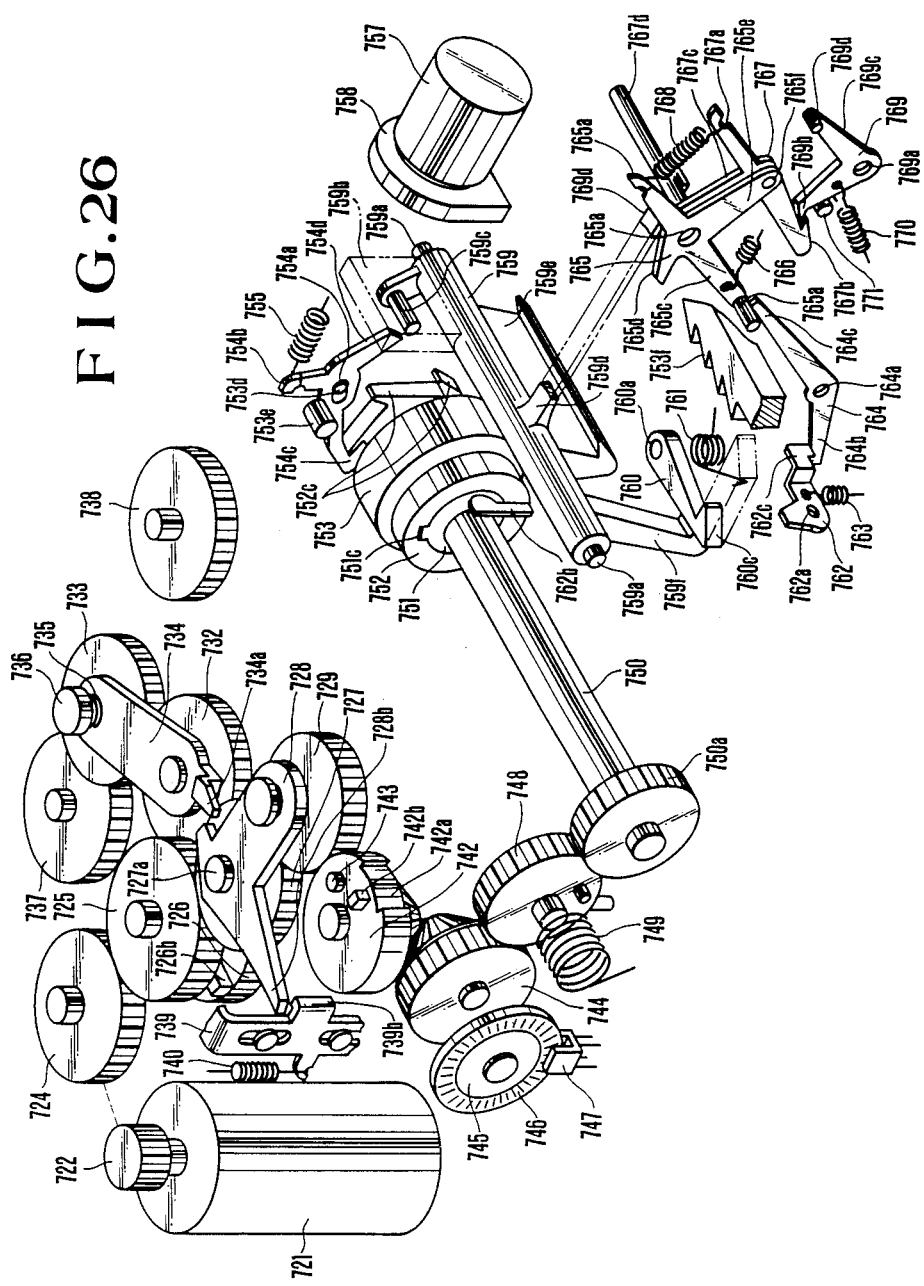
Figure 27:
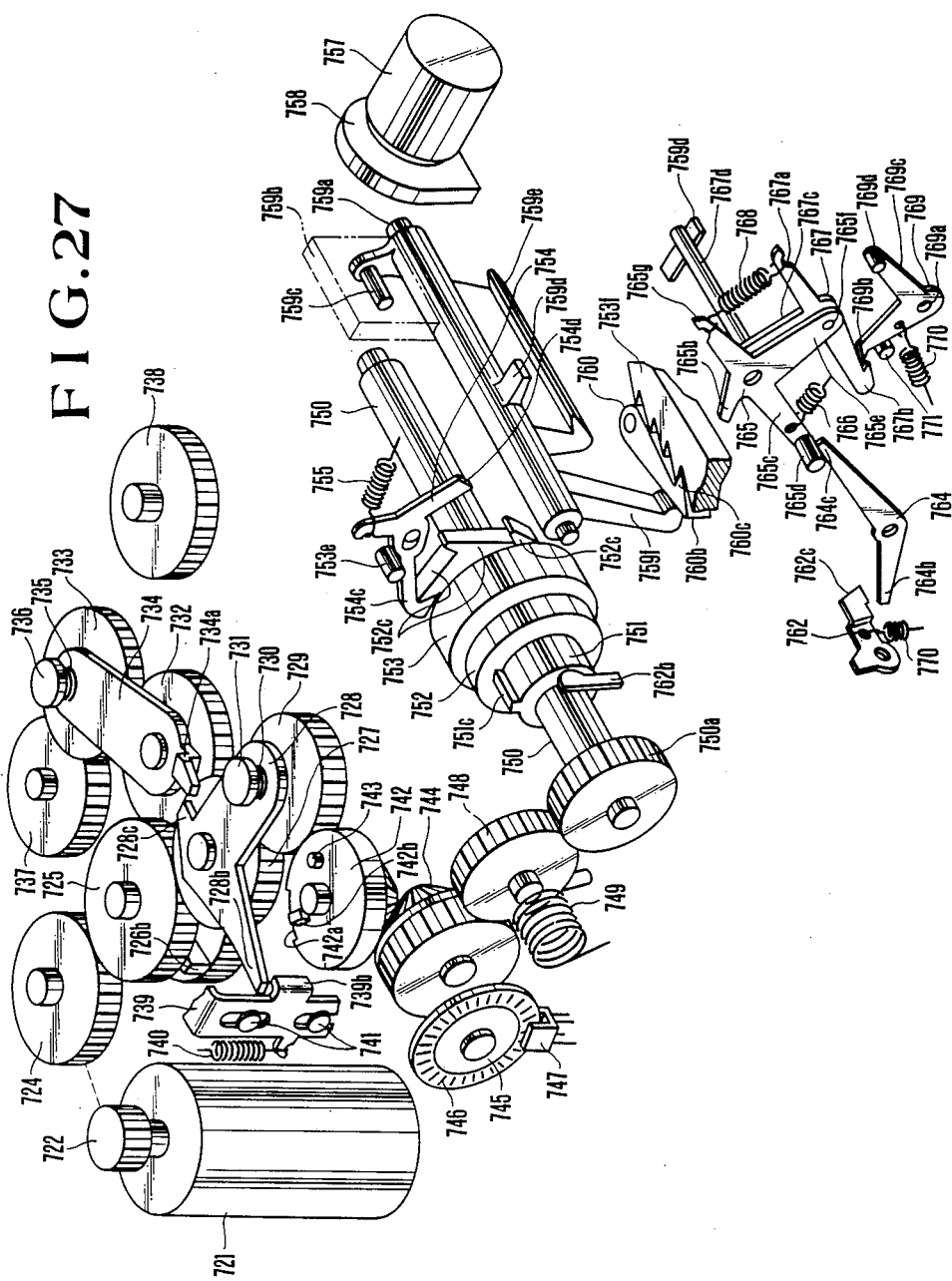
Figure 28:
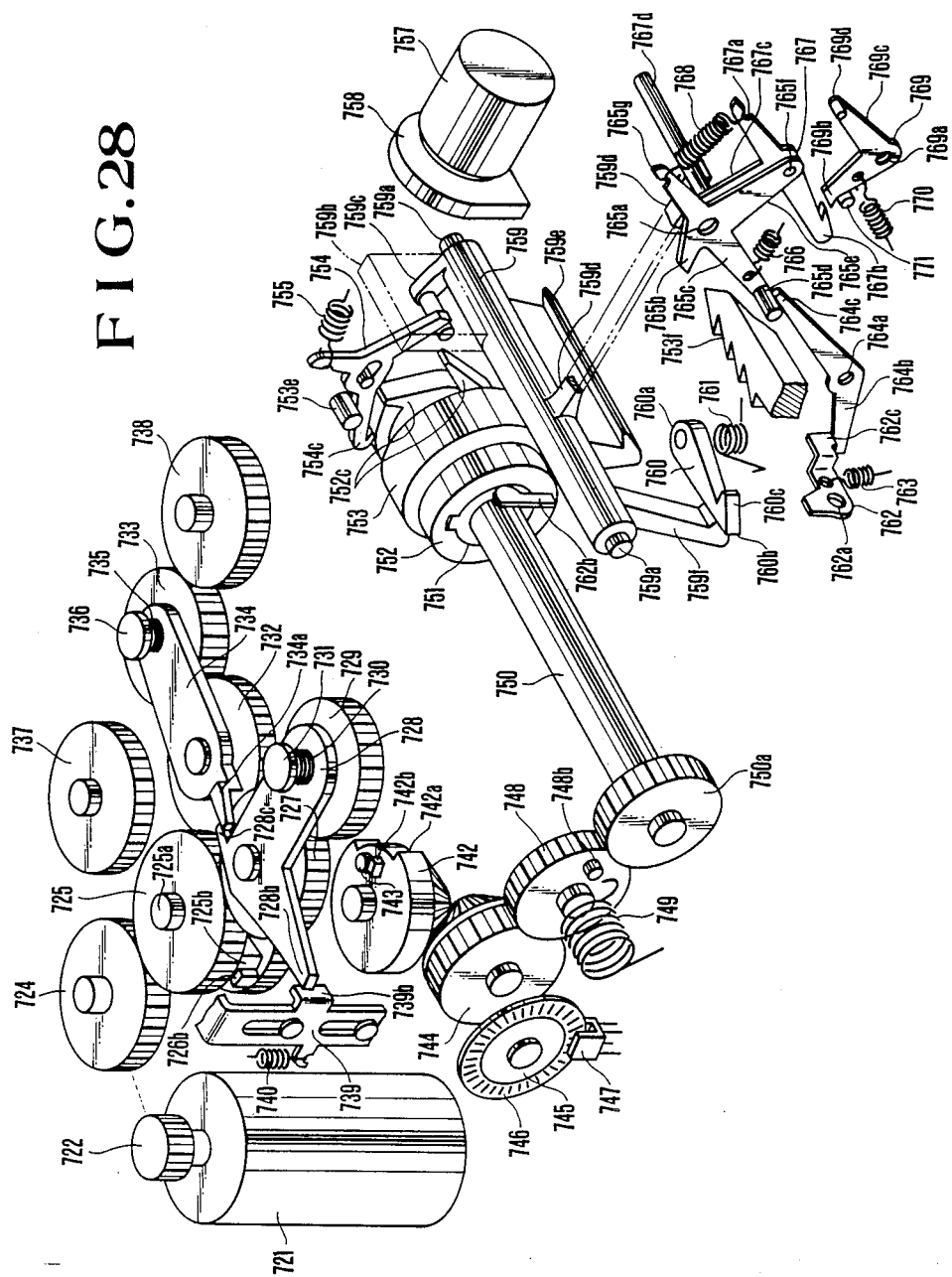
Figure 30:
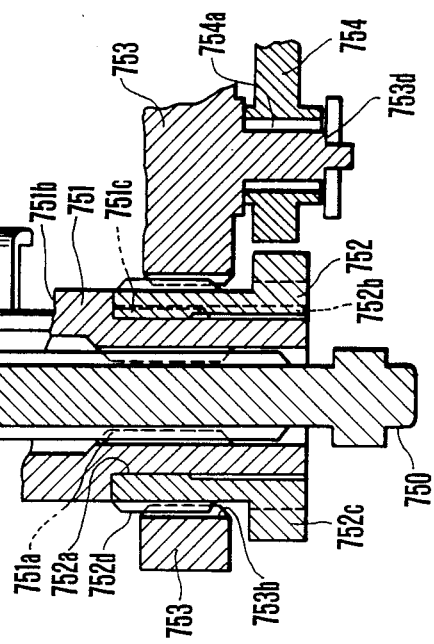
FIG. 30 is a longitudinal section showing the essential parts of the lens drawing-out device of FIGS. 25 to 28.
Figure 29:
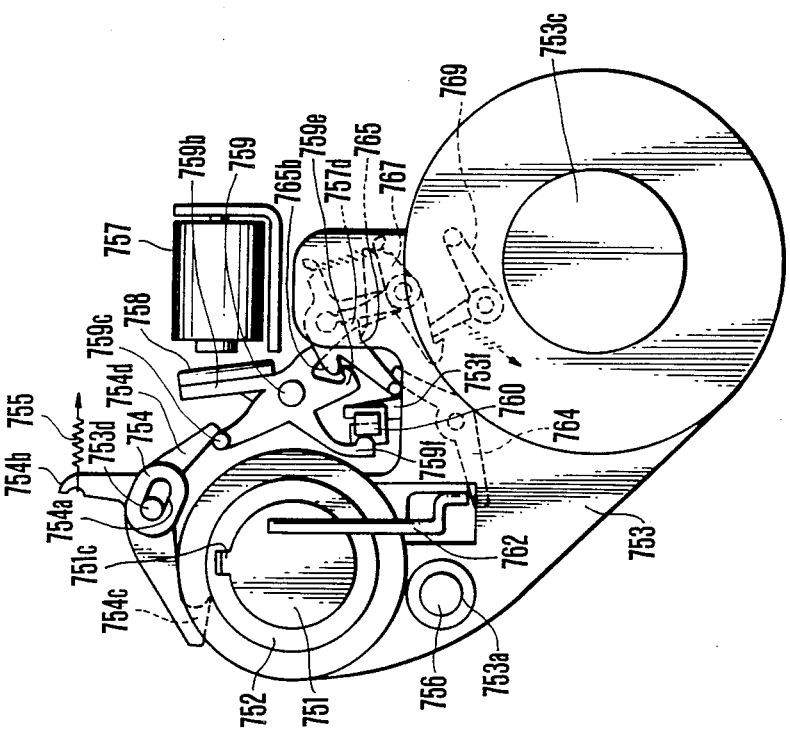
FIG. 29 is a schematic front view showing the essential parts of the lens drawing-out device of FIGS. 25 to 28.

FIGS. 25 to 28 obliquely show the essential parts of a photo taking lens delivery device and a shutter operating device and the control parts and force transmission device for the two devices arranged in the camera of the third embodiment of this invention. In FIG. 25, the embodiment is shown as in a state obtained after completion of photographing and before a shutter release button is operated. In FIG. 26, the embodiment is shown as in a state obtained while the photo taking lens is being drawn forth from its initial position (∞ position) after the release button is pushed down to its first stroke position. In FIG. 27, the embodiment is shown as in a state obtained immediately before the start of a shutter operation after completion of delivery of the photo taking lens. In FIG. 28, the embodiment is shown as in a state of having the film rewound from a film take up spool. FIG. 29 is a front view showing the essential parts of the lens delivery device. FIG. 30 is a longitudinal sectional view showing the lens delivery device.

Referring to FIGS. 25 to 28, a motor 721 is arranged to supply a driving force to a film feeding device, a photo taking lens delivery device (hereinafter referred to as the first mechanism) and a shutter control device (hereinafter referred to as the second mechanism). A sequence of parts from a gear 724 to a gear 733 are arranged to transmit the driving force of the motor to the film feeding system and the first device. Gears 737 and 738 form a film feeding system. Another sequence of parts from a bevel gear 742 to a gear 748 are arranged to transmit the driving force to the first mechanism. Parts 746 and 748 form a detection part relative to a control circuit (or control means). A sequence of parts from a gear 750a to a lock pawl 760 (excluding a part 757) form the photo taking lens delivery device (or the first mechanism). A sequence of parts from a connecting lever 762 to a stopper 771 form the shutter control device (or the second mechanism). An electro-magnet or magnet (electromagnetic means) 757 is arranged to control the first and second mechanisms.

Referring to FIGS. 25 to 28, a motor 721 is capable of making either forward or reverse rotation. The rotation of the motor 721 is transmitted to the gear 724 via a gear which is not shown. The gear 725 which engages the gear 724 also engages the sun gear 727 which is included in a first planetary gear device. The gear 726 is loosely fitted on the shaft 725a of the gear 725 and is rotatable relative to the latter. A piece 725b which protrudes from the lower face of the gear 725 is arranged to come to engage a piece 726b protruding from the upper face of the gear 726. The rotation of the gear 725 is transmissible to the gear 726 only via the pieces 725b and 726b. When the gear 725 is caused to rotate counterclockwise from its position shown in FIG. 25, therefore, the gear 726 comes to rotate after one turn of the gear 725. The gear 726 engages the gear 732 of a second planetary gear device which will be described later. The rotation of the gear 726 is thus transmissible to the gear 732.

The sun gear 727 of the first planetary device has a lever 728 which is provided with three arm parts 728a, 728b and 728c loosely fitted on the shaft 727a thereof. The gear 729 which engages the sun gear 727 is rotatably carried by the arm part 728a. The arm part 728a is provided with a hole for allowing the shaft of the gear 729 to pierce it and to be slidable relative thereto. At the fore end of the gear 729 is provided a flange-like spring stop 731. A spring 730 is fitted on a portion of the shaft between the spring stop 731 and the upper face of the lever 728. The spring 730 is compressed by the spring stop 731 and the upper face of the lever 728 and acts to push up the gear 727. The upper face of the gear 729 is thus pressed against the lower face of the lever 728. Therefore, with the rotating force of the motor 721 transmitted, the lever 728 turns round in the direction of rotating the gear 727. Then, the gear 729 either engages the bevel gear 742 or comes to abut on a stopper (not shown) to be prevented from revolving before the gear 729 is allowed to rotate. These parts thus form a known planetary gear device.

A second planetary gear device which is composed of gears 732 and 733 and a lever 734 adjoins the first planetary gear device. Meanwhile, gears 737 and 738 are arranged around the second planetary gear device to receive the driving force of the second planetary gear device.

In the second planetary gear device, the gear 732 which is arranged to be constantly in engagement with the gear 726 serves as the sun gear. The gear 733 which engages the gear 732 serves as a planetary gear. The lever 734 which is loosely fitted on the shaft of the gear 732 is arranged to be turnable relative to the gear 732. The gear 733 is mounted on the fore end of the lever 734 in the same manner as the gear 729 of the first planetary gear device to form a similar planetary device.

The gear 737 which engages the gear 733 is arranged to transmit the driving force to a film take up spool which is not shown. Meanwhile, another gear 738 which also engages the gear 733 is arranged to transmit the dirving force to a fork which is not shown.

The lever 734 has an arm part 734a disposed in the base end part which is close to the shaft of the gear 732. The arm part 734a engages the arm part 728e of the lever 728 of the first planetary gear device. This arm part 734a functions as a stopper for the lever 728.

A release lever 739 which is interlocked with a shutter release button is disposed close to the fore end of the arm part 728b of the lever 728. This release lever 739 is arranged to control the turning move of the lever 728. The release lever 739 has vertically oblong slots 739a. Pins 741 which are erected on a structural member are slidably inserted in these slots 739a to guide the release lever 739 in its vertical sliding movement. A spring attaching part 739c is provided on one side edge of the release lever 739. A spring 740 which is attached to the part 739c is arranged to constantly urge the release lever 739 to move upward. On the other side edge part of the release lever 739 is formed a projection 739b which engages the arm part 728b of the lever 728. The turning motion of the lever 728 is arranged to be controlled by adjusting the stopping position of the projection 739b in the vertical direction.

A switch which is not shown but is arranged to engage the release lever 739 is disposed below the release lever 739. This switch is connected to an electronic circuit which will be described later.

A bevel gear 742 which is capable of engaging the gear 729 is disposed close to the gear 727. Another bevel gear 744 is arranged to constantely engage the bevel gear 742. The bevel gear 742 is provided with a cutout part 742a in the peripheral face and a projection 742b on the upper end face. A stopper 743 erected on a structural member is arranged to bring the counterclockwise rotation of the bevel gear 742 to a stop at a predetermined point by engaging the projection 742b there.

Another bevel gear 744 which engages the bevel gear 742 is arranged to be rotatable on a horizontal shaft. The rotation of the bevel gear 744 is transmitted to an indexing gear 745 via a gear which is not shown. On the indexing gear 745 is mounted a photo mask 746 which is provided with many slits. A photo coupler 747 straddles the photo mask 746 and is secured to a structural member which is not shown. The photo coupler 747 is connected to a pulse generator included in a control circuit which will be described later. The photo coupler detects the rotational frequency of the bevel gear 744 and supplies it to the control circuit.

The bevel gear 744 engages a gear 748. The shaft 748a of the gear 748 has a spring 749 fitted thereon. The spring 749 urges the gear 748 to rotates counterclockwise. One leg 749a of the spring 749 engages a pring peg protruding from the end face of the gear 748. The other leg 749b is secured to a structural member which is not shown. Under the condition shown in FIG. 25, the projection 742b of the bevel gear 742 is pushed against the stopper 743 by the counterclockwise torque given to the gear 748 by the spring 749.

A helicoid shaft 750 is formed in one unified body with a gear 750a which engages the gear 748. The helicoid shaft 750 carries a helicoid ring 751, ratchet wheel 752 and a lens barrel 753 as shown also in FIGS. 29 and 30. On the outer circumferential surface of the helicoid shaft 750 is formed a screw part 750b with, for example, a given lead of 8 mm (see FIG. 30 also). This screw part 750b engages a screw part 751a which is formed in the inner circumferential face of another helicoid ring 751. A key 751c which extends in parallel with the axis of the ring 751 is formed on the outer circumferential side of the helicoid ring 751. The key 751c slidably engages a key way 752b which is provided in the inner circumferential face 752a of an annular ratchet wheel 752 fitted on the outercircumferential side of the ring 751. The ratchet wheel 752 and the helicoid ring 751 are thus arranged to be movable only in the axial direction relative to each other. The arm 762b of a connecting lever 762 which will be described later is pressed against the cam face 751b of the helicoid ring 751 and is arranged to serve as a follower.

The ratchet wheel 752 has eight claws 752c formed on the peripheral side at one end thereof and a screw part 752d which is formed at the other end and is screwed into a screw hole 753 provided in the lens barrel 753.

The lens barrel 753 carries a photo taking lens unit 753c. The lens barrel is carried by the ratchet wheel 752 with the screw part 752d of the outer circumferential tubular part of the ratchet wheel 752 screwed in the screw hole 753b of the lens barrel 753. The lens barrel and the ratchet wheel are thus arranged to be axially movable relative to each other. The lead of the screw part 752d and the screw hole 753b is arranged to be, for example, 1 mm and to be smaller than the lead of the outer circumferential screw part 750b of the helicoid shaft 750 and the inner circumferential screw part 751a of the helicoid ring 751. Accordingly, the distance to which the helicoid ring 751 axially move on the helicoid shaft relative thereto while it makes one turn is arranged to be eight times as much as the distance to which the lens barrel 753 axially move relative to the ratchet wheel 752 while it makes one turn. The lens barrel 753 is provided with a hole 53a which is in parallel with the axis of the helicoid shaft 750 as shown in FIG. 29. A guide shaft 756 which is in parallel with the helicoid shaft 750 is inserted in the hole 753a. The lens barel 753 is movable along this guide shaft 756.

The lens barrel 753 is provided with a pin 753d for carrying a lock pawl which is arranged to engage the claws 752c of the ratchet wheel 752; a row of locking teeth 753f aligned in paralle to the axis of the helicoid shaft and slidably held to move only in the direction of the axis in association with the ratchet wheel 752; and a stopper 753e which is arranged to stop a lock pawl 754 and to guide the locking teeth 753f to move only in the axial direction in response to the gear 752. Further, the lens barrel also carries, among others, a connecting lever 762 which is connected to the shutter operating device which will be described later on.

The lock pawl 754 which engages the claws 752c of the ratchet wheel 752 is disposed immediately above the ratchet wheel and is carried by a support pin 753d provided on a part of the lens barrel 753. As shown also in FIG. 29, the lock pawl 754 is provided with a laterally extending slot 754a in the middle part thereof with the support pin 753d inserted therein. The hook claw 754c of the pawl 754 is arranged to engage the claws 752c of the ratchet wheel 752. The lock pawl 754 is further provided with a spring attaching part 754b for attaching a spring 755 thereto and an arm 754d for engaging an armature lever which will be described later. The lock pawl 754 is swingable on the support pin 753d and is constantly urged by the spring 755 to turn clockwise on the pin 753d. The arm 754d is thus pressed against the arm 759c of the armature lever 759. Meanwhile, the upper part of the hook claw 754c is abutting on the stopper 753e which is formed in one body with the lens barrel 753.

The armature lever 759 is swingable on a shaft 759a which is disposed in parallel with the helicoid shaft 750. The lever 759 has the arm 759c engaging the arm 754d of the lock pawl 754 and another arm 759b which is in a flate plate shape and adjoins the arm 759c as indicated by two-dot-chain lines in FIGS. 25 to 28. The arm 759b is formed in one unified body with an armature 758 which will be described later. The armature lever 759 further includes a lever part 759d which is arranged to hit the pin 767d of a lock lever 767; a claw part 759e which is arranged to lock the claw part 765b of a shutter blade opening lever 765; and another lever part 759f which is arranged to hit the head part 760b of a lock pawl 760. A spring which is not shown urges the armature lever 759 to turn round counterclockwise as viewed on FIGS. 25 to 29 while a stopper which is not shown keeps the lever 759 in repose in its position as shown in FIG. 25.

An electro-magnet 757 is arranged to suck and pull the armature 758. When the magnet 757 is excited, the armature 758 and the armature lever 759 which is in one body with the former are sucked together by the magnet turning clockwise. Therefore, the magnet 757 controls the movement of the lens barrel 753 in the direction of the optical axis thereof and also controls the interlocked actions of the shutter operating device and the lens barrel.

The lock pawl 760 which is arranged to be operated by the lever part 759f of the armature lever 759 is rotatably held at its base part hole 760a by a constructive member (not shown). The lock pawl 760 is thus turnable round the hole 760a. A torsion spring 761 which is fitted on the fixed pin is arranged to contantly urge the lock pawl 760 to turn round clockwise. Therefore, the head part 760b is abutting on the lever part 759f. The lock pawl 760 is provided for the purpose of controlling the stopping position of the lens barrel 753 in the optical axial direction. The hook claw part 760c of the pawl 760 is arranged to engage the locking teeth 753f sliding in the optical axial direction in association with the ratchet wheel 752.

A first connecting lever 762 is carried by the lens barrel 753 and is arranged to be movable along with the lens barrel 753 in the direction of the optical axis, which is in parallel with the helicoid shaft 750. The connecting lever 762 is in an L shape and has a hole 762a formed in the intersection between the vertical and horizontal sides thereof. A fixed pin provided on the lens barrel 753 is inserted in this hole 762a. The lever 762 is thus carried by the lens barrel 753 to be swingable round the hole 762a within a vertical plane which extends in parallel with the optical axis. An arm 762b which forms the vertical side of the connecting lever 762 is, as mentioned above, serves as a follower which is to be moved following the end face 751b of the helicoid ring 751 when the end face 751b abuts thereon. The fore end of another arm 762c which forms the horizontal side of the connecting lever 762 engages one arm 764b of a second connecting lever 764 which adjoins the first connecting lever. A spring 763 which is attached to the horizontal side constantly urges the lever 762 to move downward. Therefore, the arm 762b of the connecting lever 762 is pressed against the cam face 751b of the helicoid ring 751 while the other arm 762c is pressed against the arm 764b of the second connecting lever 764.

The second connecting lever 764 has a hole 764a. A fixed pin which is disposed in parallel with the helicoid shaft 750 is inserted in the hole 764a. Two arms 764b and 764c are arranged to be turnable on this fixed pin. The fore end of the arm 764c engages the fore end pin 765d of one arm 765c provided on a shutter blade opening lever 765 which is arranged to be turnable also on an axis extending in parallel to the helicoid shaft 750.

The blade opening lever 765 is of course a main part of the shutter operation device and is connected to a governor which is not shown. The lever 765 has a hole 765a in the middle part thereof. A carrying shaft which extends in parallel to the helicoid shaft 750 is inserted in the hole 765a. A first arm 765b, a second arm 765c, a third arm 765e and a fourth arm 765g of the lever 765 are radially arranged round the hole 765a. The lever 765 is thus arranged to be turnable on the carrying shaft of the lens barrel. A spring 766 which is attached to the second arm 765c urges the lever 765 to turn counterclockwise. The first arm 765b is arranged to be capable of engaging the claw 759e of the armature lever 759. However, in its state as shown in FIG. 25, the first arm 765b does not engage the claw 759e and stays at a short distance from the claw 759e. The details of positional relation between the first arm 765b and the claw 759e of the armature lever 759 are omitted in FIGS. 25 to 28. However, changes taking place in the positional relation between the two will become apparent from the following description:

To the fore end of the second arm 765c of the blade opening lever 765 is secured a pin 765d which is extending in parallel to the helicoid shaft 750. This pin 765d is in pressed contact with the arm 764c of the second connecting lever 764. A pin 765f is attached to the fore end of the third arm 765e of the lever 765. A lock lever 767 is pivotally attached to the pin 765f. The lock lever 767 has three arms 767a, 767b and 767c. A spring 768 is arranged between the first arm 767a and the fourth arm 765g of the blade opening lever 765. A stopper which is not shown but is provided on the arm 765e of the blade opening lever 765 prevents the arm 767a from turning counterclockwise from its position as shown in FIG. 25 while the lock lever 767 is urged to turn round counterclockwise on the pin 765f by the spring 768.

A hook claw is formed at the fore end of the second arm 767b of the lock lever 767. The hook claw is arranged to engage a hook claw formed at the fore end of the first arm 769b of a blade closing lever 769.

The third arm 767c of the lock lever 767 extends in parallel to the third arm 765e of the blade opening lever 765. To the fore end of the arm 765e is secured a pin 767d which extents in parallel to the helicoid shaft 750. This pin 767d is arranged to be capable of engaging the lever part 759d of the armature lever 759. In the state as shown in FIG. 25, the pin 767d is pushed up by the lever part 759d while the armature lever 759 is being prevented from turning round by a stopper (not shown).

The blade closing lever 769 forms a main part of the shutter operating device in conjunction with the blade opening lever 765. The lever 769 has two arms 769b and 769c and is in a bell crank like shape. A hole 769a is formed in the root of these two arms. The lever 769 is turnably carried by a stationary shaft provided on the lens barrel 753. A spring 770 attached to the arm 769b urges the lever 769 to turn counterclockwise round the hole 769a while the counterclockwise turn of the lever is prevented by a stopper 771 which is abutting on the arm 769b. A pin 769d which is fitted in a part of a shutter blade (not shown) is secured to the fore end of the other arm 769c of the lever 769. When the lever 769 is in its position as shown in FIG. 25 (having its arm 769b abutting on the arm 769b), the shutter is in a completely closed state.

A shutter opening degree detector (not shown) which is arranged to constantly detect the shutter opening state including the opening speed and the opening area and to generate an electrical pulse signal accordingly is arranged in association with shutter blades and is connected to an electronic circuit together with the above stated photo coupler 747.

FIG. 31 shows a control circuit arranged to control the electro-magnet 757 employed as a control member for the lens barrel delivery device and the shutter operating device shown in FIGS. 25 and 28. The control circuit includes discriminating means for discriminating whether or not an adequate photograph is obtainable and magnification changing means for changing the photographing magnification according to the result of the discrimation made by the discriminating means.

Referring to FIG. 31, a switch 801 is arranged to be closed when a shutter release button which is not shown is pushed down to its first stroke position. A switch 802 is arranged to close when the mode change-over or selection knob 701 shown in FIG. 22 is shifted to its position TELE. A switch 803 is arranged to close when the release button is further pushed down to its second stroke position. A switch A switch 804 is arranged to close when the helicoid ring 751 shown in FIGS. 25 to 28 is draawn out to a prescribed extent (as shown in FIG. 27). The control circuit includes pull-up resistors 805 to 808; inverters 809 to 812 and 824 to 827; AND gates 816 to 823; an OR gate 828; a transistor 841 for driving the electro-magnet 757; latch circuits 813 to 815 consisting of RS flip-flops; digital comparators 831 to 835; and AD converters 830 and 843.

A known distance measuring circuit 829 is employed including light emitting and receiving elements, etc. When an input is received from the latch circuit 813, the distance measuring circuit 829 operates to measure a distance between the camera and an object to be photographed and to supply a measured distance value to an AD converter 830. A decoder 836 is arranged to divide into two parts the mesured distance information which is converted into a binary value by the AD converter 830 and to supply the divided information values to two counters 837 and 838. The decoder 836 supplies the counter 837 which is a block counter with higher two bits of the measured distance information and the counter 838 which is an address counter with lower three bits. The block and address counters 837 and 838 are under the control of an oscillation circuit which is not shown. The outputs of these counters are produced in synchronism with the pulses generated by the oscillation circuit and are supplied to digital comparators 832 and 835.

A pulse generator 839 is arranged to generate pulses obtained by shaping the output of the above stated photo coupler 747. A pulse signal is thus generated in proportion to the rotation angle of the helicoid shaft 750 and is supplied to one of the input terminals of the digital comparator 832 and that of an AND gate 821.

A pulse generator 840 generates pulses obtained by shaping the output of a shutter opening degree detector which is arranged to detect the opened degree of the shutter blades. A pulse signal proportional to the opened degree of the shutter is thus generated.

A known light measuring circuit 842 is arranged to generate measured light information in response to a start signal produced from the latch circuit 813.

In the control circuit shown in FIG. 31, digital comparators 831 and 833, inverters 824 and 825 and an AND gate 817 jointly form discriminating means for discriminating whether a sharp photograph is obtainable in the telepoto (TELE) mode. The block counter 837 and the digital comparator 835 form magnification changing means for changing photo taking magnification according to the result of the discrimination made by the discriminating means. In the camera of this embodiment, these means are essential parts embodying the gist of this invention. The desils of these means are as follows:

In this specific embodiment, a reference value set for the digital comparator 831 is a value representing the nearest distace of the TELE mode. A reference value set for the digital comparator 833 represents an operable range of the exposure interlocking operation in the TELE mode. With the reference values set in this manner for the comparators 831 and 834, the above stated discriminating means and magnification changing means ensure that the photographing operation in the TELE mode is performed only within a normal range while they enable photographing in the WIDE mode to be performed including close-up photographing. Therefore, the embodiment always gives sharp pictures both in the WIDE and TELE modes.

Figure 32:
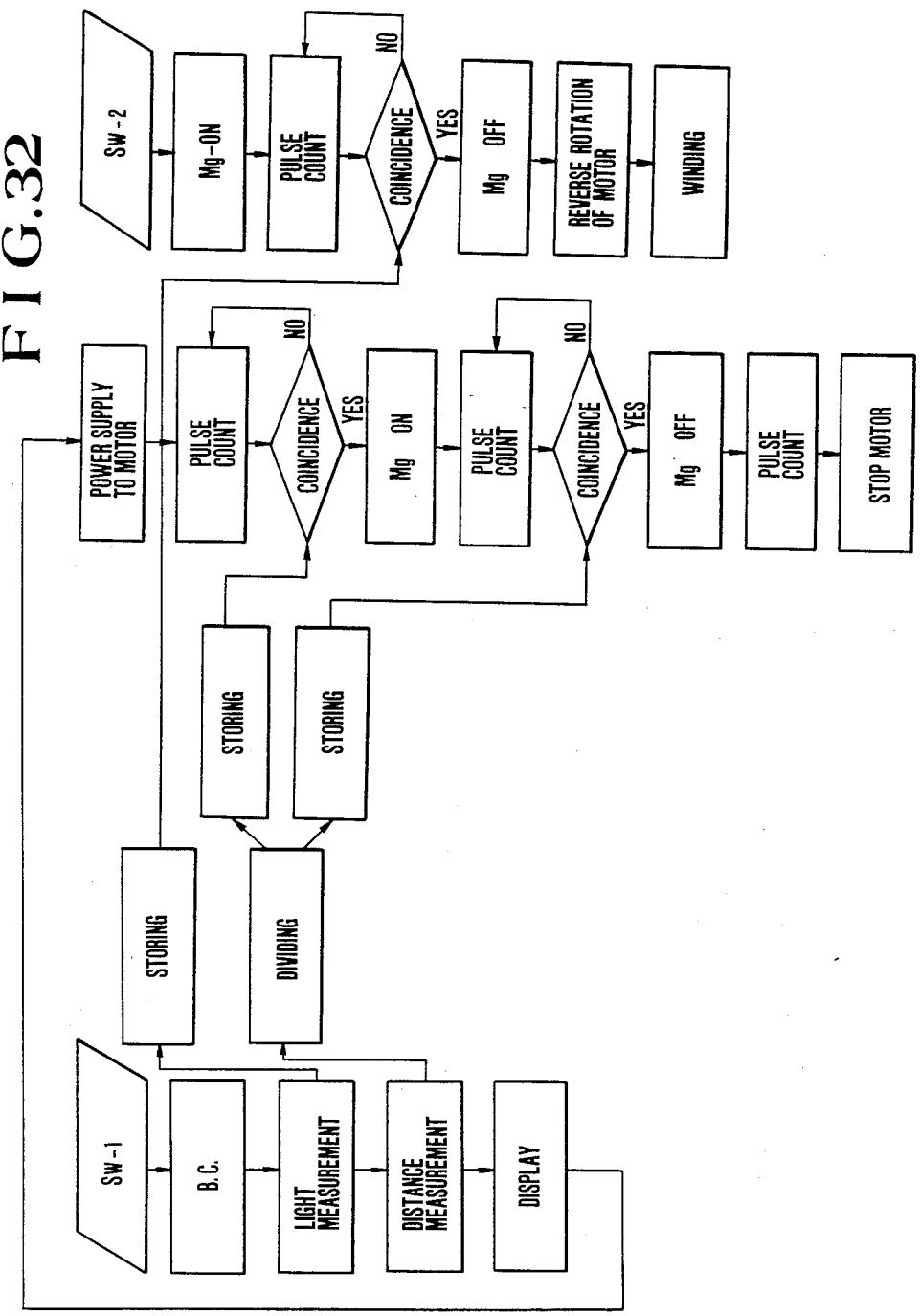
FIG. 32 is a flow chart showing a main control sequence arranged in the camera of the third embodiment.

FIG. 32 is a flow chart showing the control sequence to be performed in the camera of this embodiment. The flow chart uses reference symbols including "Mg" for the electromagnet 757; "motor" for the motor 721; "B.C" for a battery check; "SW-1" for the switch 801; and "SW-2" for the switch 803 respectively.

The operation of each part of the embodiment is as described below with reference to FIGS. 22 to 32:

When the camera is not in use, the mechanical parts illustrated by FIGS. 22 to 28 are in their states as shown in FIG. 25. The lever 728 of the first planetary gear device has the projection 739b of the release lever 739 engaging the fore end of its arm part 728b and is thus prevented from making clockwise turning movement. The gear 729 is not engaging the bevel gear 742. The positional relation between the piece 725b of the gfear 725 and the piece 726b of the gear 726 is as shown in FIG. 25. The lens barrel 753 is in its position furthest retracted from the front side of the camera and is in repose close to the electro-magnet 757.

In the shutter operating device under the condition of FIG. 25, both the blade opening lever 765 and the blade closing lever 769 remain in their blade closing states. Meanwhile, the control circuit is in its state as shown in FIG. 31.

(i) In photographing at a short focal length (WIDE):

When the photographer shifts the position of the mode selection knob 701 from an OFF position as shown in FIG. 25 to a WIDE mode position of FIG. 23, the lever 702 and the cam lever 705 move to the left. The pin 707b of the view finder frame 707 moves toward the fore end of the cam lever 705 along the cam face 705b. Then, since a counterclockwise torque applied by the spring 708 is urging the view finder frame 707 to turn round on the shaft 717a, the frame 707 turns round counterclockwise on the shaft 707a according as the cam lever 705 moves to the left. The view finder frame 707 eventually comes to a stop in a position to have the objective lens 709 for the WIDE mode squarely face the frame reflection lens 711. This enables the photographer to see a field which has been unviewable via the eyepiece 712. With the camera aimed at the object to be photographed, the shutter release buton which is not shown is pushed down to the first stroke position thereof.

With the release button pushed to the first stroke position, a battery check is first made as shown in the flow chart of FIG. 32. Upon confirmation of a sufficient capacity of the battery, the switch 801 of FIG. 31 is closed. The operation on the release button causes the release lever 739 to shift downward from its position shown in FIG. 25. Therefore, the projection 739b of the release lever 739 descends to its position as shown in FIG. 26 to enable the arm part 728b of the lever 728 of the first planetary gear device to turn round clockwise.

The input voltage level of the inverter 809 changes from an H (high) level to an L (low) level when the switch 801 closes. The output voltage level of the inverter 809 then changes from an L level to an H level to apply a start signal to the latch circuit 813. The latch circuit 813 is thus made ready for producing an output. A start signal produced from the latch circuit 813 is applied to the distance measuring circuit 829 and the light measuring circuit 842. The distance measuring circuit 829 makes distance measurement in a known manner and the light measuring circuit 842 light measurement also in a known manner. The output (measured distance information) is converted into a binary value by the AD converter 830 and that of the light measuring circuit 842 converted into a binary value by the AD converter 843.

Binary data of measured distance thus obtained by the AD converter 830 is supplied to the decoder 836 and the digital comparator 831. The measured distance data supplied to the decoder 836 is divided into a signal consisting of upper two bits and a signal of lower three bits. The upper place signal is supplied to the block counter 837 and the lower place signal to the address counter 838.

To further clarify the correlation between the operation of the circuit arrangement of FIG. 31 and the mechanical parts of FIG. 25, the embodiment is by way of example numerically described below:

Assuming that the lens barrel delivery pitch of the camera of this embodiment is 0.125 mm ($\frac{1}{8}$ mm), the focal length of the photo taking lens 38 mm and the measured distance 0.85 m, the degree to which the lens barrel must be drawn forth for the measured distance value 0.85 m is about 1.87 mm. Therefore, the lens barrel must be shifted forward 15 pitches from its infinity distance position (such as the position shown in FIG. 25). Accordingly, the output of the decoder 836 becomes a signal "1111" representing 15 in the binary notion. Of this output value, the lower three bits "111" (=7) is supplied to the address counter 838. Of the upper bits "0001", "01" is supplied from the decoder 836 to the block counter 837. Among the upper bits, the most significant two digits "00" is determined by the output of the AND gate 817. In this instance, since the switch 802 is open, the output of the AND gate 817 is at an L level irrespectively of the outputs of the digital comparators 831 and 833. Accordingly, the input value to the block counter 837 is "0". The upper two bits of the output of the block counter 837 thus becomes "00".

The output of the address counter 838 (the numeral 7 in this instance) is applied as a reference value to the digital comparator 832. When the pulse output of the pulse generator 839 (equal to the output of the photo coupler 747 which detects the rotation angle of the helicoid shaft 750 as mentioned in the foregoing) becomes equal to this reference value, the digital comparator 832 produces an output. Meanwhile, the output of the block counter 837 is applied as a reference value to thee digital comparator 835. The comparator 835 counts pulses coming from the pulse generator 839 when the AND gate 821 becomes conductive. When the number of pulses thus counted reaches the reference value, the digital comparator 835 produces an output.

In other words, the reference values to be used at the digital comparators 832 and 835 are determined according to the measured distance data received at the decoder 836. The measured distance data is compared with a reference value which is preset at the digital comparator 831. The output of the digital comparator 831 is supplied via the inverter 824 to the AND gate 817. However, the AND gate 817 is nonconductive and produces no change as the switch 802 is closed because of photographing at the short focal length.

Meanwhile, the measured light data which is changed into a binary value by the AD converter 843 is supplied to the digital comparator 833 to be compared with a reference value and also to the AND gate 820. The reference value to be used by the digital comparator 833 is set at a value representing an operable range of brightness for exposure interlocking operation in the TELE mode.

As a result of the computing operation carried out as described above, the reference values obtained from the block and address counters 837 and 838 for the digital comparators 832 and 835 are set at "7" and "1".

After completion of light and distance measuring operations in the manner as described above, the measured light and distance values are displayed as shown in FIG. 32. a current is supplied to the motor 721. The gear 724 is rotated clockwise as shown in FIG. 25. Further, in this instance, the release lever 739 is lowered from its position shown in FIG. 25 to its position of FIG. 26.

With the gear 724 rotated clockwise, the gear 725 is rotated counterclockwise from its position of FIG. 25. However, since the piece 725b of the gear 725 moves away from the piece 726b of the gear 726, the gear 726 is not rotated. The counterclockwise rotation of the gear 725 transmits clockwise rotation to the gear 727 to urge the gear 727 to rotate clockwise. However, the torque of the known planetary device urging the gear 727 to rotate clockwise causes the lever 728 to turn round clockwise from its position of FIG. 25. At that time, the projection 739b of the release lever 739 is located lower than the turning locus of the arm part 728b of the lever 728 to allow the lever 728 to turn round as shown in FIG. 26. As a result, the gear 729 comes to engage the bevel gear 742. The engagement of the gear 729 with the bevel gear 742 causes the gear 729 to rotate counterclockwise. This causes the bevel gear 742 to rotate clockwise from its position of FIG. 25. The clockwise rotation of the bevel gear 742 causes the bevel gear 744 to rotate counterclockwise. The bevel gear 744 thus causes the indexing gear 745 to rotate clockwise. The photo mask 746 rotate accordingly. As a result, an electrical pulse signal proportional to the rotation angle of the gear 745 is generated. This pulse signal is produced from the pulse generator of FIG. 31 as a shaped rectangular pulse signal. The pulse signal is applied to the digital comparator 834 and the AND gate 821.

The counterclockwise rotation of the bevel gear 744 causes the gear 748 to rotate clockwise by overcoming the counteracting torque of the spring 749 which charges the spring 749 with a portion of the torque generated by the motor 721. Further, the rotation of the gear 748 is transmitted via the gear 750a to the helicoid shaft 750. The helicoid shaft 750 then rotates counterclockwise.

When the helicoid shaft 750 is thus rotated, a torque is transmitted to the helicoid ring 751 and the ratchet wheel 752 fitted on the helicoid ring 751 and the relatively rotatable parts of the lens barrel 753 one after another. There first arises a slide between the screw part 752d of the ratchet wheel 752 having not much resistance because of a small lead thereof and the screw hole 753b of the lens barrel 753. Following this, the helicoid shaft 750, the helicoid ring 751 and the ratchet wheel 752 come to rotate together. Then, the lens barrel 753 begins to axially move forward on the ratchet wheel 752 at a pace of the lead of 1 mm as shown in FIG. 25. The connecting lever 762 also move forward along with the lens barrel 753. When the number of pulses generated by the pulse generator 839 reaches the reference value set for the digital comparator 832 (the numeral "7" set at the address counter 838 in this instance as mentioned in the foregoing), that is, when the seven pulses are detected at the photo coupler 747, the output voltage level of the digital comparator 832 changes from L to H and the digital comparator 832 comes to be in a output producing state. This gives one input to each of the AND gates 821 and 823. Both the AND gates 821 and 823 become conductive. (Note that, at this point of time, the output voltage of the inverter 826 is at an H level as no output has been produced from the digital comparator 835 as yet. Therefore, the AND gate 823 is conductive).

With the AND gate 823 becoming conductive, the OR gate 828 changes to an output producing state. The transistor 841 becomes conductive and the electro-magnet 757 is excited. With the magnet 757 excited, the armature lever 759 turns clockwise on its shaft 759a as viewed on FIG. 25. The arm 759c of the armature lever 759 lifts up the arm 754d of the lock pawl 754. The hook claw 754c of the pawl 754 plunges in between the claws 752c of the ratchet wheel 752 to prevent the wheel 752 from rotating in its rotating direction. Therefore, axial move of the lens barrel 753 on the the screw part 752d of the ratchet wheel 752 comes to an end concurrently with the rotation of the ratchet wheel 752. After this point of time, the helicoid shaft 750 and the helicoid ring 751 come to rotate relative to each other. The distance to which the lens barrel 753 moves from its initial position to a point at which the rotation of the ratchet wheel comes to a stop is 0.875 mm in the case of arrangement mentioned in the foregoing. This distance value is obtained by multiplying the value (7 pulses) set at the address counter 838 for the digital comparator 832 by one tooth pitch 0.125 mm of the screw part 752d of the ratchet wheel. The camera at this point of time is in a state as shown in FIG. 26. However, with the ratchet wheel 752 stopped from rotating, the arm 754d of the lock pawl 754 has already moved away from the operating locus of the pin 759c of the armature lever 759. After this point of time, therefore, no turning movement of the armature lever is transmitted to the lock pawl 754.

The helicoid shaft 750 continues to rotate even after the rotation of the ratchet wheel 752 has come to a stop. Therefore, the lens barrel 753 continues to move forward at the pace of the pitch of the screw part 750b of the helicoid shaft 750 together with the ratchet wheel 752, the locking teeth 753f and the helicoid ring 751. This forward movement comes to a stop when an output is produced from the digital comparator 835.

In other words, as mentioned in the foregoing, when an output is produced from the digital comparator 832, the AND gate 821 becomes conductive. Then, the putput of the pulse generator 839 is applied via the AND gate 821 to the digital comparator 835. However, since the reference value set at the digital comparator 835 is the same value "1" as the output of the block counter 837 as mentioned in the foregoing, a first pulse coming from the pulse generator 839 causes the digital comparator 835 to produce an output. Therefore, the output level of the inverter 826 changes from H to L. The AND gate 823 changes to a nonconductive state. The OR gate 828 also becomes nonconductive. The transistor 841 turns off to demagnetize the electro-magnet 757. The armature 758 and the armature lever arm 759b which have been attracted and pulled by the magnet 757 come away from the magnet 757. The armature lever 759 is then caused by the force of a spring which is not shown to turn round counterclockwise on its shaft 759a. The lever part 759f of the armature lever 759 then hits the head part of the lock pawl 760 to cause the hook claw 760c to plung in between the lock teeth 753f, as shown in FIG. 27. The locking teeth 753f which have been moving together with and in parallel to the ratchet wheel 752 is brought to a stop by the lock pawl 760. As a result the lens barrel 753 also comes to a stop. The extent to which the lens barrel moves forward up to this point of time after the rotation of the ratchet wheel 752 comes to a stop is ⅛ of the pitch of the screw 750b of the helicoid shaft 750 (and is 1 mm). In the case of this embodiment, the screw 750b of the helicoid shaft 750 is set at 8 mm while the pitch of the locking teeth 753f is 1 mm. This pitch arrangement is correlated to the divided block and address arrangement of FIG. 31. In the above stated instance, a focusing operation is completed when the position of the lens barrel is shifted from its initial position to a total shifting extent of 1.875 mm.

As mentioned in the foregoing, the motor 721 continues to rotate after the lens barrel 753 is locked by the lock pawl 760. The helicoid shaft 750 also continues to rotate. Therefore, the helicoid ring 751 alone moves further forward on the helicoid shaft 750 while the lens barrel 753 and the ratchet wheel 752 are in repose. As a result, the helicoid ring 751 comes to protrude from the front end of the ratchet wheel 752 as shown in FIG. 27. When the protruding extent of the helicoid ring 751 reaches a given value, a switch 804 which is shown in FIG. 31 but not in FIGS. 25 to 30 is automatically closed and the input voltage level of the inverter 812 changes from H to L. The output voltage level then changes to H to actuate the latch circuit 815. At the same time, the rotation of the motor 721 is brought to a stop by a motor control circuit which is not shown but is connected to the latch circuit 815.

When there obtains the state of the helicoid ring 751 protruding from the front end of the ratchet wheel 752 to the given extent as shown in FIG. 27, the arm 762b of the connecting lever 762 carried by the lens barrel 753 which has already come to a stop is pushed by the front end face 751b of the helicoid ring 751 and turns forward round the hole 762a. Therefore, the other arm 762c of the connecting lever 762 moves upward by overcoming the downward pulling force of the spring 770. Then, a downward pushing force exerted on the arm part 764b of the connecting lever 764 decreases to allow the connecting lever 764 to be turned round clockwise via the pin 765d by the force of the spring 766 which is urging the arm 765c of the blade opening lever 765. At the same time, the blade opening lever 765 is caused to turn counterclockwise round its rotation center. When the blade opening lever 765 is turned counterclockwise to a slight degree, the arm 765b is locked by the claw part 759e of the armature lever 765. In this case, the shutter blades never open as the turning angle of the blade opening lever 765 is very small.

Following this, when the photographer further pushes the release button, the switch 803 of FIG. 31 is closed. The input voltage level of the inverter 811 becomes L. The output voltage level of the inverter 811 becomes H. The latch circuit 814 is actuated. Therefore, the AND gates has inputs from both the latch circuits 814 and 815 and thus becomes conductive. The AND gate 818 then applies inputs to the AND gates 819, 820 and 822. By then, measured light data converted into a bianry value by the A/D converter 843 has already been applied to the AND gate 820. Therefore, the AND gate 820 becomes conductive to allow the measured light data to be supplied to the digital comparator 834.

Meanwhile, concurrently with this, the AND gate 822 to which the output signal of the AND gate 818 is applied also becomes conductive to drive the transistor 841. As a result, the electro-magnet 757 is excited.

When the electro-magnet 757 is excited under the condition of FIG. 27, the armature 758 and the arm 759b of the armature lever 759 is attracted and pulled by the magnet 757. The armature lever 759 is then turned round clockwise on its shaft 759a. The blade opening lever 765 then has its arm 765b freed from the claw part 759e of the armature lever and thus become turnable counterclockwise. Accordingly, under the control of a governor which is not shown, the blade opening lever 765 is caused by the force of the spring 766 to turn round counterclockwise at a constant speed. This turning motion of the blade opening lever 765 causes the lock lever 767 to turn along with the arm 765e of the lever 765. The hook claw of the fore end of the arm 767b of the lock lever 767 comes to engage the fore end hook claw of the arm 769b of the blade closing lever 769. Then, the arm 769b is pushed up against the force of the spring 770 in the direction of moving it away from the stopper 771. Therefore, the lock lever 767 caused the blade closing lever 769 to turn clockwise round its hole 769a. As a result, the shutter blades are opened.

Further, when the armature lever 759 is turned round clockwise as mentioned above, the lever part 759f moves away from the lock pawl 760. However, since the lock pawl 760 is engaging the locking teeth 753f of the lens barrel 753, the state of the pawl remains unchanged.

When the shutter blades which is not shown are opened with the blade closing lever 769 turned clockwise as mentioned above, an exposure begins. Then, a shutter opening degree detector which is not shown but is disposed close to the shutter blades detects the opened degree of the shutter in the form of an electrical pulse signal. This detector is arranged in one body with the pulse generator 840 of FIG. 31. The output signal of the detector is produced from the pulse generator 840 in the form of a shaped rectangular wave.

Therefore, when the shutter blades are opened, the pulse generator 840 produces pulses representing the shutter opening degree (or a blade opening degree). The pulse signal is supplied to the AND gate 819. The output of the AND gate 818 has been already applied by then to the AND gate 819. Therefore, the AND gate 819 immediately becomes conductive when the pulse signal produced from the pulse generator 840 is applied thereto. As a result, the output pulse signal of the pulse generator 840 is applied via the AND gate 819 to the digital comparator 834. Meanwhile, the measured light data converted into a binary value has already been supplied to the comparator 834 from the A/D converter 843 via the AND gate 820. Therefore, the digital comparator 834 compares the shutter opening degree with the measured light value.

When the shutter opening degree becomes apposite to the measured light value, the output voltage level of the digital comparator 834 changes from L to H. The output voltage level of the inverter 827 therefor changes to L. This renders the AND gate 822, the OR gate 828 and the transistor 841 nonconductive. The electro-magnet 757 is demagnetized. The arm 759b of the armature lever 759 and the armature 758 which have been attracted and pulled by the magnet 757 move away from the magnet. The force of a spring which is not shown causes the armature lever 759 to turn round counterclockwise. The arm part 759d of the lever 759 pushes up the pin 767d of the lock lever 767. The lock lever 767 then turns round clockwise on the pin 765f. Accordingly, the arm 767b of the lock lever 767 moves away from the arm 769b of the blade closing lever 769. The force of the spring 770 is allowed to turn the blade closing lever 769 counterclockwise. An exposure effecting action comes to an end with the shutter blade completely closed when the arm 769b of the blade closing lever comes to abut on the stopper 771. The various actions before the end of the exposure are accomplished during one counterclockwise turn of the gear 725 from its position of FIG. 25. Therefore, no driving force is transmitted from the gear 725 to the gear 726 during this period. The gear 732 is also not rotated.

After this, when the photographer ceases to push the shutter release button, the switch 803 opens to cause the motor 721 to reversely rotate via the motor control circuit which is not shown. This causes the gear 724 to rotate counterclockwise and the gear 725 clockwise. A counterclockwise rotating torque is then applied to the gear 727. Accordingly, a counterclockwise torque is also applied to the lever 728. This causes the lever 728 to turn round counterclockwise from its position of FIG. 27. As a result, the gear 729 moves away from the bevel gear 742. Therefore, the driving force of the motor 721 is no longer transmitted to the helicoid shaft 750. Then, the clockwise urging force of the spring 749 causes the helicoid shaft 750 to rotate clockwise. The bevel gear 744 is rotated clockwise and the bevel gear 742 counterclockwise.

The clockwise rotation of the helicoid shaft 750 as viewed on FIG. 27 causes the helicoid ring 751 and the ratchet wheel 752 on the shaft 750 to rotate clockwise along with the shaft 750. Then, the lens barrel 753 axially moves on the ratchet wheel 752 relative to the latter and to retreat from its position of FIG. 27

With the ratchet wheel 752 rotating clockwise, the lock pawl 754 disengages from the ratchet wheel. The lock pawl is then caused by the force of the spring 755 to turn round clockwise to its position of FIG. 25.

When the ratchet wheel 752 comes to the position of FIG. 25, a stopper which is not shown prevents the ratchet wheel 752 from rotating further relative to the lens barrel 753. Therefore, axial relative movement takes place between the helicoid ring 751 and the helicoid shaft 750. The lens barrel 753 then retreats to its original position (the position of FIG. 25) on the helicoid shaft 750 together with the helicoid ring 751.

During this process, since the helicoid ring 751 retreats from its position of FIG. 27, the arm 762b of the connecting lever 762 which has been pushed against the fore end face of the ring 751 comes from its forward slanting posture back to its perpendicularly standing state as shown in FIG. 25. The other arm of the connecting lever 762 then comes to push down the arm parts 764b of the other connecting lever 764. Therefore, a clockwise torque is applied by the force of the spring 763 to the arm 765c of the blade opening lever 765 via the aarm part 764c of the connecting lever 764. This brings the blade opening lever 765 back to its initial state of FIG. 25.

After that, when the helicoid shaft 750 further rotates clockwise, the lens barrel 753 moves back toward its original position. Meanwhile, since the gear 725 is rotated clockwise, the piece provided on the gear 725 comes to engage the piece 726b of the gear 726 to cause the gear 726 to rotate clockwise. this rotation is transmitted to the gear 732 which engages the gear 726. Then, the gear 737 which engages the gear 732 is rotated. The rotation of the gear 737 causes a spool which is not shown to rotate. The film loaded on the camera is then taken up on the spool. Upon completion of film winding, an indexing signal is generated from a frame indexing device which is not shown. In response to this signal, the motor is brought to a stop. At the same time, the circuit of FIG. 31 is reset.

(ii) Photographing in the TELE mode for a relatively bright object located at a distance within a normal range:

When the photographer shifts the mode selection knob 701 to the right as viewed on FIG. 22 to adjust the arrow mark of the knob to the marked symbol TELE, the lever 702 also moves to the right. The pin 707b on the view finder frame 707 accordingly moves toward the front of the drawing along the slanting face 705b of the cam lever 705 and then moves to one side edge of the cam lever 705. Therefore, the pin 707b is pushed away from the cam lever 705 to the front as viewed on the drawing. The view finder frame 707 is thus turned round clockwise on its shaft 707a. As a result, the view finder frame is eventually positioned to have the objective lens 710 for the TELE mode squarely opposed to the frame reflection lens. The optical system of the view finder is thus set in positon for the TELE mode.

Following the rightward move of the lever 702, the sliding contact piece 704 also moves along with the lever 702. In the position as shown in FIG. 24, the fixed contact piece (or the conductive pattern) which is in contact with the sliding contact piece 704 causes the switch 802 of FIG. 31 to close. As a result, the inverter 810 applies its output to the AND gate 816.

After this, when the photographer pushes the release button down to its first stroke position, the switch 801 is closed. Then, the control circuit which is not shown performs a battery check as shown in the flow chart of FIG. 32. Meanwhile, the pushing operation on the release button pushes the release lever 739 down from its position of FIG. 25. The protruding part 739b of the lever descends to its position as shown in FIG. 26 or 27. Therefore, the lever 728 of the planetary gear device no longer has any part that would abut thereon within its turning locus and thus becomes turnable clockwise. The latch circuit is actuated when the switch 801 is closed. Then, in response to a start signal generated by the latch circuit 813, distance and light measuring actions are performed in the same manner as mentioned in the foregoing Para (i). However, in the case of the TELE mode, the output of the latch circuit 813 causes the circuit consisting of the AND gates 816 and 817 and the inverter s 824 and 825 to set the output of the block counter 837 (or the reference value set for the digital comparator 835) at a value different from the value set in the WIDE mode.

More specifically, when the output of the latch circuit 813 is applied to the AND gate 816 to make it conductive, an input is applied to the AND gate 817. Meanwhile, the AND gate 817 is receives the outputs of the digital comparators 831 and 833 via the inverters 824 and 825. Therefore, the AND gate becomes conductive if the output voltage levels of the digital comparators 831 and 833 are L, that is, when the measured distance and light values are smaller than the reference values set for the digital comparators 831 and 833. In that instance, the block counter 837 receives an input signal representing the measured binary distance value in which higher two bits are "1" and "1" respectively.

When the AND gate 817 becomes conductive, therefore, the output signal of the block counter 837 is "11xy" in the binary notation. The reference value at the digital comparator thus changes. Further details of the operation in this instance are as described below using the same numerical values as in Para. (i) above:

Assuming that the focal length of the photo taking lens is 38 mm and the measured distance value is 0.85 m, the necessary lens shifting extent is about 1.875 mm. Assuming that the lens barrel drawing-out pitch is 0.125 mm, the lens then must be drawn out to an extent of 15 mm. Expressing this value 15 in binary notation, it becomes "1111". The lower three bits "111" (=7) of this binary value is supplied to the address counter 838. Among the bits "0001" in the higher place, the lower two bits "01" is supplied from the decoder 836 to the block counter 837.

In this instance, as indicated in the foregoing, the object is within a given normal range and is brighter than a given value. Therefore, the output voltage levels of both the digital comparators 831 and 833 are L. The AND gate 817 becomes conductive to allow a signal supplied to the block counter 837. As a result of this, among the four bits of the signal output of the block counter 837, higher two bits becomes "11". The output of the block counter 837 thus becomes "1101" (=13). This output is set as a reference value at the digital comparator 835. In other words, the reference value at the digital comparator 835 represents 13 pitches while the reference value at the digital comparator 832 represents 7 pitches.

The ensuing actions of the circuits and mechanical parts are the same as those described in the foregoing paragraph (i) and are, therefore, omitted here.

In the circuit arrangement described, the signal of the third bits (corresponding to a drawing-out degree between 4 mm and 12 mm is excluded from the signal of the block counter 837. In the camera of this embodiment, however, a converter lens which is not shown is arranged to vary the focal length of the lens by coming behind the shutter while the lens barrel is moving between 5 mm and 13 mm. The focus adjustment in the TELE mode is arranged to be performed in the so-called front group drawing-out method which is employed in the cameras of the variable magnification type. In the event of drawing out the lens following variations in the object distance, the lens is of course drawn out in the same degree as in the case of the WIDE mode.

(iii) Photographing in the TELE mode when the object distance is close but outside of the normal range:

Since the photographing operation is to be performed in the TELE mode, the photographer adjusts the mode selection knob 701 to the position as shown in FIG. 24 in the same manner as in the case of Para. (ii). Then, the switch 802 of FIG. 31 is closed. When the release button is pushed to its first stroke position, the latch circuit 813 becomes oPerative and the AND gate 816 becomes conductive in the same manner as in Para. (ii). However, since the object distance is outside of the normal range, the output voltage level of the digital comparator 831 which receives a measured distance value changes from L to H. Therefore, the AND gate 817 produces no output for the block counter 837. The input signal of the block counter 837 representing higher two bits and the higher two bits of the output signal thereof become "00". Therefore, the reference value set at the digital comparator 835 is the same value as in the case of the WIDE mode. The lens barrel driving device is also receives the same lens drawing-out degree as in the case of the WIDE mode described in Para. (i).

The camera is thus arranged to be set at the same lens drawing-out degree as in the WIDE mode while it is in the TELE mode. This is one of the important features of this invention. This arrangement effectively prevents a faulty photographing operation which tends to be performed in the TELE mode and has been a shortcoming of the conventional camera of the kind permitting selection between two focal lengths. Besides, the arrangement to automatically switch the camera to the WIDE mode permits photographing without failure up to a close-up distance and prevent a failure in photographing at a near distance in the TELE mode. In other words, in the case of the camera of this embodiment, photographing can be performed up to a close-up distance even in the TELE mode by utilizing the lens drawing-out stroke of the TELE mode in the event of a photographing distance outside of the normal range. The camera lessens the possibility of faulty photographing.

Further, with the exception of that the digital comparator 831 produces an H level output for the inverter 824 and that the reference value set at the digital comparator 835 becomes the same value as in the case of the WIDE mode as no output is produced from the AND gate 817, the actions of the circuit, the focusing device and the exposure control device to be performed in this instance are identical with those described in Para (i) and, therefore, omitted from the description given here.

(iv) Photographing in the TELE mode when the object is dark (or in the case of a dark field):

Since the photographing mode is the TELE mode, the switch 802 of the FIG. 31 is closed in the same manner as in the foregoing paragraph (iii). After that, when the switch 801 is closed with the release button pushed down to its first stroke position, the latch circuit 813 generates a start signal. In response to this, the AND gate 816 becomes conductive.

Since the luminance of the object or field is darker than the reference value set at the digital comparator 833 in this case, the output voltage level of the digital comparator 833 becomes H. The output voltage level of the inverter 825 becomes L. Therefore, the AND gate 817 becomes non-conductive irrespectively of the output of the digital comparator 831 (i.e. irrespectively of the object distance). As a result, the reference value set at the digital comparator 835 becomes the same value as in the case of the WIDE mode in the same manner as mentioned in Para. (iii) above. The lens drawing-out or delivery degree is therefore becomes the same as in the case of the WIDE mode. In other words, the lens drawing-out degree in this instance is also controlled to be the same as in the WIDE mode.

Further, although it is not shown in FIG. 31, film sensitivity detecting means which is arranged to vary its output according to information on the sensitivity of the film may be connected to the non-inverting input terminal (reference value input terminal) of the digital comparator 833. Further, in the event of a camera having a flash device, the output level of the digital comparator 833 can be arranged to become L upon receipt of a signal indicating that the flash device is completely charged.

(v) When the film of the camera comes to an end:

When an exposure action on the film comes to an end and the photographer ceases to push the release button, a control circuit which is not shown causes the motor 721 to rotate in the film winding direction the instant the switch 803 of FIG. 31 opens. Then, the gear 724 as shown in FIG. 27 is rotated counterclockwise and the gear 725 clockwise. Accordingly, the gear 727 rotates counterclockwise to cause the lever 728 to have a counterclockwise torque applied thereto via the gear 729. The lever 728 turns counterclockwise from its position as shown in FIG. 27. The gear 729 moves away from the bevel gear 742. The lever 728 and the gear 729 come to their positions of FIG. 25. The release lever 739 moves up from its position of FIG. 27 to its position of FIG. 25. The protrudent part 39b of the release lever 739 engages the arm part 728b of the lever 728 to prevent the clockwise turn of the lever 728.

With the gear 725 having rotated to some degree, when the piece 725b of the gear 725 comes to engage the piece 726b of the gear 726, the gear 726 begins to rotate in the same direction as the gear 725. Therefore, the gear 732 which is engaging the gear 726 is rotated counterclockwise as shown in FIG. 25. As a result, the gear 733 is rotated clockwise. Then, a film winding or take up spool which is not shown is rotated via the gear 737 which is engaging the gear 733. Therefore, the film is taken up on the spool.

After the lapse of a predetermined period of time from the end of the above stated action, if no film indexing signal is generated from a frame indexing device which is not shown, the control circuit which is not shown causes the motor 721 to reversely rotate. Accordingly, in the case of FIG. 25, the gear 725 is rotated counterclockwise. A clockwise torque is applied to the gear 727. Therefore, a clockwise torque is applied via the gear 729 to the lever 728. However, since the arm 728b of the lever 728 is abutting on the protrudent part 739b of the release lever 739, the lever 728 is unable to move. Therefore, the gears 727 and 729 idly rotate while the lever 728 stays in its position of FIG. 25.

When the gear 725 makes one turn, the piece 725b of the gear 725 comes to engage the piece 726b of the gear 726. After one turn of the gear 725, therefore, the gears 726 comes to rotate in the same direction as the gear 725. The gear 732 thus receives a clockwise torque. As a result, a clockwise torque is applied via the gear 733 to the lever 734. The lever 734 turns round clockwise on the shaft of the gear 732. Then, as shown in FIG. 28, the gear 733 moves away from the gear 737 and comes to engage the gear 738. The rotation of the gear 732 is thus transmitted via the gear 733 to the gear 738. Therefore, the fork which is not shown is rotated via the gear 738 to have the film thus rewound.

During the process of the film rewinding action, it is impossible to move the lens barrel and the shutter operating device even if the release button is pushed in a photographing attempt, because: Referring to FIG. 28, even if the stopper is removed for the arm part 728b of the lever 728 with the release lever 739 pushed down, the arm part 734a of the lever 734 serves as a stopper against the other arm part 728c of the lever 728. Therefore, it is impossible to cause the lever 728 to turn round to a position where the lever enables the gear 729 to engage the bevel gear 742. The force which keeps the lever 734 in the position as shown in FIG. 28 is a component of the force of engagement of the gears 736 and 738. This component force is considerably greater than a force urging the lever 728 to turn round. This urging force is determined by the resilient force of the spring 730, which must be arranged to be not too great. By virtue of the component force of engagement, the lever 734 is never caused to turn counterclockwise from its position of FIG. 28 even by the clockwise turning movement of the lever 728. The force also serves to prevent the lever 728 from turning round clockwise.

After the film is completely taken up, a film presence/absence detecting switch which is not shown opens. Then, the control circuit which is not shown again causes the motor 721 to rotate to a given degree in the film winding direction and then brings the motor to a stop.

In the case of the third embodiment, this invention is applied to a camera arranged to have the view finder and the photo taking lens operate independently of each other. However, the application of this invention is not limited to the camera of that kind. The invention is applicable also to a camera having a zoom lens besides the camera of the kind permitting change-over between the TELE and WIDE modes.

Therefore, this invention is not limited to the embodiments described but can be embodied in the cameras having the following features:

(a) A camera which is provided with a flash device; has different F numbers for the TELE mode and the WIDE mode; and has different exposure interlocking ranges of operation in the TELE and WIDE modes.

(b) A camera arranged to be automatically shifted to the WIDE mode when the object distance is outside of the flash synchronizing range in the TELE mode but is within the range in the WIDE mode.

(c) A camera arranged to have the operation of Para. (b) above performed by an external switch operatin and performed only in an automatic operation mode.

The first, second and third embodiments have been described on the assumption that the focal length of the camera is selectable between a long focal length and a short focal length. However, it is obvious that this invention is applicable to a multiple focal length selection arrangement or to a zooming arrangement by arranging the focal length selection switch to be shiftable between three or more than three positions and by arranging the decoder, etc. to vary the photo taking optical system shifting extent according to the selecting operation of such a focal length selecting switch.

As mentioned in the foregoing, the camera according to this invention comprises a photo taking optical system; driving means for driving the photo taking optical system; a shutter; switching means for causing transmission of the friving force of the driving means to the photo taking optical system to be changed over to the shutter; and control means for controlling the shutter by converting the opening time of the shutter into the driving degree of the driving means, so that the photo taking optical system and the shutter can be time serially driven by one and the same driving means. The camera according to this invention is thus arranged to be capable of adequately performing necessary functions with inexpensive and simple arrangement. The invention, therefore, gives highly advantageous effect.

What is claimed is:

1. A camera comprising:

(a) photographic optical system;

(b) driving means for driving said photographic optical system;
(c) a shutter;
(d) first transmission means for shifting said photographic optical system by a driving force of said driving means and,
(e) second transmission means for operating said shutter by being shifted a predetermined amount in the same direction as said photographic optical system by the driving force of said driving means.

2. A camera according to claim 1, wherein said second transmission means includes means for causing said shutter to open.

3. A camera according to claim 1, further comprising exposure control means for controlling exposure by converting exposure time into the predetermined amount of said second transmission means.

4. An optical path opening and closing device, comprising:
driving means for generating a rotating driving force;
conversion means for converting the rotating driving force into a driving force in the direction of the optical path;
moving means which moves in the direction of the optical path by the driving force which is converted by the conversion means;
means for opening the optical path being arranged to operate in accordance with the movement of said moving means; and
an optical system being moved by the driving force which is converted by said converting means.

5. A device according to claim 4, wherein said driving means includes a motor.

6. A device according to claim 4, further comprising camera operation means for operating said optical path opening means.

7. A device according to claim 4, further comprising detection means for detecting the amount of opening by said optical path opening means on the basis of a driving amount of said driving means.

8. A device according to claim 4, further comprising second moving means for moving an optical system by the driving force which is converted by said converting means.

9. A device according to claim 4, further comprising second moving means which moves in the direction of the optical path by the driving force converted by said converting means, said second moving means moving an optical system in accordance with the movement of said second moving means.

10. A device according to claim 9, wherein said moving means includes means which moves in unison with said second moving means while said second moving means is moving.

11. A device according to claim 10, further comprising stop means for stopping the movement of said second moving means, said stop means performing no stopping action on said moving means.

12. A device according to claim 9, further comprising means for detecting the amount of operation of said optical opening means in accordance with the movement of said moving means and the amount of the movement of said optical system by said second moving means on the basis of the driving amount of said driving means.

13. A device according to claim 12, wherein said detection means has no discrimination in its detecting operation between the time when said optical path opening means is operated according to the movement of said moving means and the time when said optical system is operated by said second moving means.

14. A camera, comprising:
driving means for generating a rotating driving force;
conversion means for converting the rotating driving force into a driving force in the direction of the optical path;
moving means which moves in the direction of the optical path by the driving force which is converted by the conversion means;
means for opening the optical path being arranged to operate in accordance with the movement of said moving means; and
an optical system being moved by the driving power which is converted by the converting means.

15. A camera according to claim 14, wherein said driving means includes a motor.

16. A camera according to claim 14, further comprising camera operation means for operating said optical path opening means.

17. A camera according to claim 14, further comprising detection means for detecting the amount of opening by said optical path opening means on the basis of a driving amount of said driving means.

18. A camera according to claim 14, further comprising second moving means for moving an optical system by the driving force which is converted by the converting means.

19. A camera according to claim 14, further comprising second moving means which moves in the direction of said optical path by the driving force converted by said converting means, said second means moving an optical system in accordance with the movement of the said second moving means.

20. A camera according to claim 19, wherein said moving means includes means which moves in unison with said second moving means while said second moving means is moving.

21. A camera according to claim 20, further comprising stop means for stopping the movement of said second moving means, said stop means performing no stopping action on said moving means.

22. A camera according to claim 19, further comprising means for detecting the amount of operation of said optical opening means in accordance with the movement of said moving means and the amount of the movement of said optical system by said second moving means on the basis of the driving amount of said driving means.

23. A camera according to claim 22, wherein said detection means has no discrimination in its detecting operation between the time when said optical path opening means is operated according to the movement of said moving means and the time when said optical system is operated by said second moving means.

24. A device according to claim 4, wherein said optical path opening means includes second conversion means for converting the movement of said moving means into a driving force acting in a plane vertical to the direction of said optical path.

25. A device according to claim 24, wherein said optical path opening means includes means which operates in the plane vertical to the direction of the optical path with the driving force converted by said second conversion means.

26. A device according to claim 4, wherein said optical path opening means operates in a plane vertical to the direction of the optical path in response to the movement of said moving means.

27. A camera according to claim 14, wherein said optical path opening means includes second conversion means for converting the movement of said moving means into a driving force acting in a plane vertical to the direction of said optical path.

28. A camera according to claim 27, wherein said optical path opening means includes means which operates in the plane vertical to the direction of the optical path with the driving force converted by said second conversion means.

29. A camera according to claim 14, wherein said optical path opening means operates in a plane vertical to the direction of the optical path in response to the movement of said moving means.

30. A camera, comprising:
  driving means for generating a driving force;
  moving means which moves in an optical path direction by the driving force of said driving means;
  optical means which operates in accordance with the movement of said moving means; and
  shutter means which operates in accordance with the movement of said moving means.

31. A camera according to claim 30, wherein said driving means comprises a motor.

32. A camera according to claim 30, wherein said optical means comprises means for moving along the optical path in accordance with the movement of said moving means.

33. A camera according to claim 30, wherein said optical means comprises means for varying a focal length of the optical means in accordance with movement of said moving means.

34. A camera according to claim 30, wherein said optical means comprises means for focusing in accordance with movement of said moving means.

35. A camera according to claim 30, wherein said shutter means comprises means for opening the optical path in accordance with movement of said moving means.

36. A camera according to claim 30, wherein said moving means comprises first and second moving means, and said optical means operates in accordance with a unitary movement of said first and second moving means, and said shutter means operates in accordance with movement of said second moving means independently of said first moving means.

37. A camera according to claim 36, further comprising stop means for stopping said first moving means, said stop means being independent of said second moving means.

38. A camera according to claim 30, further comprising detection means for detecting an operating amount of said shutter means on the basis of a driving amount of said driving means.

39. A camera according to claim 30, further comprising detection means for detecting an operating amount of said optical means and the operating amount of said shutter means on the basis of a driving amount of said driving means.

40. A camera according to claim 39, wherein said detection means comprises a common means for detecting the operating amount of said optical means and the operating amount of said shutter means.

41. A camera according to claim 30, wherein said driving means comprises threaded shaft means for moving said moving means.

42. A camera according to claim 41, wherein said moving means comprises screw engaging means for screw engagement with said threaded shaft means.

43. A drive device for an optical system, comprising:
  driving means for generating a driving force;
  moving means which moves in an optical path direction by the driving force of said driving means;
  first operating means for operating said optical means in accordance with the movement of said moving means; and
  second operating means for operating shutter means in accordance with the movement of said moving means.

44. A device according to claim 43, wherein said driving means comprises a motor.

45. A device according to claim 43, wherein said first operating means comprises means for moving said optical means along the optical path in accordance with movement of said moving means.

46. A device according to claim 43, wherein said first operating means comprises means for varying the focal length of said optical means in accordance with movement of said moving means.

47. A device according to claim 43, wherein said first operating means comprises means for focusing said optical means in accordance with movement of said moving means.

48. A device according to claim 43, wherein said second operating means includes means for opening the optical path in accordance with the movement of said moving means.

49. A device according to claim 43, wherein said moving means includes first and second movement means, and said first operating means operates in accordance with a unitary movement of said first and second moving means, and said second operating means operates in accordance with movement of said second moving means independently of said first moving means.

50. A device according to claim 49, further comprising stop means for stopping said first moving means, said stop means being independent of said second moving means.

51. A camera according to claim 43, further comprising detection means for detecting an operating amount of said shutter means on the basis of a driving amount of said driving means.

52. A camera according to claim 43, further comprising detection means for detecting an operating amount of said optical means and the operating amount of said shutter means on the basis of a driving amount of said driving means.

53. A camera according to claim 52, wherein said detection means comprises a common means for detecting the operating amount of said optical means and the operating amount of said shutter means.

54. A camera according to claim 43, wherein said driving means comprises threaded shaft means for moving said moving means.

55. A camera according to claim 54, wherein said moving means comprises screw engaging means for screw engagement with said threaded shaft means.

56. A camera, comprising:
  driving means for generating a driving force;
  moving means which moves in an optical path direction by the driving force of said driving means;
  operating means for operating optical means in accordance with the movement of said moving means; and shutter means which operates in accordance with the movement of said moving means.

57. A camera according to claim 56, wherein said driving means comprises a motor.

58. A device according to claim 56, wherein said first operating means comprises means for moving said optical means along the optical path in accordance with movement of said moving means.

59. A device according to claim 56, wherein said first operating means comprises means for varying a focal length of said optical means in accordance with movement of said moving means.

60. A device according to claim 56, wherein said first operating means comprises means for focusing said optical means in accordance with movement of said moving means.

61. A camera according to claim 56, wherein said shutter means comprises means for opening the optical path in accordance with movement of said moving means.

62. A camera according to claim 56, wherein said moving means comprises first and second moving means, said operating means operates in accordance with a unitary movement of said first and second moving means, and said shutter means operates in accordance with movement of said second moving means independently of said first moving means.

63. A camera according to claim 62, wherein further comprising stop means for stopping said first moving means, said stop means being independent of said second moving means.

64. A camera according to claim 56, further comprising detection means for detecting an operating amount of said shutter means on the basis of a driving amount of said driving means.

65. A camera according to claim 56, further comprising detection means for detecting an operating amount of said optical means and the operating amount of said shutter means on the basis of a driving amount of said driving means.

66. A camera according to claim 65, wherein said detection means comprises a common means for detecting the operating amount of said optical means and the operating amount of said shutter means by a same detection portion.

67. A camera according to claim 56, wherein said driving means comprises threaded shaft means for moving said moving means.

68. A camera according to claim 56, wherein said moving means comprises screw engaging means for screw engagement with said threaded shaft means.

69. A camera according to claim 30, wherein said optical means comprises photographic optical means.

* * * * *

UNITED STATES PATENT AND TRADEMARK OFFICE
CERTIFICATE OF CORRECTION

PATENT NO. : 4,982,218

DATED : January 1, 1991

INVENTOR(S) : TAKAYUKI TSUBOI, ET AL.

It is certified that error appears in the above-identified patent and that said Letters Patent is hereby corrected as shown below:

COLUMN 4

Line 22, "control" (second occurrence) should read --controls--.

COLUMN 5

Line 9, change "have the screw" to --be--;
Line 10, delete "shaft 2" (first occurrence);
Line 32, "par 1b." should read --part 1b.--; and
Line 43, "window 1A" should read --window 1h--.

COLUMN 6

Line 10, "is" should read --are--.

COLUMN 7

Line 35, "t" should read --to--.

COLUMN 8

Line 9, "plunge 32a" should read --plunger 32a--.

COLUMN 10

Line 21, "arm 20b" should read --arm 20a--; and
Line 28, "ar 38d" should read --arm 38d--.

UNITED STATES PATENT AND TRADEMARK OFFICE
CERTIFICATE OF CORRECTION

PATENT NO. : 4,982,218

DATED : January 1, 1991

INVENTOR(S) : TAKAYUKI TSUBOI, ET AL.

It is certified that error appears in the above-identified patent and that said Letters Patent is hereby corrected as shown below:

COLUMN 14

Line 22, "u" should read --up--; and
    Line 27, "sector ar 25" should read --sector arm 25--.

COLUMN 15

Line 27, "move" should read --movement--.

COLUMN 17

Line 6, "place 208" should read --plate 208--.

COLUMN 21

Line 6, "recess 228 a" should read --recess 228a--;
    Line 18, "gear 307" should read --gear 307a--; and
    Line 45, "key 310" should read --key 310c--.

COLUMN 22

Line 27, "saw like" should read --sawlike--; and
    Line 59, "cf" should read --of--.

COLUMN 23

Line 17, delete "of the lever".

COLUMN 24

Line 40, "obtained" should read --obtain--.

UNITED STATES PATENT AND TRADEMARK OFFICE
CERTIFICATE OF CORRECTION

PATENT NO. : 4,982,218

DATED : January 1, 1991

INVENTOR(S) : TAKAYUKI TSUBOI, ET AL.

It is certified that error appears in the above-identified patent and that said Letters Patent is hereby corrected as shown below:

COLUMN 25

Line 24, "torqe" should read --torque--; and
    Line 51, "307" should read --307a--.

COLUMN 26

Line 8, "stopping" should read --stopped--; and
    Line 38, "forward" should read --moves forward--.

COLUMN 27

Line 23, "aram-" should read --arma- --.

COLUMN 29

Line 50, "engaging part 218" should read --engaging part 218b--.

COLUMN 31

Line 4, "planetary leer 218." should read --planetary lever 218.--.

COLUMN 33

Line 17, "(va + Vb)" should read --(Va + Vb)--; and
    Line 37, "signal AFSET," should read --signal AFDSET,--.

UNITED STATES PATENT AND TRADEMARK OFFICE
CERTIFICATE OF CORRECTION

PATENT NO. : 4,982,218
DATED : January 1, 1991
INVENTOR(S) : TAKAYUKI TSUBOI, ET AL.

It is certified that error appears in the above-identified patent and that said Letters Patent is hereby corrected as shown below:

COLUMN 35

Line 2, "650" should read --634--.

COLUMN 36

Line 7, "output lever" should read --output level-- and "become" should read --becomes--; and
Line 18, "rewind signal RIWIND" should read --rewind signal REWIND--.

COLUMN 37

Line 56, "other leg" should read --other leg 706b--.

COLUMN 40

Line 30, "pring peg" should read --spring peg--; and
Line 61, "screw hole 753" should read --screw hole 753b--.

COLUMN 41

Line 12, "hole 53a" should read --hole 753a--;
Line 15, "lens barel 753" should read --lens barrel 753--; and
Line 20, "paralle" should read --parallel--.

COLUMN 43

Line 28, "extents" should read --extends--; and
Line 48, "arm 769b)," should read --stopper 771)--.

UNITED STATES PATENT AND TRADEMARK OFFICE
CERTIFICATE OF CORRECTION

PATENT NO. : 4,982,218

DATED : January 1, 1991

INVENTOR(S) : TAKAYUKI TSUBOI, ET AL.

It is certified that error appears in the above-identified patent and that said Letters Patent is hereby corrected as shown below:

COLUMN 44

Line 21, "mesured" should read --measured--;
    Line 58, "desils" should read --details--; and
    Line 62, "distace" should read --distance--.

COLUMN 45

Line 21, "gfear" should read --gear--; and
    Line 40, "shaft 717a," should read --shaft 707a,--.

COLUMN 48

Line 21, "plungs" should read --plunges--;
    Line 24, "move" should read --movement--; and
    Line 54, "put-" should read --out- --.

COLUMN 49

Line 5, "plung" should read --plunge--;
    Line 56, "armature lever 765." should read --armature lever 759.--; and
    Line 64, "AND gates" should read --AND gate--.

COLUMN 50

Line 36 "is" should read --are--.

COLUMN 53

Line 42, "12 mm is" should read --12 mm) is--.

UNITED STATES PATENT AND TRADEMARK OFFICE
CERTIFICATE OF CORRECTION

PATENT NO. : 4,982,218

DATED : January 1, 1991

INVENTOR(S) : TAKAYUKI TSUBOI, ET AL.

It is certified that error appears in the above-identified patent and that said Letters Patent is hereby corrected as shown below:

COLUMN 55

Line 18, "protrudent part 39b" should read --protrudent part 739b--; and
    Line 46, "gears" should read --gear--.

COLUMN 56

Line 55, "friving" should read --driving--.

COLUMN 57

Line 42, "an" should read --said--; and
    Line 49, "an" should read --said--.

COLUMN 58

Line 27, "an" should read --said--;
    Line 33, "second means" should read --second moving means--; and
    Line 34, "the" should be deleted.

COLUMN 60

Line 33, "movement" should read --moving--;
    Line 43, "camera" should read --drive device--;
    Line 47, "camera" should read --drive device--;
    Line 52, "camera" should read --drive device--;
    Line 56, "camera" should read --drive device--; and
    Line 59, "camera" should read --drive device--.

UNITED STATES PATENT AND TRADEMARK OFFICE
CERTIFICATE OF CORRECTION

PATENT NO. : 4,982,218  Page 7 of 7
DATED : January 1, 1991
INVENTOR(S) : TAKAYUKI TSUBOI, ET AL.

It is certified that error appears in the above-identified patent and that said Letters Patent is hereby corrected as shown below:

COLUMN 61

Line 5, "device" should read --camera-- and "first" should be deleted;
    Line 9, "device" should read --camera-- and "first" should be deleted; and
    Line 13, "device" should read --camera-- and "first" should be deleted.

COLUMN 62

Line 1, "wherein" should be deleted; and
    Line 22, "claim 56," should read --claim 67,--.

Signed and Sealed this

Twenty-fourth Day of August, 1993

*Attest:*

*Attesting Officer*

BRUCE LEHMAN

*Commissioner of Patents and Trademarks*